(12) United States Patent
Woods

(10) Patent No.: US 11,129,380 B2
(45) Date of Patent: Sep. 28, 2021

(54) ARTHROPOD PEST CONTROL COMPOSITIONS, KITS AND USES THEREOF

(71) Applicant: Inscent, Inc., Irvine, CA (US)

(72) Inventor: Daniel F. Woods, Irvine, CA (US)

(73) Assignee: Inscent, Inc., Irvine, CA (US)

( * ) Notice: Subject to any disclaimer, the term of this patent is extended or adjusted under 35 U.S.C. 154(b) by 0 days.

(21) Appl. No.: 16/006,541

(22) Filed: Jun. 12, 2018

(65) Prior Publication Data

US 2018/0295835 A1 Oct. 18, 2018

Related U.S. Application Data

(60) Provisional application No. 62/484,655, filed on Apr. 12, 2017.

(51) Int. Cl.
*A01N 25/10* (2006.01)
*A01N 25/16* (2006.01)
*A01N 25/00* (2006.01)

(52) U.S. Cl.
CPC ............. *A01N 25/10* (2013.01); *A01N 25/00* (2013.01); *A01N 25/16* (2013.01)

(58) Field of Classification Search
None
See application file for complete search history.

(56) References Cited

U.S. PATENT DOCUMENTS

| | | | |
|---|---|---|---|
| 6,271,278 B1 | 8/2001 | Park et al. | |
| 6,960,617 B2* | 11/2005 | Omidian | A61K 9/0065 521/102 |
| 7,291,674 B2 | 11/2007 | Kang et al. | |
| 8,524,259 B2* | 9/2013 | Taft | A61P 25/18 424/401 |
| 2010/0028295 A1* | 2/2010 | Taranta | A01N 25/04 424/84 |
| 2014/0294968 A1* | 10/2014 | Hofmann | A01N 37/46 424/489 |

FOREIGN PATENT DOCUMENTS

WO 2013116358 A1 8/2013

OTHER PUBLICATIONS

Aguilar, et al., Smart Polymers and Their Applications as Biomaterials, Top. Tissue Eng. 3, pp. 27 (2007).
Ahmed, et al., A Conceptual Overview on Superporous Hydrogels, Int. J. Pharm. Sci. Rev. Res., 25(2): 166-173 (2014).
Ahmed, Hydrogel: Preparation, Characterization, and Applications: A Review, J. Adv. Res. 6: 105-121 (2015).
Almeida, et al., Temperature and pH Stimuli-Responsive Polymers and their Applications in Controlled and Self-Regulated Drug Delivery, J. Appl. Pharm. Sci. 2(6): 1-10 (2012).

(Continued)

*Primary Examiner* — Dominic Lazaro
(74) *Attorney, Agent, or Firm* — UltimatEdge IP Law Group, P.C.; Dean G. Stathakis

(57) ABSTRACT

The present specification discloses arthropod pest control compositions comprising one or more hydrogel particles including one or more pH-sensitive polymers, methods and uses of controlling an arthropod pest population using such compositions.

18 Claims, 1 Drawing Sheet

(56) References Cited

OTHER PUBLICATIONS

Bajpai, et al., Stimuli-Responsive Polymers: Design and Applications, Encyclop. Biomed. Polymers Polymeric Biomat. pp. 35 (2014).
Bawa, et al., Stimuli-Responsive Polymers and their Applications in Drug Delivery, Biomed. Mater. 4, pp. 16 (2009).
Calo, et al., Biomedical Applications of Hydrogels: A Review of Patents and Commercial Products, Eur. Polymer J. 65: 252-267 (2015).
Dong, et al., pH-Adaptive Microlenses using Pinned Liquid-Liquid Interfaces Actuated by pH-Responsive Hydrogel, Appl. Physics Lett. 89: 211120, pp. 3 (2006).
Gemeinhart, et al., pH-Sensitivity of Fast Responsive Superporous Hydrogels, J. Biomater. Sci. Polymer Edn. 11(12): 1371-1380 (2000).
Gupta, et al., Investigation of Swelling Behavior and Mechanical Properties of a pH-Sensitive Superporous Hydrogel Composite, Iranian J. Pharm. Res. 11(2): 481-493 (2012).
Hamidi, et al., Hydrogel Nanoparticles in Drug Delivery, Adv. Drug Del. Rev. 60: 1638-1649 (2008).
Mahdavinia, et al., Modified Chitosan III, Superabsorbency, Salt- and pH-Sensitivity of Smart Ampholytic Hydrogels from Chitosan-g-PAN, Polymers Adv. Technol. 15: 173-180 (2004).
Omidian, et al., Advances in Superporous Hydrogels, J. Control. Release 102: 3-12 (2005).
Omidian, et al., Recent Developments in Superporous Hydrogels, J. Pharm. Pharmacol. 59: 317-327 (2007).
Omidian, et al., Elastic, Superporous Hydrogel Hybrids of Polyacrylamide and Sodium Alginate, Macromol. Biosci. 6: 703-710 (2006).
Priya. et al., Smart Polymers for the Controlled Delivery of Drugs—A Concise Overview, Acta Pharm. Sinica B 4(2): 120-127 (2014).
Puoci, et al., Polymer in Agriculture: A Review, Am. J. Agricul. Biol. Sci. 3(1): 299-314 (2008).
Reyes-Ortega, pH-Responsive Polymers: Properties, Synthesis and Applications, Smart Polymers and their Applications, pp. 46 (2014).
Sakiyama, et al., Polyelectrolyte Complex Gel with High pH-Sensitivity Prepared from Dextran Sulfate and Chitosan, J. Appl. Polymer Sci. 73: 2227-2233 (1999).
Soppimath, et al., Biodegradable Polymeric Nanoparticles as Drug Delivery Devices, J. Control. Release 70: 1-20 (2001).
Wei, et al., Stimuli-Responsive Polymers and their Applications, Polymer Chem. 8: 127-143 (2017).
Yoshida, et al., Stimuli-Responsive Hydrogels and Their Application to Functional Materials, Biomedical Applications of Hydrogels Handbook, pp. 26 (2010).
Zohuriaan-Mehr, et al., Superabsorbent Polymer Materials: A Review, Irainian Polymer J. 17(6): 451-477 (2008).
Zohuriaan-Mehr, et al., Advances in Non-Hygienic Applications of Superabsorbent Hydrogel Materials, J. Mater. Sci. 45: 5711-5735 (2010).
WIPO, PCT Form ISA/220 International Search Report for International Patent Application Serial No. PCT/US2018/037118, dated Sep. 4, 3018.
WIPO, PCT Form ISA/237 Written Opinion for International Patent Application Serial No. PCT/US2018/037118, dated Sep. 4, 3018.

* cited by examiner

ARTHROPOD PEST CONTROL COMPOSITIONS, KITS AND USES THEREOF

This application claims the benefit of priority and filing date of U.S. Provisional Patent Application Ser. No. 62/484,655, filed Apr. 12, 2017, the entire contents of which are incorporated herein by reference.

In its broadest sense, a pest refers to any organism that negatively affects a plant and/or animal host by colonizing, damaging, attacking, or competing with the host for nutrients or habitat, or directly or indirectly infecting a host organism causing the host's disease or death. Pests can be broadly classified as 1) invertebrate pests, including include insects, arachnids, nematodes and gastropods; 2) plant pests; and 3) vertebrate pests including mammals and birds.

Invertebrate pests have significant worldwide deleterious impact because they adversely affect many human concerns such as public health, agriculture, the ecology and the economy. For example, infestations of invertebrate pests 1) spread pathogens or pathogenic vectors causing disease and epidemic outbreaks human populations resulting in sickness and death as well as decreased agriculture and livestock production; 2) decrease yields and quality of agricultural important crops by direct consumption; 3) increase structural damage by weakening the physical integrity of buildings, bridges and other man-made structures; and 4) disrupt and ruin native ecosystems by overtaking the habitat of indigenous species. Annually, the worldwide costs associated with invertebrate pest infestations exceed tens of billions of dollars in terms of the economic loss caused by such infestations as well as the expense associated with keeping these pest populations under control.

Pesticides are defined as substances or mixtures of substances intended for controlling, repelling, mitigating or exterminating any biological organism deemed to be a pest. Insecticides are pesticides designed to control insects while acaracides are pesticides designed to control arachnids, such as spiders, ticks and mites. In public health applications pesticides are most commonly used to control mosquitoes, flies, ticks, mites, lice, and fleas. Insecticides and acaracides, collectively referred to as arthropod pesticides, can exert their effect on one or more life stages of an insect or arachnid, such as, e.g., egg (ovicide), larva (larvicide), nymph (nymphicide), pupae (pupicide) or adult (adulticide). Insecticides and acaracides are often the same pesticides.

Traditional approaches used to control arthropod pest infestations, including pesticides, integrated pest management, and biological control are falling into disfavor by consumers and/or regulatory agencies because each has serious drawbacks because of environmental and social costs and/or lack of (cost-) effectiveness. For example, insecticides have been successfully employed in both urban and agricultural settings against a wide variety of invertebrate pests. However, many insecticides suffer drawbacks including detrimental effects on human health due to exposure, damaging environmental effects due to contamination, unintended targeting of beneficial insect populations, decreased efficacy due to insecticide resistance among target populations and high production costs.

Given that traditional pest control methods have significant public health concerns, environmental and social costs and/or questionable or costly effectiveness, there is an urgent need to develop new methods for arthropod pest control. What is still needed is a new arthropod pest control product that is safe to humans and the environment and inexpensive to manufacture.

SUMMARY

The present specification discloses arthropod pest control compositions which represent a major improvement to the current generation of arthropod pesticides, including insecticides and acaracides. Unlike most other organisms, where the lumen of the digestive organ is maintained in an acidic condition of about pH 3-4, in insects the digestive portion of the digestive system is alkaline in nature, typically having a pH of about 9 or higher. Taking advantage of the alkalinity of the insect digestive system, an arthropod pest control composition disclosed herein comprises a class of superporous hydrogels having a unique property of rapidly absorbing a vast amount liquid when exposed to an alkaline environment. Upon feeding, the ingested hydrogel becomes exposed to the alkaline environment of the digestive tract which triggers the rapid absorption of the insect's bodily fluids and swelling of the ingested hydrogel. Hydrogel swelling causes desiccation due to fluid absorption, internal tissue and organ damage due to hydrogel expansion as well as mechanical obstruction to the digestive tract, which alone or in combination results in the insect's death. An arthropod pest control composition disclosed herein may further include an attractant used to promote feeding behavior as well as other components designed to optimize function or improve stability. A disclosed arthropod pest control composition has the added advantages of being biodegradable, composed of non-toxic materials and inexpensive to manufacture. In addition, an arthropod pest control composition disclosed herein can be produced in many different formats, including powered, granular, or disc-shaped, thereby facilitating administration to a wide-range of aquatic and terrestrial settings.

Thus, aspects of the present specification disclose an arthropod pest control composition. A disclosed arthropod pest control composition can comprise one or more hydrogel particles including one or more pH-sensitive polymers. Upon exposure to an environment having an alkaline pH, the one or more hydrogel particles undergo a phase transition into the expanded state. The disclosed one or more hydrogel particles can further be coated with a polyhedrin protein. A disclosed arthropod pest control composition can also comprise a hydrogel composition including one or more pH-sensitive polymers. Upon exposure to an environment having an alkaline pH, the hydrogel composition undergoes a phase transition into the expanded state. In addition to being a stimulus-responsive hydrogel, the disclosed hydrogel particles and hydrogel composition can also be a superporous hydrogel comprising pores and further including a pre-cross-linked matrix-swelling additive and/or a hybrid agent. A disclosed arthropod pest control composition can further comprise a matrix material and an attractant.

Other aspects of the present specification disclose a method of controlling an arthropod pest population comprising one or more arthropod pests. A method of controlling a population of arthropod pests disclosed herein includes a step of applying an effective amount of an arthropod pest control composition disclosed herein to one or more arthropod pests and/or applying an effective amount of an arthropod pest control composition disclosed herein to one or more locations where arthropod pest control is desired. In one embodiment, upon ingestion of the arthropod pest control composition, the one or more hydrogel particles expand in the alimentary canal of the one or more arthropods thereby killing the one or more arthropod pests. In another embodiment, upon ingestion of the arthropod pest control composition, the hydrogel composition expands in the alimentary canal of the one or more arthropods thereby killing the one or more arthropod pests.

Other aspects of the present specification disclose use of an arthropod pest control composition disclosed herein in controlling an arthropod pest population comprising one or more arthropod pests. Use of a disclosed composition or a hydrogel composition includes applying an effective amount of a disclosed arthropod pest control composition to one or more arthropod pests and/or applying an effective amount of a disclosed arthropod pest control composition to one or more locations where arthropod pest control is desired.

Other aspects of the present specification disclose arthropod pest control composition disclosed herein for use in controlling an arthropod pest population comprising one or more arthropod pests. Use of a disclosed arthropod pest control composition includes applying an effective amount of a disclosed composition or a hydrogel composition to one or more arthropod pests and/or applying an effective amount of a disclosed arthropod pest control composition to one or more locations where arthropod pest control is desired.

DETAILED DESCRIPTION

Figure 1:
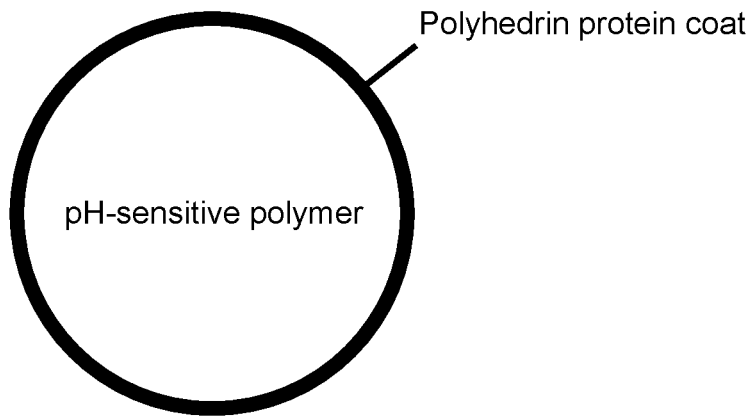
FIG. 1 shows an illustration of a hydrogel particle disclosed herein.
Figure 2:
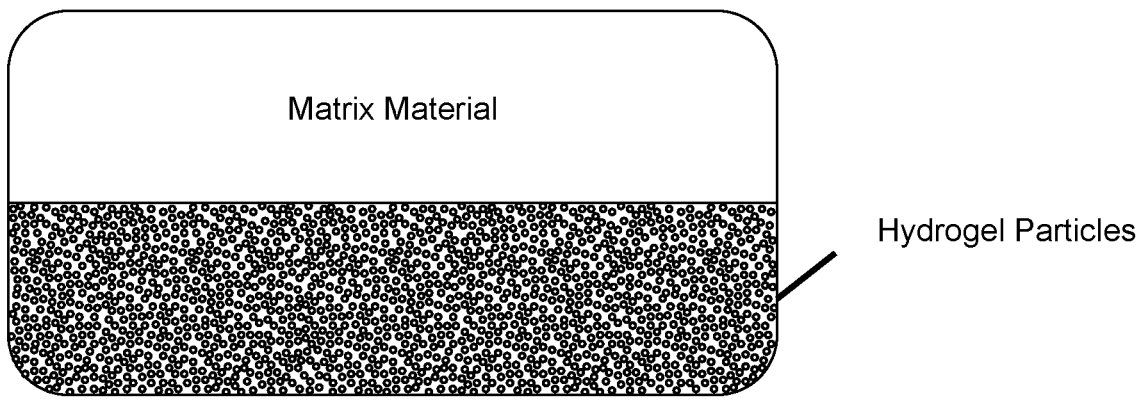
FIG. 2 shows an illustration of arthropod pest control compositions disclosed herein, where the first portion comprises a matrix material and the second portion comprises one or more hydrogel particles.
Figure 3:
FIG. 3 shows an illustration of arthropod pest control compositions disclosed herein, where the first portion comprises a matrix material and the second portion comprises a hydrogel composition.

The digestive system of insects consists of an alimentary canal (gut) and salivary glands and is responsible for all steps in food processing: digestion, absorption, and fecal delivery and elimination. The alimentary canal is a coiled tube that runs lengthwise through the body and is divided into three major sections; the anterior foregut (stomodeum), the midgut (mesenteron) and the posterior hindgut (proctoderm). The foregut begins at the mouth, includes the cibarium, pharynx, esophagus, crop and proventriculus. The foregut stores, grinds and transports food to the midgut. The crop is a storage organ and also serves as a site for digestion in others. The proventriculus is a triturating organ that grinds food into fine particles. A sphincter controls food and fluid movement from the foregut to the midgut. The midgut includes the ventriculus (stomach) from which gastric or midgut ceca may branch (blind sacs). The midgut is the main site of secretion of digestive enzymes, digestion of food and absorption of nutrients. Unlike all other organisms having a digestive system, the midgut environment of insects has an alkaline pH, typically between about 9 to about 12. Malpighian tubules, which are excretory organs, branch off the midgut. A sphincter controls food and fluid movement from the midgut to the hindgut. The hindgut includes the ileum, colon, and rectum and terminates at the anus. The hindgut absorbs water, salts, nutrients and other beneficial substances and eliminates the resulting waste product from the insect. The foregut and hindgut are invaginations of the epidermis and as such have cells covered by a cuticle, whereas in the midgut, cells are separated from the food by a film-like anatomical structure referred to as the peritrophic membrane that separates the luminal contents into two compartments: the endoperitrophic space and the ectoperitrophic space.

In addition to the alimentary canal, insects also have paired salivary glands and salivary reservoirs. These structures are associated with the foregut and are important in food intake and, depending on the insect, may assist in digestion. The salivary glands produce saliva which usually contains only amylase and maltase or no enzymes at all. Saliva released from the glands travels via ducts to the reservoirs and then into the mouth where it mixes with food.

The present specification discloses, in part, a hydrogel. A hydrogel is a three-dimensional crosslinked hydrophilic polymer network capable of absorbing large amounts of liquid from an aqueous environment while maintaining dimensional stability. Despite its high liquid absorbing capacity, a hydrogel swells to an equilibrium size instead of being dissolved in the aqueous environment. Its affinity to absorb liquid or hydrate while remaining insoluble is attributed to hydrophilic groups such as —OH, —CONH—, —$CONH_2$—, and —$SO_3H$ present in the polymers forming the hydrogel polymeric network. Due to the contribution of these groups and domains in the network, a hydrogel hydrates to different degrees. This swelling or hydration of a hydrogel is a phase transition between a tightly coiled state and an uncoiled expanded state of the polymer network. The ratio of the swollen volume of the expanded state to the dry volume of the tightly coiled state of the polymer network is referred to as the "degree of swelling." The degree of swelling is dependent on polymer composition and network architecture, as well as inherent properties of the aqueous environment such as temperature or ionic strength.

Crosslinks present in hydrogels are principally from two main categories: i) physical (entanglements or crystallites), and ii) chemical (tie-points and junctions). The crosslinks in the polymer network are provided by covalent bonds, hydrogen binding, van der Waals interactions, or physical entanglements. A cross-linking agent can be a chemical cross-linker or an ionotropic cross-linker. Non-limiting examples of a chemical cross-linker include formaldehyde, glutaraldehyde, N,N'-methylene bisacrylamide (MBAm), and 2,2-dimethoxy-2-phenylacetophenone (DMPA). Non-limiting examples of an ionotropic cross-linker include metal ions like calcium, iron and phosphorus.

A superporous hydrogel is a hydrogel having many pores that interconnect to form an open channel system that can absorb considerable amounts of liquid in a short period of time due to capillary force. Mean pore diameters are typically on the micrometer to millimeter scale. A superporous hydrogel, like a polyacrylate superporous hydrogel, typically reaches the equilibrium swollen state within minutes, regardless of its size in the dried state or the size of the final swollen state and can absorb several hundred times its own weight in liquid. The unique property of size independent fast swelling kinetics of a superporous hydrogel is accounted for by their interconnected open cellular structure. The open porous structure allows extremely fast absorption of a liquid into the center of the dried matrix by capillary force. A superporous hydrogel can be made by preparing hydrogels (usually from polymerizable monomers) in the presence of dispersed water-soluble porogens, which can be removed later by washing with water to leave an interconnected network (i.e., porous hydrogels), see, e.g., U.S. Pat. No. 6,217,278; Oxley, H. R. et al., 1993; Krauch, C. H. et al., 1968, each of which is incorporated by reference in its entirety. Examples of effective porogens are micronized sucrose, lactose and/or dextrin, sodium chloride, and poly (ethylene oxides) (PEGs), see, e.g., U.S. Pat. No. 6,217,278; Oxley, H. et al., 1993; Kon, M. et al., 1981; Badiger, M. et al., 1993, each of which is incorporated by reference in its entirety.

Currently, a superporous hydrogel can be categorized as a first generation conventional superporous hydrogel (SPH), a second generation superporous hydrogel composite (SPHC) or a third generation superporous hydrogel hybrid (SPHH). A first generation superporous hydrogel, or conventional superporous hydrogel, is characterized by fast swelling, high swelling ratio and weak mechanical properties. The most commonly used monomers for synthesis of a SPH include highly hydrophilic acrylamide, salts of acrylic acid and sulfopropyl acrylate.

A second-generation superporous hydrogel, or superporous hydrogel composite, utilizes the same monomer, crosslinker and initiating systems used in a SPH, but further includes a matrix-swelling additive or a composite agent as a swellable filler. Examples of composite agents include, without limitation, crosslinked carboxy methylcellulose, crosslinked primojel and crospovidone, carbopol and polyvinyl alcohol. Upon drying, an interpenetrated network structure (IPN) is formed. A composite agent used in SPHC is a cross-linked water-absorbent hydrophilic polymer that can absorb the solution of monomer, cross-linker, initiator and remaining components of the SPHC synthesis. Upon polymerization, the composite agent serves as the local point of physical cross-linking (or entanglement) of the formed polymer chains. During the polymerization process, each composite agent particle acts as an isolated individual reactor in which cross-linking polymerization occurs. As the cross-linking polymerization proceeds throughout the solution, individual swollen composite agent particles are connected together through polymer chains connecting them. A SPHC is characterized by fast swelling and medium swelling ratio. In addition, the presence of composite agent results in improved mechanical properties over conventional superporous hydrogel (i.e., the first generation). However, while this modification results in a higher modulus polymer network in the swollen state, a SPHC is brittle and thus susceptible to fracture or breakage upon application of stress.

A third-generation superporous hydrogel, or superporous hydrogel hybrid, is characterized by possessing elastic properties. Unlike a superporous hydrogel composite (i.e., second generation) where a pre-cross-linked matrix-swelling additive is added, a SPHH is prepared by adding a hybrid agent that can be cross-linked after hydrogel formation. The hybrid agent is a water-soluble or water-dispersible polymer that can form crosslinked structure (in a manner similar to forming an interpenetrating network) through chemical or physical cross-linking. Examples of hybrid agents include, without limitation, polysaccharides including alginate, carboxy methylcellulose, pectin, chitosan or synthetic water-soluble hydrophilic polymers such as poly(vinyl alcohol). Once the second network is formed, the whole system becomes similar to an interpenetrating polymer network. An example of a SPHH is the synthesis of acrylamide-based superporous hydrogel in the presence of sodium alginate, followed by the cross-linking of alginate chains by calcium ions. One of the unique properties of a SPHH is that the gel is highly elastic in the swollen state. As compared with a SPH and a SPHC, a SPHH is not easily fractured when stretched. Thus, a SPHH can resist various types of stresses, including tension, compression, bending and twisting.

Superporous hydrogels can be prepared using standard techniques including, without limitation, freeze-drying, gas blowing, porosigen, porogenation microemulsion, phase separation, emulsion-templating synthesis, cross-linking, and particulate leaching. See, e.g., U.S. Pat. Nos. 6,271,278; 7,291,674; Omidian, et al., Recent Developments in Superporous Hydrogels, J. Pharm. Pharmacol. 59(3): 317-327 (2007); Omidian, et al., Advances in Superporous Hydrogels, J. Control. Release 102(1): 3-12 (2005); Ahmed, et al., A Conceptual Overview on Superporous Hydrogels, Int. J. Pharm. Sci. Rev. Res. 25(2): 166-173 (2014); Ahemd, Hydrogel: Preparation, Characterization and Applications: A Review, J. Adv. Res. 6: 105-121 (2015), each of which is hereby incorporated by reference in its entirety.

A stimulus-responsive hydrogel (also known as "smart", "intelligent" or "biomimetic" hydrogel) is a hydrogel where absorption of liquid is triggered due to a specific stimulus present in an aqueous environment. Upon exposure to even minute amounts of this external stimuli, the cross-linked polymer network undergoes a quick volume phase transition that enables the stimulus-responsive hydrogel to rapidly absorb liquid from an aqueous environment. The swelling response is reversible as removal of the external stimuli reverses the phase transition state causing rapid de-swelling of the hydrogel. Hydrogels have been developed with stimulus-responsive properties to many different physical or chemical stimuli, including, without limitation, pH, light, temperature, ion concentration, solvent concentration, electric field strength, magnetic field strength, mechanical, pressure, a carbohydrate, an antigen, or any combination thereof. A stimulus-responsive hydrogel can also be prepared as a superporous hydrogel, such as, e.g., a conventional SPH, a SPHC or a SPHH.

A pH-responsive hydrogel is a polyelectrolyte complex composed of pH-responsive polymers comprising weak acidic groups (e.g. carboxylic acids and/or sulfonic acids) that release protons and/or pH-responsive polymers comprising weak basic groups (e.g. amines) that accept protons in response to changes in environmental pH. The polymer backbone provides a mechanical stability of a pH-responsive hydrogel whereas the ionizable groups contribute to the pH sensitivity. A pH-responsive polymer comprising weak acidic groups is referred to as a polyacidic polymer while a pH-responsive polymer comprising weak basic groups is referred to as a polybasic polymer. A pH-responsive hydrogel can also be prepared as a superporous hydrogel, such as, e.g., a conventional SPH, a SPHC or a SPHH.

The pendant acidic or basic groups on pH-responsive polymers undergo ionization just like acidic or basic groups of monoacids or monobases. However, complete ionization on pH-responsive polymers is more difficult due to electrostatic effects exerted by other adjacent ionized groups. This makes the apparent dissociation constant (Ka) different from that of the corresponding monoacid or monobase. Polyacidic polymers will be unswollen at low or acidic pH, since the acidic groups will be protonated and unionized. Thus, a polyacidic polymer will swell as the pH increases since the ionization of the acidic groups will increase. Polybasic polymers will be unswollen at high or basic pH, since the basic groups will be protonated and unionized. Thus, a polybasic polymer will swell as the pH decreases since the ionization of the basic groups will increase.

Acidic pH-responsive polymers or polyacidic polymers include, without limitation, poly(carboxylic acids), poly (sulfonamides), poly(acrylates), acrylamide (AAm), poly (acrylamide) (PAAm), acrylic acid (AA), poly(acrylic acid) (PAA), poly(ethacrylic acid) (PEAA), poly(propylacrylic acid) (PPAA), poly(acrylonitrile) (PAN), methacrylic acid (MAA), methacrylic acid poly(ethyleneglycol) methyl ether methacrylate (MAPEGMEM), poly(methacrylic acid) (PMAA), 2-hydroxyethyl methacrylate (HEMA), 2-hydroxypropyl acrylate (HPA), poly(L-lactic acid) (PLLA), 3,3-dimethyl-3-silapentamethylene (also known as poly(silamine)), alginate, a linear polysaccharide of β-(1,4)-linked-D-mannuronic acid and α-(1,4)-linked-L-gluronic acid monomer units; carrageenan, a linear polysaccharide of repeating β-(1,3_-linked-D-galactophyranosyl and α-(1,4)-linked 3,6-anhydro-D-galactophyranosyl disaccharide units; hyaluronic acid (HA), a linear anionic glycosaminoglycan of repeating β-(1,3)- and β-(1,4)-linked-D-glucuronic acid disaccharide units and N-acetyl β-D-glucosamine; and xanthan gum, a polysaccharide of pentasaccharide repeat units comprising glucose, mannose, and glucuronic acid in the molar ratio 2:2:1.

Basic pH-responsive polymers or polybasic polymers include, without limitation, poly(vinylpyrrolidine) (PVP), poly(vinylamine) (PVAm), poly(vinyl-immidazole) (PVI), poly(ethyleneimine) (PEI), poly(propyleneimine) (PPEI), poly(L-lysine) (PLL), N,N'-diethylethylenediamine (DEEDA), N,N-dimethylaminoethyl methacrylate (DMAEMA), poly(N,N-diakylaminoethylmethacrylate) (PAAEMA), poly(N,N-dimethylaminoethylmethacrylate) (PDMAEMA), poly(N,N-diethylaminoethylmethacrylate) (PDEAEMA), poly(ethylene glycol) (PEG), poly(ethylene glycol)dimethacrylate (PEGDMA), poly(ethylene glycol) methyl ether methacrylate (PEGMEMA), poly(aminosaccharide) and chitosan (Ch), a linear copolymer of β-(1,4)-linked 2-acetamido-2-deoxy-β-D-glucopyranose and 2-amino-2-deoxy-β-D-glucopyranose.

A pH-responsive hydrogel comprising polyacidic and/or polybasic polymers undergoes ionization at specific pH called the net pKa. By generating charge along the polymer backbone a net pKa value is reached. At this point, acidic groups become ionized to a threshold degree that triggers rapid, reversible phase transition between a tightly coiled state and an uncoiled expanded state of the polymer network due to the electrostatic repulsion of the negatively charged groups. The phase transition to an expanded state increases the hydrodynamic volume of the hydrogel and can be mediated by changes in the osmotic pressure exerted by mobile counterions neutralizing the charges of the polymers. This phase transitional state change is generally influenced by any conditions that modify electrostatic repulsion, such as pH, ionic strength, and type of counterions.

The pH range that triggers the reversible phase transition of a pH-responsive hydrogel can be modulated by 1) the hydrophobicity of the polymer backbone; 2) the pKa of the specific ionizable groups, 3) the specific polyacidic and polybasic polymers used, 4) the ratio of polyacidic and polybasic polymers used, 5) crosslinking parameters including crosslinking density and charge of crosslinking agents, 6) incorporation of hydrophobic moieties into the polymer backbone and/or 7) incorporation of ionizable moieties into the polymer backbone. Non-limiting examples of pH-responsive hydrogels include PAA-PVA (pH range of 2.5-11), PAAm-PCCA (pH range of pH 4.3-8.5), PHEMA-co-MAA (pH range of pH 5-7), PMAA-PEGDMA (pH range of pH 6-7), HEMA-DMAEMA (pH range of pH 7-8), AAm-DMAEMA (pH range of pH 6-9) and PAA-PEG (pH range from 8-12). Other pH-response hydrogels include, without limitation PAAm-AA, PMA-AAm, PAN-chitosan, k-carrageenan-chitosan, dextran sulfate-chitosan, MAA-PEGMEMA, MAA-PEGDMA, PMAA-PEGMEMA, PMAA-PEGDMA, PMAA-PEG, PAA-PEGMEMA, PAA-PEGDMA, PAA-alginate, PAN-alginate, PVA-alginate, poly(histidine)-β-PEG and poly(L-lactic acid)-β-PEG. Thus, a pH-responsive hydrogel can be created to exhibit pH-responsive swelling in a specific pH range, e.g., alkaline pH-responsive hydrogel or acidic pH-responsive hydrogel. pH-responsive hydrogels are described in, e.g., Dai, et al., *pH-Responsive Polymers: Synthesis, Properties and Applications*, Soft Matter 4: 435-449 (2008); Almeida, et al., *Temperature and pH Stimuli-Responsive Polymers and their Applications in Controlled and Self-Regulated Drug Delivery*, J. App. Pharma. Sci. 2(6):1-10(2010); Reyes-Ortega, *pH-Responsive Polymers: Properties, Synthesis and Applications*, pp. 45-92 in SMART POLYMERS AND THEIR APPLICATIONS (2014); Kawamura and Miyata, *pH-Responsive Polymer*, pp. 1619-1629 in ENCYCLOPEDIA OF POLYMERIC NANOMATERIALS (2015), each of which is hereby incorporated by reference in its entirety.

In one embodiment, a hydrogel disclosed herein is a stimulus-responsive hydrogel. In aspect of this embodiment, a stimulus-responsive hydrogel is a stimulus-responsive superporous hydrogel, such as, e.g., a stimulus-responsive conventional superporous hydrogel, a stimulus-responsive superporous hydrogel composite or a stimulus-responsive superporous hydrogel hybrid.

In another embodiment, a hydrogel disclosed herein is a pH-responsive hydrogel. In aspect of this embodiment, a pH-responsive hydrogel is a pH-responsive superporous hydrogel, such as, e.g., a pH-responsive conventional superporous hydrogel, a pH-responsive superporous hydrogel composite or a pH-responsive superporous hydrogel hybrid.

A pH-responsive superporous hydrogel composite is a hydrogel that in addition to one or more pH-responsive polymers further comprises a pre-cross-linked matrix-swelling additive (or superdisintegrant).

A pH-responsive superporous hydrogel hybrid is a hydrogel that in addition to one or more pH-responsive polymers further comprises a hybrid agent.

In another embodiment, a hydrogel disclosed herein is an alkaline a pH-responsive hydrogel. In aspect of this embodiment, an alkaline pH-responsive hydrogel is an alkaline pH-responsive superporous hydrogel, such as, e.g., an alkaline pH-responsive conventional superporous hydrogel, an alkaline pH-responsive superporous hydrogel composite or an alkaline pH-responsive superporous hydrogel hybrid. In other aspects of this embodiment, an alkaline pH-responsive superporous hydrogel has a pH-responsive threshold of, e.g., a pH of 8.0 or higher, a pH of 8.5 or higher, a pH of 9.0 or higher, a pH of 9.5 or higher or a pH of 10 or higher. In other aspects of this embodiment, an alkaline pH-responsive superporous hydrogel has a pH-responsive threshold is in a pH range of, e.g., 8 to 10, 8 to 11, 8 to 12, 8 to 13, 8.5 to 10, 8.5 to 11, 8.5 to 12, 8.5 to 13, 9 to 10, 9 to 11, 9 to 12, 9 to 13, 9.5 to 10, 9.5 to 11, 9.5 to 12 or 9.5 to 13.

In another embodiment, a hydrogel disclosed herein is an acidic a pH-responsive hydrogel. In aspect of this embodiment, an acidic pH-responsive hydrogel is an acidic pH-responsive superporous hydrogel, such as, e.g., an acidic pH-responsive conventional superporous hydrogel, an acidic pH-responsive superporous hydrogel composite or an acidic pH-responsive superporous hydrogel hybrid. In other aspects of this embodiment, an acidic pH-responsive superporous hydrogel has a pH-responsive threshold of, e.g., a pH of 6.0 or lower, a pH of 5.5 or lower, a pH of 5.0 or lower, a pH of 4.5 or lower or a pH of 4 or lower. In other aspects of this embodiment, an alkaline pH-responsive superporous hydrogel has a pH-responsive threshold is in a pH range of, e.g., 2 to 4, 2 to 4.5, 2 to 5, 2 to 5.5, 2 to 6, 2.5 to 4, 2.5 to 4.5, 2.5 to 5, 2.5 to 5.5, 2.5 to 6, 3 to 4, 3 to 4.5, 3 to 5, 3 to 5.5, 3 to 6 or 4 to 6.

Examples of pH-responsive superporous hydrogels include, without limitations poly(acrylate)-based superporous hydrogels, poly(acrylic acid)-based superporous hydrogels, polyampholitic-based superporous hydrogels, chitosan-based superporous hydrogels.

In one embodiment, an alkaline pH-responsive superporous hydrogel comprises an acidic polymer comprising poly(acrylate). In aspects of this embodiment, an alkaline pH-responsive superporous hydrogel comprising poly(acrylate) has a pH-responsive threshold of, e.g., a pH of 8.0 or higher, a pH of 8.5 or higher, a pH of 9.0 or higher, a pH of 9.5 or higher or a pH of 10 or higher. In aspects of this embodiment, an alkaline pH-responsive superporous hydrogel comprising poly(acrylate) has a pH-responsive threshold is in a pH range of, e.g., 8 to 10, 8 to 11, 8 to 12, 8 to 13, 8.5 to 10, 8.5 to 11, 8.5 to 12, 8.5 to 13, 9 to 10, 9 to 11, 9 to 12, 9 to 13, 9.5 to 10, 9.5 to 11, 9.5 to 12 or 9.5 to 13.

In one embodiment, an alkaline pH-responsive superporous hydrogel comprises an acidic polymer comprising poly(acrylic acid) and a basic polymer comprising poly(ethylene glycol) or a PAA-PEG copolymer. In aspects of this embodiment, an alkaline pH-responsive superporous hydrogel comprising a PAA-PEG copolymer has a pH-responsive threshold of, e.g., a pH of 8.0 or higher, a pH of 8.5 or higher, a pH of 9.0 or higher, a pH of 9.5 or higher or a pH of 10 or higher. In aspects of this embodiment, an alkaline pH-responsive superporous hydrogel comprising a PAA-PEG copolymer has a pH-responsive threshold is in a pH range of, e.g., 8 to 10, 8 to 11, 8 to 12, 8 to 13, 8.5 to 10, 8.5 to 11, 8.5 to 12, 8.5 to 13, 9 to 10, 9 to 11, 9 to 12, 9 to 13, 9.5 to 10, 9.5 to 11, 9.5 to 12 or 9.5 to 13. In another aspect of this embodiment, an alkaline pH-responsive superporous hydrogel comprising a PAA-PEG copolymer is the commercial product AQUAGEL®, an alkaline pH-responsive superporous hydrogel of poly(acrylic acid) and poly(ethylene glycol) (PAA-PEG) copolymers.

In one embodiment, an alkaline pH-responsive superporous hydrogel comprises acidic polymers comprising acrylic acid (AA) and 2-hydroxyethyl methacrylate (HEMA) and a basic polymer comprising ethylene glycol dimethacrylate (EGDMA) or a poly(AA-HEMA-EGDMA) copolymer. In aspects of this embodiment, an alkaline pH-responsive superporous hydrogel comprising a poly(AA-HEMA-EGDMA) copolymer has a pH-responsive threshold of, e.g., a pH of 8.0 or higher, a pH of 8.5 or higher, a pH of 9.0 or higher, a pH of 9.5 or higher or a pH of 10 or higher. In aspects of this embodiment, an alkaline pH-responsive superporous hydrogel comprising a poly(AA-HEMA-EGDMA) copolymer has a pH-responsive threshold is in a pH range of, e.g., 8 to 10, 8 to 11, 8 to 12, 8 to 13, 8.5 to 10, 8.5 to 11, 8.5 to 12, 8.5 to 13, 9 to 10, 9 to 11, 9 to 12, 9 to 13, 9.5 to 10, 9.5 to 11, 9.5 to 12 or 9.5 to 13. In an aspect of this embodiment, poly(AA-HEMA-EGDMA-DMPA) copolymer is in a ratio of about 4:29:0.3 AA:HEMA:EGDMA.

In one embodiment, an alkaline pH-responsive superporous hydrogel comprises an acidic polymer comprising k-carrageenan having sulfate groups and a basic polymer comprising chitosan having amino groups, or a k-carrageenan-chitosan copolymer. In aspects of this embodiment, an alkaline pH-responsive superporous hydrogel comprising a k-carrageenan-chitosan copolymer has a pH-responsive threshold of, e.g., a pH of 8.0 or higher, a pH of 8.5 or higher, a pH of 9.0 or higher, a pH of 9.5 or higher or a pH of 10 or higher. In aspects of this embodiment, an alkaline pH-responsive superporous hydrogel comprising a k-carrageenan-chitosan copolymer has a pH-responsive threshold is in a pH range of, e.g., 8 to 10, 8 to 11, 8 to 12, 8 to 13, 8.5 to 10, 8.5 to 11, 8.5 to 12, 8.5 to 13, 9 to 10, 9 to 11, 9 to 12, 9 to 13, 9.5 to 10, 9.5 to 11, 9.5 to 12 or 9.5 to 13.

In one embodiment, an alkaline pH-responsive superporous hydrogel comprises an acidic polymer comprising xanthan gum having carboxyl groups and a basic polymer comprising chitosan having amino groups, or a xanthan gum-chitosan copolymer. In aspects of this embodiment, an alkaline pH-responsive superporous hydrogel comprising a xanthan gum-chitosan copolymer has a pH-responsive threshold of, e.g., a pH of 8.0 or higher, a pH of 8.5 or higher, a pH of 9.0 or higher, a pH of 9.5 or higher or a pH of 10 or higher. In aspects of this embodiment, an alkaline pH-responsive superporous hydrogel comprising a xanthan gum-chitosan copolymer has a pH-responsive threshold is in a pH range of, e.g., 8 to 10, 8 to 11, 8 to 12, 8 to 13, 8.5 to 10, 8.5 to 11, 8.5 to 12, 8.5 to 13, 9 to 10, 9 to 11, 9 to 12, 9 to 13, 9.5 to 10, 9.5 to 11, 9.5 to 12 or 9.5 to 13.

A change in the phase transition from a tightly coiled state to an uncoiled expanded state of the polymer network causes a hydrogel disclosed herein to swell or hydrate. The phase transition change can be measured based on the degree of swelling or the absorptive capacity of a hydrogel disclosed herein.

The degree of swelling of a hydrogel disclosed herein can be calculated as 1) the ratio of the swollen weight of the expanded state to the dry weight of the tightly coiled state of the polymer network of a hydrogel disclosed herein; or 2) the ratio of the swollen volume of the expanded state to the dry volume of the tightly coiled state of the polymer network of a hydrogel disclosed herein. A hydrogel disclosed herein includes a hydrogel particle disclosed herein or a hydrogel composition disclosed herein. The absorptive capacity of a hydrogel disclosed herein can be calculated as 1) the percent change by weight between the expanded state and the tightly coiled state of the polymer network of a hydrogel disclosed herein; or 2) the percent change by volume between the expanded state and the tightly coiled state of the polymer network of a hydrogel disclosed herein.

In aspects of this embodiment, a degree of swelling achieved by a hydrogel disclosed herein during a phase transition into the expanded state can be, e.g. at least 10 times, at least 20 times, at least 30 times, at least 40 times, at least 50 times, at least 60 times, at least 70 times, at least 80 times, at least 90 times, at least 100 times, at least 125 times, at least 150 times, at least 175 times, at least 200 times, at least 225 times, at least 250 times, at least 275 times, at least 300 times, at least 325 times, at least 350 times, at least 375 times or at least 400 times by weight. In other aspects of this embodiment, a degree of swelling achieved by a hydrogel disclosed herein during a phase transition into the expanded state can be, e.g. at most 10 times, at most 20 times, at most 30 times, at most 40 times, at most 50 times, at most 60 times, at most 70 times, at most 80 times, at most 90 times, at most 100 times, at most 125 times, at most 150 times, at most 175 times, at most 200 times, at most 225 times, at most 250 times, at most 275 times, at most 300 times, at most 325 times, at most 350 times, at most 375 times or at most 400 times by weight. In other aspects of this embodiment, a degree of swelling achieved by a hydrogel disclosed herein during a phase transition into the expanded state can be between, e.g. 10 times to 25 times, 10 times to 50 times, 10 times to 75 times, 10 times to 100 times, 10 times to 125 times, 10 times to 150 times, 10 times to 175 times, 10 times to 200 times, 10 times to 225 times, 10 times to 250 times, 10 times to 275 times, 10 times to 300 times, 25 times to 50 times, 25 times to 75 times, 25 times to 100 times, 25 times to 125 times, 25 times to 150 times, 25 times to 175 times, 25 times to 200 times, 25 times to 225 times, 25 times to 250 times, 25 times to 275 times, 25 times to 300 times, 50 times to 75 times, 50 times to 100 times, 50 times to 125 times, 50 times to 150 times, 50 times to 175 times, 50 times to 200 times, 50 times to 225 times, 50 times to 250 times, 50 times to 275 times, 50 times to 300 times, 75 times to 100 times, 75 times to 125 times, 75 times to 150 times, 75 times to 175 times, 75 times to 200 times, 75 times to 225 times, 75 times to 250 times, 75 times to 275 times, 75 times to 300 times, 100 times to 125 times, 100 times to 150 times, 100 times to 175 times, 100 times to 200 times, 100 times to 225 times, 100 times to 250 times, 100 times to 275 times, 100 times to 300 times, 100 times to 325 times, 100 times to 350 times, 100 times to 375 times, 100 times to 400 times, 125 times to 150 times, 125 times to 175 times, 125 times to 200 times, 125 times to 225 times, 125 times to 250 times, 125 times to 275 times, 125 times to 300 times, 125 times to 325 times, 125 times to 350 times, 125 times to 375 times, 125 times to 400 times, 150 times to 175 times, 150 times to 200 times, 150 times to 225 times, 150 times to 250 times, 150 times to 275 times, 150 times to 300 times, 150 times to 325 times, 150 times to 350 times, 150 times to 375 times, 150 times to 400 times, 175 times to 200 times, 175 times to 225 times, 175 times to 250 times, 175 times to 275 times, 175 times to 300 times, 175 times to 325 times, 175 times to 350 times, 175 times to 375 times, 175 times to 400 times, 200 times to 225 times, 200 times to 250 times, 200 times to 275 times, 200 times to 300 times, 200 times to 325 times, 200 times to 350 times, 200 times to 375 times, 200 times to 400 times, 225 times to 250 times, 225 times to 275 times, 225 times to 300 times, 225 times to 325 times, 225 times to 350 times, 225 times to 375 times, 225 times to 400 times, 250 times to 275 times, 250 times to 300 times, 275 times to 300 times, 275 times to 325 times, 275 times to 350 times, 275 times to 375 times, 275 times to 400 times, 300 times to 325 times, 300 times to 350 times, 300 times to 375 times, or 300 times to 400 times by weight.

In aspects of this embodiment, a degree of swelling achieved by a hydrogel disclosed herein during a phase transition into the expanded state can be, e.g. at least 10 times, at least 20 times, at least 30 times, at least 40 times, at least 50 times, at least 60 times, at least 70 times, at least 80 times, at least 90 times, at least 100 times, at least 125 times, at least 150 times, at least 175 times, at least 200 times, at least 225 times, at least 250 times, at least 275 times, at least 300 times, at least 325 times, at least 350 times, at least 375 times or at least 400 times by volume. In other aspects of this embodiment, a degree of swelling achieved by a hydrogel disclosed herein during a phase transition into the expanded state can be, e.g. at most 10 times, at most 20 times, at most 30 times, at most 40 times, at most 50 times, at most 60 times, at most 70 times, at most 80 times, at most 90 times, at most 100 times, at most 125 times, at most 150 times, at most 175 times, at most 200 times, at most 225 times, at most 250 times, at most 275 times, at most 300 times, at most 325 times, at most 350 times, at most 375 times or at most 400 times by volume. In other aspects of this embodiment, a degree of swelling achieved by a hydrogel disclosed herein during a phase transition into the expanded state can be between, e.g. 10 times to 25 times, 10 times to 50 times, 10 times to 75 times, 10 times to 100 times, 10 times to 125 times, 10 times to 150 times, 10 times to 175 times, 10 times to 200 times, 10 times to 225 times, 10 times to 250 times, 10 times to 275 times, 10 times to 300 times, 25 times to 50 times, 25 times to 75 times, 25 times to 100 times, 25 times to 125 times, 25 times to 150 times, 25 times to 175 times, 25 times to 200 times, 25 times to 225 times, 25 times to 250 times, 25 times to 275 times, 25 times to 300 times, 50 times to 75 times, 50 times to 100 times, 50 times to 125 times, 50 times to 150 times, 50 times to 175 times, 50 times to 200 times, 50 times to 225 times, 50 times to 250 times, 50 times to 275 times, 50 times to 300 times, 75 times to 100 times, 75 times to 125 times, 75 times to 150 times, 75 times to 175 times, 75 times to 200 times, 75 times to 225 times, 75 times to 250 times, 75 times to 275 times, 75 times to 300 times, 100 times to 125 times, 100 times to 150 times, 100 times to 175 times, 100 times to 200 times, 100 times to 225 times, 100 times to 250 times, 100 times to 275 times, 100 times to 300 times, 100 times to 325 times, 100 times to 350 times, 100 times to 375 times, 100 times to 400 times, 125 times to 150 times, 125 times to 175 times, 125 times to 200 times, 125 times to 225 times, 125 times to 250 times, 125 times to 275 times, 125 times to 300 times, 125 times to 325 times, 125 times to 350 times, 125 times to 375 times, 125 times to 400 times, 150 times to 175 times, 150 times to 200 times, 150 times to 225 times, 150 times to 250 times, 150 times to 275 times, 150 times to 300 times, 150 times to 325 times, 150 times to 350 times, 150 times to 375 times, 150 times to 400 times, 175 times to 200 times, 175 times to 225 times, 175 times to 250 times, 175 times to 275 times, 175 times to 300 times, 175 times to 325 times, 175 times to 350 times, 175 times to 375 times, 175 times to 400 times, 200 times to 225 times, 200 times to 250 times, 200 times to 275 times, 200 times to 300 times, 200 times to 325 times, 200 times to 350 times, 200 times to 375 times, 200 times to 400 times, 225 times to 250 times, 225 times to 275 times, 225 times to 300 times, 225 times to 325 times, 225 times to 350 times, 225 times to 375 times, 225 times to 400 times, 250 times to 275 times, 250 times to 300 times, 275 times to 300 times, 275 times to 325 times, 275 times to 350 times, 275 times to 375 times, 275 times to 400 times, 300 times to 325 times, 300 times to 350 times, 300 times to 375 times, or 300 times to 400 times by volume.

In aspects of this embodiment, an absorptive capacity achieved by a hydrogel disclosed herein during a phase transition into the expanded state can be, e.g., at least 30%, at least 40%, at least 50%, at least 60%, at least 70%, at least 75%, at least 80%, at least 90% or at least 95% by weight. In other aspects of this embodiment, an absorptive capacity achieved by a hydrogel disclosed herein during a phase transition into the expanded state can be, e.g., at most 30%, at most 40%, at most 50%, at most 60%, at most 70%, at most 75%, at most 80%, at most 90% or at most 95% by weight. In yet other aspects of this embodiment, an absorptive capacity achieved by a hydrogel disclosed herein during a phase transition into the expanded state can be between, e.g., 25% to 50%, 25% to 75%, 25% to 100% 50% to 75%, 50% to 100% or 75% to 100% by weight.

In aspects of this embodiment, an absorptive capacity achieved by a hydrogel disclosed herein during a phase transition into the expanded state can be, e.g., at least 30%, at least 40%, at least 50%, at least 60%, at least 70%, at least 75%, at least 80%, at least 90% or at least 95% by volume. In other aspects of this embodiment, an absorptive capacity achieved by a hydrogel disclosed herein during a phase transition into the expanded state can be, e.g., at most 30%, at most 40%, at most 50%, at most 60%, at most 70%, at most 75%, at most 80%, at most 90% or at most 95% by volume. In yet other aspects of this embodiment, an absorptive capacity achieved by a hydrogel disclosed herein during a phase transition into the expanded state can be between, e.g., 25% to 50%, 25% to 75%, 25% to 100% 50% to 75%, 50% to 100% or 75% to 100% by volume.

In aspects of this embodiment, at least 50%, at least 60%, at least 70%, at least 75%, at least 80%, at least 90% or at least 95% of one or more hydrogel particles disclosed herein achieve an absorptive capacity of, e.g., at least 30%, at least 40%, at least 50%, at least 60%, at least 70%, at least 75%, at least 80%, at least 90% or at least 95% by weight. In other aspects of this embodiment, at least 50%, at least 60%, at least 70%, at least 75%, at least 80%, at least 90% or at least 95% of one or more hydrogel particles disclosed herein achieve an absorptive capacity of, e.g., at most 30%, at most 40%, at most 50%, at most 60%, at most 70%, at most 75%, at most 80%, at most 90% or at most 95% by weight. In other aspects of this embodiment, at least 50%, at least 60%, at least 70%, at least 75%, at least 80%, at least 90% or at least 95% of one or more hydrogel particles disclosed herein achieve an absorptive capacity of between, e.g., 25% to 50%, 25% to 75%, 25% to 100% 50% to 75%, 50% to 100% or 75% to 100% by weight.

In aspects of this embodiment, at least 50%, at least 60%, at least 70%, at least 75%, at least 80%, at least 90% or at least 95% of one or more hydrogel particles disclosed herein achieve an absorptive capacity of, e.g., at least 30%, at least 40%, at least 50%, at least 60%, at least 70%, at least 75%, at least 80%, at least 90% or at least 95% by volume. In other aspects of this embodiment, at least 50%, at least 60%, at least 70%, at least 75%, at least 80%, at least 90% or at least 95% of one or more hydrogel particles disclosed herein achieve an absorptive capacity of, e.g., at most 30%, at most 40%, at most 50%, at most 60%, at most 70%, at most 75%, at most 80%, at most 90% or at most 95% by volume. In other aspects of this embodiment, at least 50%, at least 60%, at least 70%, at least 75%, at least 80%, at least 90% or at least 95% of one or more hydrogel particles disclosed herein achieve an absorptive capacity of between, e.g., 25% to 50%, 25% to 75%, 25% to 100% 50% to 75%, 50% to 100% or 75% to 100% by volume.

The degree of swelling or absorptive capacity achieved by a hydrogel disclosed herein during a phase transition into the expanded state can also occur with a specified time period after exposure to the appropriate external stimulus. In aspects of this embodiment, an external stimulus can be, e.g., a physical stimulus, a chemical stimulus, or a combination thereof. In other aspects of this embodiment, an external stimulus can be, e.g., a pH value, a light intensity, a temperature, an ion concentration, a solvent concentration, an electric field strength, a magnetic field strength, a mechanical, pressure, a carbohydrate, an antigen, or any combination thereof.

In other aspects of this embodiment, a pH value is an alkaline pH or an acidic pH. In yet other aspects of this embodiment, an alkaline pH value can be, e.g., a pH of 8.0 or higher, a pH of 8.5 or higher, a pH of 9.0 or higher, a pH of 9.5 or higher or a pH of 10 or higher. In still other aspects of this embodiment, an alkaline pH value can be between, e.g., 8 to 10, 8 to 11, 8 to 12, 8 to 13, 8.5 to 10, 8.5 to 11, 8.5 to 12, 8.5 to 13, 9 to 10, 9 to 11, 9 to 12, 9 to 13, 9.5 to 10, 9.5 to 11, 9.5 to 12 or 9.5 to 13. In yet other aspects of this embodiment, an acidic pH value can be, e.g., a pH of 6.0 or lower, a pH of 5.5 or lower, a pH of 5.0 or lower, a pH of 4.5 or lower or a pH of 4 or lower. In still other aspects of this embodiment, an acidic pH value can be between, e.g., 2 to 4, 2 to 4.5, 2 to 5, 2 to 5.5, 2 to 6, 2.5 to 4, 2.5 to 4.5, 2.5 to 5, 2.5 to 5.5, 2.5 to 6, 3 to 4, 3 to 4.5, 3 to 5, 3 to 5.5, 3 to 6 or 4 to 6.

In aspects of this embodiment, a degree of swelling achieved by a hydrogel disclosed herein during a phase transition into the expanded state can occur in, e.g., at most 1 minute, at most 2 minutes, at most 3 minutes, at most 4 minutes, at most 5 minutes, at most 6 minutes, at most 7 minutes, at most 8 minutes, at most 9 minutes, at most 10 minutes, at most 15 minutes, at most 20 minutes, at most 25 minutes or at most 30 minutes after exposure to the appropriate external stimulus. In aspects of this embodiment, a degree of swelling achieved by a hydrogel disclosed herein during a phase transition into the expanded state can occur in, e.g., 1 minute to 2 minutes, 1 minute to 3 minutes, 1 minute to 4 minutes, 1 minute to 5 minutes, 1 minute to 6 minutes, 1 minute to 7 minutes, 1 minute to 8 minutes, 1 minute to 9 minutes, 1 minute to 10 minutes, 1 minute to 15 minutes, 1 minute to 20 minutes, 1 minute to 25 minutes, 1 minute to 30 minutes, 2 minutes to 3 minutes, 2 minutes to 4 minutes, 2 minutes to 5 minutes, 2 minutes to 6 minutes, 2 minutes to 7 minutes, 2 minutes to 8 minutes, 2 minutes to 9 minutes, 2 minutes to 10 minutes, 2 minutes to 15 minutes, 2 minutes to 20 minutes, 2 minutes to 25 minutes, 2 minutes to 30 minutes, 3 minutes to 4 minutes, 3 minutes to 5 minutes, 3 minutes to 6 minutes, 3 minutes to 7 minutes, 3 minutes to 8 minutes, 3 minutes to 9 minutes, 3 minutes to 10 minutes, 3 minutes to 15 minutes, 3 minutes to 20 minutes, 3 minutes to 25 minutes, 3 minutes to 30 minutes, 4 minutes to 5 minutes, 4 minutes to 6 minutes, 4 minutes to 7 minutes, 4 minutes to 8 minutes, 4 minutes to 9 minutes, 4 minutes to 10 minutes, 4 minutes to 15 minutes, 4 minutes to 20 minutes, 4 minutes to 25 minutes, 4 minutes to 30 minutes, 5 minutes to 6 minutes, 5 minutes to 7 minutes, 5 minutes to 8 minutes, 5 minutes to 9 minutes, 5 minutes to 10 minutes, 5 minutes to 15 minutes, 5 minutes to 20 minutes, 5 minutes to 25 minutes, 5 minutes to 30 minutes, 10 minutes to 15 minutes, 10 minutes to 20 minutes, 10 minutes to 25 minutes, 10 minutes to 30 minutes, 15 minutes to 20 minutes, 15 minutes to 25 minutes, 15 minutes to 30 minutes, 20 minutes to 25 minutes, 20 minutes to 30 minutes or 25 minutes to 30 minutes after exposure to the appropriate external stimulus.

In aspects of this embodiment, a degree of swelling achieved by a hydrogel disclosed herein during a phase transition into the expanded state can be, e.g., at least 10 times, at least 20 times, at least 30 times, at least 40 times, at least 50 times, at least 60 times, at least 70 times, at least 80 times, at least 90 times, at least 100 times, at least 125 times, at least 150 times, at least 175 times, at least 200 times, at least 225 times, at least 250 times, at least 275 times, at least 300 times, at least 325 times, at least 350 times, at least 375 times or at least 400 times by weight or volume and occurs in, e.g., at most 1 minute, at most 2 minutes, at most 3 minutes, at most 4 minutes, at most 5 minutes, at most 6 minutes, at most 7 minutes, at most 8 minutes, at most 9 minutes, at most 10 minutes, at most 15 minutes, at most 20 minutes, at most 25 minutes or at most 30 minutes after exposure to the appropriate external stimulus. In other aspects of this embodiment, a degree of swelling achieved by a hydrogel disclosed herein during a phase transition into the expanded state can be, e.g., at most 10 times, at most 20 times, at most 30 times, at most 40 times, at most 50 times, at most 60 times, at most 70 times, at most 80 times, at most 90 times, at most 100 times, at most 125 times, at most 150 times, at most 175 times, at most 200 times, at most 225 times, at most 250 times, at most 275 times, at most 300 times, at most 325 times, at most 350 times, at most 375 times or at most 400 times by weight or volume and occurs in, e.g., at most 1 minute, at most 2 minutes, at most 3 minutes, at most 4 minutes, at most 5 minutes, at most 6 minutes, at most 7 minutes, at most 8 minutes, at most 9 minutes, at most 10 minutes, at most 15 minutes, at most 20 minutes, at most 25 minutes or at most 30 minutes after exposure to the appropriate external stimulus. In yet other aspects of this embodiment, a degree of swelling achieved by a hydrogel disclosed herein during a phase transition into the expanded state can be between, e.g., 10 times to 25 times, 10 times to 50 times, 10 times to 75 times, 10 times to 100 times, 10 times to 125 times, 10 times to 150 times, 10 times to 175 times, 10 times to 200 times, 10 times to 225 times, 10 times to 250 times, 10 times to 275 times, 10 times to 300 times, 25 times to 50 times, 25 times to 75 times, 25 times to 100 times, 25 times to 125 times, 25 times to 150 times, 25 times to 175 times, 25 times to 200 times, 25 times to 225 times, 25 times to 250 times, 25 times to 275 times, 25 times to 300 times, 50 times to 75 times, 50 times to 100 times, 50 times to 125 times, 50 times to 150 times, 50 times to 175 times, 50 times to 200 times, 50 times to 225 times, 50 times to 250 times, 50 times to 275 times, 50 times to 300 times, 75 times to 100 times, 75 times to 125 times, 75 times to 150 times, 75 times to 175 times, 75 times to 200 times, 75 times to 225 times, 75 times to 250 times, 75 times to 275 times, 75 times to 300 times, 100 times to 125 times, 100 times to 150 times, 100 times to 175 times, 100 times to 200 times, 100 times to 225 times, 100 times to 250 times, 100 times to 275 times, 100 times to 300 times, 100 times to 325 times, 100 times to 350 times, 100 times to 375 times, 100 times to 400 times, 125 times to 150 times, 125 times to 175 times, 125 times to 200 times, 125 times to 225 times, 125 times to 250 times, 125 times to 275 times, 125 times to 300 times, 125 times to 325 times, 125 times to 350 times, 125 times to 375 times, 125 times to 400 times, 150 times to 175 times, 150 times to 200 times, 150 times to 225 times, 150 times to 250 times, 150 times to 275 times, 150 times to 300 times, 150 times to 325 times, 150 times to 350 times, 150 times to 375 times, 150 times to 400 times, 175 times to 200 times, 175 times to 225 times, 175 times to 250 times, 175 times to 275 times, 175 times to 300 times, 175 times to 325 times, 175 times to 350 times, 175 times to 375 times, 175 times to 400 times, 200 times to 225 times, 200 times to 250 times, 200 times to 275 times, 200 times to 300 times, 200 times to 325 times, 200 times to 350 times, 200 times to 375 times, 200 times to 400 times, 225 times to 250 times, 225 times to 275 times, 225 times to 300 times, 225 times to 325 times, 225 times to 350 times, 225 times to 375 times, 225 times to 400 times, 250 times to 275 times, 250 times to 300 times, 275 times to 300 times, 275 times to 325 times, 275 times to 350 times, 275 times to 375 times, 275 times to 400 times, 300 times to 325 times, 300 times to 350 times, 300 times to 375 times, or 300 times to 400 times by weight or volume and occurs in, e.g., at most 1 minute, at most 2 minutes, at most 3 minutes, at most 4 minutes, at most 5 minutes, at most 6 minutes, at most 7 minutes, at most 8 minutes, at most 9 minutes, at most 10 minutes, at most 15 minutes, at most 20 minutes, at most 25 minutes or at most 30 minutes after exposure to the appropriate external stimulus.

In aspects of this embodiment, a degree of swelling achieved by a hydrogel disclosed herein during a phase transition into the expanded state can be, e.g., at least 10 times, at least 20 times, at least 30 times, at least 40 times, at least 50 times, at least 60 times, at least 70 times, at least 80 times, at least 90 times, at least 100 times, at least 125 times, at least 150 times, at least 175 times, at least 200 times, at least 225 times, at least 250 times, at least 275 times, at least 300 times, at least 325 times, at least 350 times, at least 375 times or at least 400 times by weight or volume and occurs between, e.g., 1 minute to 2 minutes, 1 minute to 3 minutes, 1 minute to 4 minutes, 1 minute to 5 minutes, 1 minute to 6 minutes, 1 minute to 7 minutes, 1 minute to 8 minutes, 1 minute to 9 minutes, 1 minute to 10 minutes, 1 minute to 15 minutes, 1 minute to 20 minutes, 1 minute to 25 minutes, 1 minute to 30 minutes, 2 minutes to 3 minutes, 2 minutes to 4 minutes, 2 minutes to 5 minutes, 2 minutes to 6 minutes, 2 minutes to 7 minutes, 2 minutes to 8 minutes, 2 minutes to 9 minutes, 2 minutes to 10 minutes, 2 minutes to 15 minutes, 2 minutes to 20 minutes, 2 minutes to 25 minutes, 2 minutes to 30 minutes, 3 minutes to 4 minutes, 3 minutes to 5 minutes, 3 minutes to 6 minutes, 3 minutes to 7 minutes, 3 minutes to 8 minutes, 3 minutes to 9 minutes, 3 minutes to 10 minutes, 3 minutes to 15 minutes, 3 minutes to 20 minutes, 3 minutes to 25 minutes, 3 minutes to 30 minutes, 4 minutes to 5 minutes, 4 minutes to 6 minutes, 4 minutes to 7 minutes, 4 minutes to 8 minutes, 4 minutes to 9 minutes, 4 minutes to 10 minutes, 4 minutes to 15 minutes, 4 minutes to 20 minutes, 4 minutes to 25 minutes, 4 minutes to 30 minutes, 5 minutes to 6 minutes, 5 minutes to 7 minutes, 5 minutes to 8 minutes, 5 minutes to 9 minutes, 5 minutes to 10 minutes, 5 minutes to 15 minutes, 5 minutes to 20 minutes, 5 minutes to 25 minutes, 5 minutes to 30 minutes, 10 minutes to 15 minutes, 10 minutes to 20 minutes, 10 minutes to 25 minutes, 10 minutes to 30 minutes, 15 minutes to 20 minutes, 15 minutes to 25 minutes, 15 minutes to 30 minutes, 20 minutes to 25 minutes, 20 minutes to 30 minutes or 25 minutes to 30 minutes after exposure to the appropriate external stimulus. In other aspects of this embodiment, a degree of swelling achieved by a hydrogel disclosed herein during a phase transition into the expanded state can be, e.g., at most 10 times, at most 20 times, at most 30 times, at most 40 times, at most 50 times, at most 60 times, at most 70 times, at most 80 times, at most 90 times, at most 100 times, at most 125 times, at most 150 times, at most 175 times, at most 200 times, at most 225 times, at most 250 times, at most 275 times, at most 300 times, at most 325 times, at most 350 times, at most 375 times or at most 400 times by weight or volume and occurs between, e.g., 1 minute to 2 minutes, 1 minute to 3 minutes, 1 minute to 4 minutes, 1 minute to 5 minutes, 1 minute to 6 minutes, 1 minute to 7 minutes, 1 minute to 8 minutes, 1 minute to 9 minutes, 1 minute to 10 minutes, 1 minute to 15 minutes, 1 minute to 20 minutes, 1 minute to 25 minutes, 1 minute to 30 minutes, 2 minutes to 3 minutes, 2 minutes to 4 minutes, 2 minutes to 5 minutes, 2 minutes to 6 minutes, 2 minutes to 7 minutes, 2 minutes to 8 minutes, 2 minutes to 9 minutes, 2 minutes to 10 minutes, 2 minutes to 15 minutes, 2 minutes to 20 minutes, 2 minutes to 25 minutes, 2 minutes to 30 minutes, 3 minutes to 4 minutes, 3 minutes to 5 minutes, 3 minutes to 6 minutes, 3 minutes to 7 minutes, 3 minutes to 8 minutes, 3 minutes to 9 minutes, 3 minutes to 10 minutes, 3 minutes to 15 minutes, 3 minutes to 20 minutes, 3 minutes to 25 minutes, 3 minutes to 30 minutes, 4 minutes to 5 minutes, 4 minutes to 6 minutes, 4 minutes to 7 minutes, 4 minutes to 8 minutes, 4 minutes to 9 minutes, 4 minutes to 10 minutes, 4 minutes to 15 minutes, 4 minutes to 20 minutes, 4 minutes to 25 minutes, 4 minutes to 30 minutes, 5 minutes to 6 minutes, 5 minutes to 7 minutes, 5 minutes to 8 minutes, 5 minutes to 9 minutes, 5 minutes to 10 minutes, 5 minutes to 15 minutes, 5 minutes to 20 minutes, 5 minutes to 25 minutes, 5 minutes to 30 minutes, 10 minutes to 15 minutes, 10 minutes to 20 minutes, 10 minutes to 25 minutes, 10 minutes to 30 minutes, 15 minutes to 20 minutes, 15 minutes to 25 minutes, 15 minutes to 30 minutes, 20 minutes to 25 minutes, 20 minutes to 30 minutes or 25 minutes to 30 minutes after exposure to the appropriate external stimulus. In yet other aspects of this embodiment, a degree of swelling achieved by a hydrogel disclosed herein during a phase transition into the expanded state can be between, e.g., 10 times to 25 times, 10 times to 50 times, 10 times to 75 times, 10 times to 100 times, 10 times to 125 times, 10 times to 150 times, 10 times to 175 times, 10 times to 200 times, 10 times to 225 times, 10 times to 250 times, 10 times to 275 times, 10 times to 300 times, 25 times to 50 times, 25 times to 75 times, 25 times to 100 times, 25 times to 125 times, 25 times to 150 times, 25 times to 175 times, 25 times to 200 times, 25 times to 225 times, 25 times to 250 times, 25 times to 275 times, 25 times to 300 times, 50 times to 75 times, 50 times to 100 times, 50 times to 125 times, 50 times to 150 times, 50 times to 175 times, 50 times to 200 times, 50 times to 225 times, 50 times to 250 times, 50 times to 275 times, 50 times to 300 times, 75 times to 100 times, 75 times to 125 times, 75 times to 150 times, 75 times to 175 times, 75 times to 200 times, 75 times to 225 times, 75 times to 250 times, 75 times to 275 times, 75 times to 300 times, 100 times to 125 times, 100 times to 150 times, 100 times to 175 times, 100 times to 200 times, 100 times to 225 times, 100 times to 250 times, 100 times to 275 times, 100 times to 300 times, 100 times to 325 times, 100 times to 350 times, 100 times to 375 times, 100 times to 400 times, 125 times to 150 times, 125 times to 175 times, 125 times to 200 times, 125 times to 225 times, 125 times to 250 times, 125 times to 275 times, 125 times to 300 times, 125 times to 325 times, 125 times to 350 times, 125 times to 375 times, 125 times to 400 times, 150 times to 175 times, 150 times to 200 times, 150 times to 225 times, 150 times to 250 times, 150 times to 275 times, 150 times to 300 times, 150 times to 325 times, 150 times to 350 times, 150 times to 375 times, 150 times to 400 times, 175 times to 200 times, 175 times to 225 times, 175 times to 250 times, 175 times to 275 times, 175 times to 300 times, 175 times to 325 times, 175 times to 350 times, 175 times to 375 times, 175 times to 400 times, 200 times to 225 times, 200 times to 250 times, 200 times to 275 times, 200 times to 300 times, 200 times to 325 times, 200 times to 350 times, 200 times to 375 times, 200 times to 400 times, 225 times to 250 times, 225 times to 275 times, 225 times to 300 times, 225 times to 325 times, 225 times to 350 times, 225 times to 375 times, 225 times to 400 times, 250 times to 275 times, 250 times to 300 times, 275 times to 300 times, 275 times to 325 times, 275 times to 350 times, 275 times to 375 times, 275 times to 400 times, 300 times to 325 times, 300 times to 350 times, 300 times to 375 times, or 300 times to 400 times by weight or volume and occurs between, e.g., 1 minute to 2 minutes, 1 minute to 3 minutes, 1 minute to 4 minutes, 1 minute to 5 minutes, 1 minute to 6 minutes, 1 minute to 7 minutes, 1 minute to 8 minutes, 1 minute to 9 minutes, 1 minute to 10 minutes, 1 minute to 15 minutes, 1 minute to 20 minutes, 1 minute to 25 minutes, 1 minute to 30 minutes, 2 minutes to 3 minutes, 2 minutes to 4 minutes, 2 minutes to 5 minutes, 2 minutes to 6 minutes, 2 minutes to 7 minutes, 2 minutes to 8 minutes, 2 minutes to 9 minutes, 2 minutes to 10 minutes, 2 minutes to 15 minutes, 2 minutes to 20 minutes, 2 minutes to 25 minutes, 2 minutes to 30 minutes, 3 minutes to 4 minutes, 3 minutes to 5 minutes, 3 minutes to 6 minutes, 3 minutes to 7 minutes, 3 minutes to 8 minutes, 3 minutes to 9 minutes, 3 minutes to 10 minutes, 3 minutes to 15 minutes, 3 minutes to 20 minutes, 3 minutes to 25 minutes, 3 minutes to 30 minutes, 4 minutes to 5 minutes, 4 minutes to 6 minutes, 4 minutes to 7 minutes, 4 minutes to 8 minutes, 4 minutes to 9 minutes, 4 minutes to 10 minutes, 4 minutes to 15 minutes, 4 minutes to 20 minutes, 4 minutes to 25 minutes, 4 minutes to 30 minutes, 5 minutes to 6 minutes, 5 minutes to 7 minutes, 5 minutes to 8 minutes, 5 minutes to 9 minutes, 5 minutes to 10 minutes, 5 minutes to 15 minutes, 5 minutes to 20 minutes, 5 minutes to 25 minutes, 5 minutes to 30 minutes, 10 minutes to 15 minutes, 10 minutes to 20 minutes, 10 minutes to 25 minutes, 10 minutes to 30 minutes, 15 minutes to 20 minutes, 15 minutes to 25 minutes, 15 minutes to 30 minutes, 20 minutes to 25 minutes, 20 minutes to 30 minutes or 25 minutes to 30 minutes after exposure to the appropriate external stimulus.

In aspects of this embodiment, at least 50%, at least 60%, at least 70%, at least 75%, at least 80%, at least 90% or at least 95% of one or more hydrogel particles disclosed herein achieve a degree of swelling of, e.g., at least 10 times, at least 20 times, at least 30 times, at least 40 times, at least 50 times, at least 60 times, at least 70 times, at least 80 times, at least 90 times, at least 100 times, at least 125 times, at least 150 times, at least 175 times, at least 200 times, at least 225 times, at least 250 times, at least 275 times, at least 300 times, at least 325 times, at least 350 times, at least 375 times or at least 400 times by weight or volume and occurs in, e.g., at most 1 minute, at most 2 minutes, at most 3 minutes, at most 4 minutes, at most 5 minutes, at most 6 minutes, at most 7 minutes, at most 8 minutes, at most 9 minutes, at most 10 minutes, at most 15 minutes, at most 20 minutes, at most 25 minutes or at most 30 minutes after exposure to the appropriate external stimulus. In other aspects of this embodiment, at least 50%, at least 60%, at least 70%, at least 75%, at least 80%, at least 90% or at least 95% of one or more hydrogel particles disclosed herein achieve a degree of swelling of, e.g., at most 10 times, at most 20 times, at most 30 times, at most 40 times, at most 50 times, at most 60 times, at most 70 times, at most 80 times, at most 90 times, at most 100 times, at most 125 times, at most 150 times, at most 175 times, at most 200 times, at most 225 times, at most 250 times, at most 275 times, at most 300 times, at most 325 times, at most 350 times, at most 375 times or at most 400 times by weight or volume and occurs in, e.g., at most 1 minute, at most 2 minutes, at most 3 minutes, at most 4 minutes, at most 5 minutes, at most 6 minutes, at most 7 minutes, at most 8 minutes, at most 9 minutes, at most 10 minutes, at most 15 minutes, at most 20 minutes, at most 25 minutes or at most 30 minutes after exposure to the appropriate external stimulus. In other aspects of this embodiment, at least 50%, at least 60%, at least 70%, at least 75%, at least 80%, at least 90% or at least 95% of one or more hydrogel particles disclosed herein achieve a degree of swelling of between, e.g., 10 times to 25 times, 10 times to 50 times, 10 times to 75 times, 10 times to 100 times, 10 times to 125 times, 10 times to 150 times, 10 times to 175 times, 10 times to 200 times, 10 times to 225 times, 10 times to 250 times, 10 times to 275 times, 10 times to 300 times, 25 times to 50 times, 25 times to 75 times, 25 times to 100 times, 25 times to 125 times, 25 times to 150 times, 25 times to 175 times, 25 times to 200 times, 25 times to 225 times, 25 times to 250 times, 25 times to 275 times, 25 times to 300 times, 50 times to 75 times, 50 times to 100 times, 50 times to 125 times, 50 times to 150 times, 50 times to 175 times, 50 times to 200 times, 50 times to 225 times, 50 times to 250 times, 50 times to 275 times, 50 times to 300 times, 75 times to 100 times, 75 times to 125 times, 75 times to 150 times, 75 times to 175 times, 75 times to 200 times, 75 times to 225 times, 75 times to 250 times, 75 times to 275 times, 75 times to 300 times, 100 times to 125 times, 100 times to 150 times, 100 times to 175 times, 100 times to 200 times, 100 times to 225 times, 100 times to 250 times, 100 times to 275 times, 100 times to 300 times, 100 times to 325 times, 100 times to 350 times, 100 times to 375 times, 100 times to 400 times, 125 times to 150 times, 125 times to 175 times, 125 times to 200 times, 125 times to 225 times, 125 times to 250 times, 125 times to 275 times, 125 times to 300 times, 125 times to 325 times, 125 times to 350 times, 125 times to 375 times, 125 times to 400 times, 150 times to 175 times, 150 times to 200 times, 150 times to 225 times, 150 times to 250 times, 150 times to 275 times, 150 times to 300 times, 150 times to 325 times, 150 times to 350 times, 150 times to 375 times, 150 times to 400 times, 175 times to 200 times, 175 times to 225 times, 175 times to 250 times, 175 times to 275 times, 175 times to 300 times, 175 times to 325 times, 175 times to 350 times, 175 times to 375 times, 175 times to 400 times, 200 times to 225 times, 200 times to 250 times, 200 times to 275 times, 200 times to 300 times, 200 times to 325 times, 200 times to 350 times, 200 times to 375 times, 200 times to 400 times, 225 times to 250 times, 225 times to 275 times, 225 times to 300 times, 225 times to 325 times, 225 times to 350 times, 225 times to 375 times, 225 times to 400 times, 250 times to 275 times, 250 times to 300 times, 275 times to 300 times, 275 times to 325 times, 275 times to 350 times, 275 times to 375 times, 275 times to 400 times, 300 times to 325 times, 300 times to 350 times, 300 times to 375 times, or 300 times to 400 times by weight or volume and occurs in, e.g., at most 1 minute, at most 2 minutes, at most 3 minutes, at most 4 minutes, at most 5 minutes, at most 6 minutes, at most 7 minutes, at most 8 minutes, at most 9 minutes, at most 10 minutes, at most 15 minutes, at most 20 minutes, at most 25 minutes or at most 30 minutes after exposure to the appropriate external stimulus.

In aspects of this embodiment, at least 50%, at least 60%, at least 70%, at least 75%, at least 80%, at least 90% or at least 95% of one or more hydrogel particles disclosed herein achieve a degree of swelling of, e.g., at least 10 times, at least 20 times, at least 30 times, at least 40 times, at least 50 times, at least 60 times, at least 70 times, at least 80 times, at least 90 times, at least 100 times, at least 125 times, at least 150 times, at least 175 times, at least 200 times, at least 225 times, at least 250 times, at least 275 times, at least 300 times, at least 325 times, at least 350 times, at least 375 times or at least 400 times by weight or volume and occurs between, e.g., 1 minute to 2 minutes, 1 minute to 3 minutes, 1 minute to 4 minutes, 1 minute to 5 minutes, 1 minute to 6 minutes, 1 minute to 7 minutes, 1 minute to 8 minutes, 1 minute to 9 minutes, 1 minute to 10 minutes, 1 minute to 15 minutes, 1 minute to 20 minutes, 1 minute to 25 minutes, 1 minute to 30 minutes, 2 minutes to 3 minutes, 2 minutes to 4 minutes, 2 minutes to 5 minutes, 2 minutes to 6 minutes, 2 minutes to 7 minutes, 2 minutes to 8 minutes, 2 minutes to 9 minutes, 2 minutes to 10 minutes, 2 minutes to 15 minutes, 2 minutes to 20 minutes, 2 minutes to 25 minutes, 2 minutes to 30 minutes, 3 minutes to 4 minutes, 3 minutes to 5 minutes, 3 minutes to 6 minutes, 3 minutes to 7 minutes, 3 minutes to 8 minutes, 3 minutes to 9 minutes, 3 minutes to 10 minutes, 3 minutes to 15 minutes, 3 minutes to 20 minutes, 3 minutes to 25 minutes, 3 minutes to 30 minutes, 4 minutes to 5 minutes, 4 minutes to 6 minutes, 4 minutes to 7 minutes, 4 minutes to 8 minutes, 4 minutes to 9 minutes, 4 minutes to 10 minutes, 4 minutes to 15 minutes, 4 minutes to 20 minutes, 4 minutes to 25 minutes, 4 minutes to 30 minutes, 5 minutes to 6 minutes, 5 minutes to 7 minutes, 5 minutes to 8 minutes, 5 minutes to 9 minutes, 5 minutes to 10 minutes, 5 minutes to 15 minutes, 5 minutes to 20 minutes, 5 minutes to 25 minutes, 5 minutes to 30 minutes, 10 minutes to 15 minutes, 10 minutes to 20 minutes, 10 minutes to 25 minutes, 10 minutes to 30 minutes, 15 minutes to 20 minutes, 15 minutes to 25 minutes, 15 minutes to 30 minutes, 20 minutes to 25 minutes, 20 minutes to 30 minutes or 25 minutes to 30 minutes after exposure to the appropriate external stimulus. In other aspects of this embodiment, at least 50%, at least 60%, at least 70%, at least 75%, at least 80%, at least 90% or at least 95% of one or more hydrogel particles disclosed herein achieve a degree of swelling of, e.g., at most 10 times, at most 20 times, at most 30 times, at most 40 times, at most 50 times, at most 60 times, at most 70 times, at most 80 times, at most 90 times, at most 100 times, at most 125 times, at most 150 times, at most 175 times, at most 200 times, at most 225 times, at most 250 times, at most 275 times, at most 300 times, at most 325 times, at most 350 times, at most 375 times or at most 400 times by weight or volume and occurs between, e.g., 1 minute to 2 minutes, 1 minute to 3 minutes, 1 minute to 4 minutes, 1 minute to 5 minutes, 1 minute to 6 minutes, 1 minute to 7 minutes, 1 minute to 8 minutes, 1 minute to 9 minutes, 1 minute to 10 minutes, 1 minute to 15 minutes, 1 minute to 20 minutes, 1 minute to 25 minutes, 1 minute to 30 minutes, 2 minutes to 3 minutes, 2 minutes to 4 minutes, 2 minutes to 5 minutes, 2 minutes to 6 minutes, 2 minutes to 7 minutes, 2 minutes to 8 minutes, 2 minutes to 9 minutes, 2 minutes to 10 minutes, 2 minutes to 15 minutes, 2 minutes to 20 minutes, 2 minutes to 25 minutes, 2 minutes to 30 minutes, 3 minutes to 4 minutes, 3 minutes to 5 minutes, 3 minutes to 6 minutes, 3 minutes to 7 minutes, 3 minutes to 8 minutes, 3 minutes to 9 minutes, 3 minutes to 10 minutes, 3 minutes to 15 minutes, 3 minutes to 20 minutes, 3 minutes to 25 minutes, 3 minutes to 30 minutes, 4 minutes to 5 minutes, 4 minutes to 6 minutes, 4 minutes to 7 minutes, 4 minutes to 8 minutes, 4 minutes to 9 minutes, 4 minutes to 10 minutes, 4 minutes to 15 minutes, 4 minutes to 20 minutes, 4 minutes to 25 minutes, 4 minutes to 30 minutes, 5 minutes to 6 minutes, 5 minutes to 7 minutes, 5 minutes to 8 minutes, 5 minutes to 9 minutes, 5 minutes to 10 minutes, 5 minutes to 15 minutes, 5 minutes to 20 minutes, 5 minutes to 25 minutes, 5 minutes to 30 minutes, 10 minutes to 15 minutes, 10 minutes to 20 minutes, 10 minutes to 25 minutes, 10 minutes to 30 minutes, 15 minutes to 20 minutes, 15 minutes to 25 minutes, 15 minutes to 30 minutes, 20 minutes to 25 minutes, 20 minutes to 30 minutes or 25 minutes to 30 minutes after exposure to the appropriate external stimulus. In other aspects of this embodiment, at least 50%, at least 60%, at least 70%, at least 75%, at least 80%, at least 90% or at least 95% of one or more hydrogel particles disclosed herein achieve a degree of swelling of between, e.g., 10 times to 25 times, 10 times to 50 times, 10 times to 75 times, 10 times to 100 times, 10 times to 125 times, 10 times to 150 times, 10 times to 175 times, 10 times to 200 times, 10 times to 225 times, 10 times to 250 times, 10 times to 275 times, 10 times to 300 times, 25 times to 50 times, 25 times to 75 times, 25 times to 100 times, 25 times to 125 times, 25 times to 150 times, 25 times to 175 times, 25 times to 200 times, 25 times to 225 times, 25 times to 250 times, 25 times to 275 times, 25 times to 300 times, 50 times to 75 times, 50 times to 100 times, 50 times to 125 times, 50 times to 150 times, 50 times to 175 times, 50 times to 200 times, 50 times to 225 times, 50 times to 250 times, 50 times to 275 times, 50 times to 300 times, 75 times to 100 times, 75 times to 125 times, 75 times to 150 times, 75 times to 175 times, 75 times to 200 times, 75 times to 225 times, 75 times to 250 times, 75 times to 275 times, 75 times to 300 times, 100 times to 125 times, 100 times to 150 times, 100 times to 175 times, 100 times to 200 times, 100 times to 225 times, 100 times to 250 times, 100 times to 275 times, 100 times to 300 times, 100 times to 325 times, 100 times to 350 times, 100 times to 375 times, 100 times to 400 times, 125 times to 150 times, 125 times to 175 times, 125 times to 200 times, 125 times to 225 times, 125 times to 250 times, 125 times to 275 times, 125 times to 300 times, 125 times to 325 times, 125 times to 350 times, 125 times to 375 times, 125 times to 400 times, 150 times to 175 times, 150 times to 200 times, 150 times to 225 times, 150 times to 250 times, 150 times to 275 times, 150 times to 300 times, 150 times to 325 times, 150 times to 350 times, 150 times to 375 times, 150 times to 400 times, 175 times to 200 times, 175 times to 225 times, 175 times to 250 times, 175 times to 275 times, 175 times to 300 times, 175 times to 325 times, 175 times to 350 times, 175 times to 375 times, 175 times to 400 times, 200 times to 225 times, 200 times to 250 times, 200 times to 275 times, 200 times to 300 times, 200 times to 325 times, 200 times to 350 times, 200 times to 375 times, 200 times to 400 times, 225 times to 250 times, 225 times to 275 times, 225 times to 300 times, 225 times to 325 times, 225 times to 350 times, 225 times to 375 times, 225 times to 400 times, 250 times to 275 times, 250 times to 300 times, 275 times to 300 times, 275 times to 325 times, 275 times to 350 times, 275 times to 375 times, 275 times to 400 times, 300 times to 325 times, 300 times to 350 times, 300 times to 375 times, or 300 times to 400 times by weight or volume and occurs between, e.g., 1 minute to 2 minutes, 1 minute to 3 minutes, 1 minute to 4 minutes, 1 minute to 5 minutes, 1 minute to 6 minutes, 1 minute to 7 minutes, 1 minute to 8 minutes, 1 minute to 9 minutes, 1 minute to 10 minutes, 1 minute to 15 minutes, 1 minute to 20 minutes, 1 minute to 25 minutes, 1 minute to 30 minutes, 2 minutes to 3 minutes, 2 minutes to 4 minutes, 2 minutes to 5 minutes, 2 minutes to 6 minutes, 2 minutes to 7 minutes, 2 minutes to 8 minutes, 2 minutes to 9 minutes, 2 minutes to 10 minutes, 2 minutes to 15 minutes, 2 minutes to 20 minutes, 2 minutes to 25 minutes, 2 minutes to 30 minutes, 3 minutes to 4 minutes, 3 minutes to 5 minutes, 3 minutes to 6 minutes, 3 minutes to 7 minutes, 3 minutes to 8 minutes, 3 minutes to 9 minutes, 3 minutes to 10 minutes, 3 minutes to 15 minutes, 3 minutes to 20 minutes, 3 minutes to 25 minutes, 3 minutes to 30 minutes, 4 minutes to 5 minutes, 4 minutes to 6 minutes, 4 minutes to 7 minutes, 4 minutes to 8 minutes, 4 minutes to 9 minutes, 4 minutes to 10 minutes, 4 minutes to 15 minutes, 4 minutes to 20 minutes, 4 minutes to 25 minutes, 4 minutes to 30 minutes, 5 minutes to 6 minutes, 5 minutes to 7 minutes, 5 minutes to 8 minutes, 5 minutes to 9 minutes, 5 minutes to 10 minutes, 5 minutes to 15 minutes, 5 minutes to 20 minutes, 5 minutes to 25 minutes, 5 minutes to 30 minutes, 10 minutes to 15 minutes, 10 minutes to 20 minutes, 10 minutes to 25 minutes, 10 minutes to 30 minutes, 15 minutes to 20 minutes, 15 minutes to 25 minutes, 15 minutes to 30 minutes, 20 minutes to 25 minutes, 20 minutes to 30 minutes or 25 minutes to 30 minutes after exposure to the appropriate external stimulus.

In aspects of this embodiment, an absorptive capacity achieved by a hydrogel disclosed herein during a phase transition into the expanded state can occur in, e.g., at most 1 minute, at most 2 minutes, at most 3 minutes, at most 4 minutes, at most 5 minutes, at most 6 minutes, at most 7 minutes, at most 8 minutes, at most 9 minutes, at most 10 minutes, at most 15 minutes, at most 20 minutes, at most 25 minutes or at most 30 minutes after exposure to the appropriate external stimulus. In aspects of this embodiment, an absorptive capacity achieved by a hydrogel disclosed herein during a phase transition into the expanded state can occur in, e.g., 1 minute to 2 minutes, 1 minute to 3 minutes, 1 minute to 4 minutes, 1 minute to 5 minutes, 1 minute to 6 minutes, 1 minute to 7 minutes, 1 minute to 8 minutes, 1 minute to 9 minutes, 1 minute to 10 minutes, 1 minute to 15 minutes, 1 minute to 20 minutes, 1 minute to 25 minutes, 1 minute to 30 minutes, 2 minutes to 3 minutes, 2 minutes to 4 minutes, 2 minutes to 5 minutes, 2 minutes to 6 minutes, 2 minutes to 7 minutes, 2 minutes to 8 minutes, 2 minutes to 9 minutes, 2 minutes to 10 minutes, 2 minutes to 15 minutes, 2 minutes to 20 minutes, 2 minutes to 25 minutes, 2 minutes to 30 minutes, 3 minutes to 4 minutes, 3 minutes to 5 minutes, 3 minutes to 6 minutes, 3 minutes to 7 minutes, 3 minutes to 8 minutes, 3 minutes to 9 minutes, 3 minutes to 10 minutes, 3 minutes to 15 minutes, 3 minutes to 20 minutes, 3 minutes to 25 minutes, 3 minutes to 30 minutes, 4 minutes to 5 minutes, 4 minutes to 6 minutes, 4 minutes to 7 minutes, 4 minutes to 8 minutes, 4 minutes to 9 minutes, 4 minutes to 10 minutes, 4 minutes to 15 minutes, 4 minutes to 20 minutes, 4 minutes to 25 minutes, 4 minutes to 30 minutes, 5 minutes to 6 minutes, 5 minutes to 7 minutes, 5 minutes to 8 minutes, 5 minutes to 9 minutes, 5 minutes to 10 minutes, 5 minutes to 15 minutes, 5 minutes to 20 minutes, 5 minutes to 25 minutes, 5 minutes to 30 minutes, 10 minutes to 15 minutes, 10 minutes to 20 minutes, 10 minutes to 25 minutes, 10 minutes to 30 minutes, 15 minutes to 20 minutes, 15 minutes to 25 minutes, 15 minutes to 30 minutes, 20 minutes to 25 minutes, 20 minutes to 30 minutes or 25 minutes to 30 minutes after exposure to the appropriate external stimulus.

In aspects of this embodiment, an absorptive capacity achieved by a hydrogel disclosed herein during a phase transition into the expanded state can be, e.g., at least 30%, at least 40%, at least 50%, at least 60%, at least 70%, at least 75%, at least 80%, at least 90% or at least 95% by weight or volume and occurs in, e.g., at most 1 minute, at most 2 minutes, at most 3 minutes, at most 4 minutes, at most 5 minutes, at most 6 minutes, at most 7 minutes, at most 8 minutes, at most 9 minutes, at most 10 minutes, at most 15 minutes, at most 20 minutes, at most 25 minutes or at most 30 minutes after exposure to the appropriate external stimulus. In other aspects of this embodiment, an absorptive capacity achieved by a hydrogel disclosed herein during a phase transition into the expanded state can be, e.g., at most 30%, at most 40%, at most 50%, at most 60%, at most 70%, at most 75%, at most 80%, at most 90% or at most 95% by weight or volume and occurs in, e.g., at most 1 minute, at most 2 minutes, at most 3 minutes, at most 4 minutes, at most 5 minutes, at most 6 minutes, at most 7 minutes, at most 8 minutes, at most 9 minutes, at most 10 minutes, at most 15 minutes, at most 20 minutes, at most 25 minutes or at most 30 minutes after exposure to the appropriate external stimulus. In yet other aspects of this embodiment, an absorptive capacity achieved by a hydrogel disclosed herein during a phase transition into the expanded state can be between, e.g., 25% to 50%, 25% to 75%, 25% to 100% 50% to 75%, 50% to 100% or 75% to 100% by weight or volume and occurs in, e.g., at most 1 minute, at most 2 minutes, at most 3 minutes, at most 4 minutes, at most 5 minutes, at most 6 minutes, at most 7 minutes, at most 8 minutes, at most 9 minutes, at most 10 minutes, at most 15 minutes, at most 20 minutes, at most 25 minutes or at most 30 minutes after exposure to the appropriate external stimulus.

In aspects of this embodiment, an absorptive capacity achieved by a hydrogel disclosed herein during a phase transition into the expanded state can be, e.g., at least 30%, at least 40%, at least 50%, at least 60%, at least 70%, at least 75%, at least 80%, at least 90% or at least 95% by weight or volume and occurs between, e.g., 1 minute to 2 minutes, 1 minute to 3 minutes, 1 minute to 4 minutes, 1 minute to 5 minutes, 1 minute to 6 minutes, 1 minute to 7 minutes, 1 minute to 8 minutes, 1 minute to 9 minutes, 1 minute to 10 minutes, 1 minute to 15 minutes, 1 minute to 20 minutes, 1 minute to 25 minutes, 1 minute to 30 minutes, 2 minutes to 3 minutes, 2 minutes to 4 minutes, 2 minutes to 5 minutes, 2 minutes to 6 minutes, 2 minutes to 7 minutes, 2 minutes to 8 minutes, 2 minutes to 9 minutes, 2 minutes to 10 minutes, 2 minutes to 15 minutes, 2 minutes to 20 minutes, 2 minutes to 25 minutes, 2 minutes to 30 minutes, 3 minutes to 4 minutes, 3 minutes to 5 minutes, 3 minutes to 6 minutes, 3 minutes to 7 minutes, 3 minutes to 8 minutes, 3 minutes to 9 minutes, 3 minutes to 10 minutes, 3 minutes to 15 minutes, 3 minutes to 20 minutes, 3 minutes to 25 minutes, 3 minutes to 30 minutes, 4 minutes to 5 minutes, 4 minutes to 6 minutes, 4 minutes to 7 minutes, 4 minutes to 8 minutes, 4 minutes to 9 minutes, 4 minutes to 10 minutes, 4 minutes to 15 minutes, 4 minutes to 20 minutes, 4 minutes to 25 minutes, 4 minutes to 30 minutes, 5 minutes to 6 minutes, 5 minutes to 7 minutes, 5 minutes to 8 minutes, 5 minutes to 9 minutes, 5 minutes to 10 minutes, 5 minutes to 15 minutes, 5 minutes to 20 minutes, 5 minutes to 25 minutes, 5 minutes to 30 minutes, 10 minutes to 15 minutes, 10 minutes to 20 minutes, 10 minutes to 25 minutes, 10 minutes to 30 minutes, 15 minutes to 20 minutes, 15 minutes to 25 minutes, 15 minutes to 30 minutes, 20 minutes to 25 minutes, 20 minutes to 30 minutes or 25 minutes to 30 minutes after exposure to the appropriate external stimulus. In other aspects of this embodiment, an absorptive capacity achieved by a hydrogel disclosed herein during a phase transition into the expanded state can be, e.g., at most 30%, at most 40%, at most 50%, at most 60%, at most 70%, at most 75%, at most 80%, at most 90% or at most 95% by weight or volume and occurs between, e.g., 1 minute to 2 minutes, 1 minute to 3 minutes, 1 minute to 4 minutes, 1 minute to 5 minutes, 1 minute to 6 minutes, 1 minute to 7 minutes, 1 minute to 8 minutes, 1 minute to 9 minutes, 1 minute to 10 minutes, 1 minute to 15 minutes, 1 minute to 20 minutes, 1 minute to 25 minutes, 1 minute to 30 minutes, 2 minutes to 3 minutes, 2 minutes to 4 minutes, 2 minutes to 5 minutes, 2 minutes to 6 minutes, 2 minutes to 7 minutes, 2 minutes to 8 minutes, 2 minutes to 9 minutes, 2 minutes to 10 minutes, 2 minutes to 15 minutes, 2 minutes to 20 minutes, 2 minutes to 25 minutes, 2 minutes to 30 minutes, 3 minutes to 4 minutes, 3 minutes to 5 minutes, 3 minutes to 6 minutes, 3 minutes to 7 minutes, 3 minutes to 8 minutes, 3 minutes to 9 minutes, 3 minutes to 10 minutes, 3 minutes to 15 minutes, 3 minutes to 20 minutes, 3 minutes to 25 minutes, 3 minutes to 30 minutes, 4 minutes to 5 minutes, 4 minutes to 6 minutes, 4 minutes to 7 minutes, 4 minutes to 8 minutes, 4 minutes to 9 minutes, 4 minutes to 10 minutes, 4 minutes to 15 minutes, 4 minutes to 20 minutes, 4 minutes to 25 minutes, 4 minutes to 30 minutes, 5 minutes to 6 minutes, 5 minutes to 7 minutes, 5 minutes to 8 minutes, 5 minutes to 9 minutes, 5 minutes to 10 minutes, 5 minutes to 15 minutes, 5 minutes to 20 minutes, 5 minutes to 25 minutes, 5 minutes to 30 minutes, 10 minutes to 15 minutes, 10 minutes to 20 minutes, 10 minutes to 25 minutes, 10 minutes to 30 minutes, 15 minutes to 20 minutes, 15 minutes to 25 minutes, 15 minutes to 30 minutes, 20 minutes to 25 minutes, 20 minutes to 30 minutes or 25 minutes to 30 minutes after exposure to the appropriate external stimulus. In yet other aspects of this embodiment, an absorptive capacity achieved by a hydrogel disclosed herein during a phase transition into the expanded state can be between, e.g., 25% to 50%, 25% to 75%, 25% to 100% 50% to 75%, 50% to 100% or 75% to 100% by weight or volume and occurs between, e.g., 1 minute to 2 minutes, 1 minute to 3 minutes, 1 minute to 4 minutes, 1 minute to 5 minutes, 1 minute to 6 minutes, 1 minute to 7 minutes, 1 minute to 8 minutes, 1 minute to 9 minutes, 1 minute to 10 minutes, 1 minute to 15 minutes, 1 minute to 20 minutes, 1 minute to 25 minutes, 1 minute to 30 minutes, 2 minutes to 3 minutes, 2 minutes to 4 minutes, 2 minutes to 5 minutes, 2 minutes to 6 minutes, 2 minutes to 7 minutes, 2 minutes to 8 minutes, 2 minutes to 9 minutes, 2 minutes to 10 minutes, 2 minutes to 15 minutes, 2 minutes to 20 minutes, 2 minutes to 25 minutes, 2 minutes to 30 minutes, 3 minutes to 4 minutes, 3 minutes to 5 minutes, 3 minutes to 6 minutes, 3 minutes to 7 minutes, 3 minutes to 8 minutes, 3 minutes to 9 minutes, 3 minutes to 10 minutes, 3 minutes to 15 minutes, 3 minutes to 20 minutes, 3 minutes to 25 minutes, 3 minutes to 30 minutes, 4 minutes to 5 minutes, 4 minutes to 6 minutes, 4 minutes to 7 minutes, 4 minutes to 8 minutes, 4 minutes to 9 minutes, 4 minutes to 10 minutes, 4 minutes to 15 minutes, 4 minutes to 20 minutes, 4 minutes to 25 minutes, 4 minutes to 30 minutes, 5 minutes to 6 minutes, 5 minutes to 7 minutes, 5 minutes to 8 minutes, 5 minutes to 9 minutes, 5 minutes to 10 minutes, 5 minutes to 15 minutes, 5 minutes to 20 minutes, 5 minutes to 25 minutes, 5 minutes to 30 minutes, 10 minutes to 15 minutes, 10 minutes to 20 minutes, 10 minutes to 25 minutes, 10 minutes to 30 minutes, 15 minutes to 20 minutes, 15 minutes to 25 minutes, 15 minutes to 30 minutes, 20 minutes to 25 minutes, 20 minutes to 30 minutes or 25 minutes to 30 minutes after exposure to the appropriate external stimulus.

In aspects of this embodiment, at least 10%, at least 20%, at least 30%, at least 40%, at least 50%, at least 60%, at least 70%, at least 75%, at least 80%, at least 90% or at least 95% of one or more hydrogel particles disclosed herein achieve an absorptive capacity of, e.g., at least 30%, at least 40%, at least 50%, at least 60%, at least 70%, at least 75%, at least 80%, at least 90% or at least 95% by weight or volume and occurs in, e.g., at most 1 minute, at most 2 minutes, at most 3 minutes, at most 4 minutes, at most 5 minutes, at most 6 minutes, at most 7 minutes, at most 8 minutes, at most 9 minutes, at most 10 minutes, at most 15 minutes, at most 20 minutes, at most 25 minutes or at most 30 minutes after exposure to the appropriate external stimulus. In other aspects of this embodiment, at least 50%, at least 60%, at least 70%, at least 75%, at least 80%, at least 90% or at least 95% of one or more hydrogel particles disclosed herein achieve an absorptive capacity of, e.g., at most 30%, at most 40%, at most 50%, at most 60%, at most 70%, at most 75%, at most 80%, at most 90% or at most 95% by weight or volume and occurs in, e.g., at most 1 minute, at most 2 minutes, at most 3 minutes, at most 4 minutes, at most 5 minutes, at most 6 minutes, at most 7 minutes, at most 8 minutes, at most 9 minutes, at most 10 minutes, at most 15 minutes, at most 20 minutes, at most 25 minutes or at most 30 minutes after exposure to the appropriate external stimulus. In other aspects of this embodiment, at least 50%, at least 60%, at least 70%, at least 75%, at least 80%, at least 90% or at least 95% of one or more hydrogel particles disclosed herein achieve an absorptive capacity of between, e.g. 25% to 50%, 25% to 75%, 25% to 100% 50% to 75%, 50% to 100% or 75% to 100% by weight or volume and occurs in, e.g., at most 1 minute, at most 2 minutes, at most 3 minutes, at most 4 minutes, at most 5 minutes, at most 6 minutes, at most 7 minutes, at most 8 minutes, at most 9 minutes, at most 10 minutes, at most 15 minutes, at most 20 minutes, at most 25 minutes or at most 30 minutes after exposure to the appropriate external stimulus.

In aspects of this embodiment, at least 10%, at least 20%, at least 30%, at least 40%, at least 50%, at least 60%, at least 70%, at least 75%, at least 80%, at least 90% or at least 95% of one or more hydrogel particles disclosed herein achieve an absorptive capacity of, e.g., at least 30%, at least 40%, at least 50%, at least 60%, at least 70%, at least 75%, at least 80%, at least 90% or at least 95% by weight or volume and occurs between, e.g., 1 minute to 2 minutes, 1 minute to 3 minutes, 1 minute to 4 minutes, 1 minute to 5 minutes, 1 minute to 6 minutes, 1 minute to 7 minutes, 1 minute to 8 minutes, 1 minute to 9 minutes, 1 minute to 10 minutes, 1 minute to 15 minutes, 1 minute to 20 minutes, 1 minute to 25 minutes, 1 minute to 30 minutes, 2 minutes to 3 minutes, 2 minutes to 4 minutes, 2 minutes to 5 minutes, 2 minutes to 6 minutes, 2 minutes to 7 minutes, 2 minutes to 8 minutes, 2 minutes to 9 minutes, 2 minutes to 10 minutes, 2 minutes to 15 minutes, 2 minutes to 20 minutes, 2 minutes to 25 minutes, 2 minutes to 30 minutes, 3 minutes to 4 minutes, 3 minutes to 5 minutes, 3 minutes to 6 minutes, 3 minutes to 7 minutes, 3 minutes to 8 minutes, 3 minutes to 9 minutes, 3 minutes to 10 minutes, 3 minutes to 15 minutes, 3 minutes to 20 minutes, 3 minutes to 25 minutes, 3 minutes to 30 minutes, 4 minutes to 5 minutes, 4 minutes to 6 minutes, 4 minutes to 7 minutes, 4 minutes to 8 minutes, 4 minutes to 9 minutes, 4 minutes to 10 minutes, 4 minutes to 15 minutes, 4 minutes to 20 minutes, 4 minutes to 25 minutes, 4 minutes to 30 minutes, 5 minutes to 6 minutes, 5 minutes to 7 minutes, 5 minutes to 8 minutes, 5 minutes to 9 minutes, 5 minutes to 10 minutes, 5 minutes to 15 minutes, 5 minutes to 20 minutes, 5 minutes to 25 minutes, 5 minutes to 30 minutes, 10 minutes to 15 minutes, 10 minutes to 20 minutes, 10 minutes to 25 minutes, 10 minutes to 30 minutes, 15 minutes to 20 minutes, 15 minutes to 25 minutes, 15 minutes to 30 minutes, 20 minutes to 25 minutes, 20 minutes to 30 minutes or 25 minutes to 30 minutes after exposure to the appropriate external stimulus. In other aspects of this embodiment, at least 50%, at least 60%, at least 70%, at least 75%, at least 80%, at least 90% or at least 95% of one or more hydrogel particles disclosed herein achieve an absorptive capacity of, e.g., at most 30%, at most 40%, at most 50%, at most 60%, at most 70%, at most 75%, at most 80%, at most 90% or at most 95% by weight or volume and occurs between, e.g., 1 minute to 2 minutes, 1 minute to 3 minutes, 1 minute to 4 minutes, 1 minute to 5 minutes, 1 minute to 6 minutes, 1 minute to 7 minutes, 1 minute to 8 minutes, 1 minute to 9 minutes, 1 minute to 10 minutes, 1 minute to 15 minutes, 1 minute to 20 minutes, 1 minute to 25 minutes, 1 minute to 30 minutes, 2 minutes to 3 minutes, 2 minutes to 4 minutes, 2 minutes to 5 minutes, 2 minutes to 6 minutes, 2 minutes to 7 minutes, 2 minutes to 8 minutes, 2 minutes to 9 minutes, 2 minutes to 10 minutes, 2 minutes to 15 minutes, 2 minutes to 20 minutes, 2 minutes to 25 minutes, 2 minutes to 30 minutes, 3 minutes to 4 minutes, 3 minutes to 5 minutes, 3 minutes to 6 minutes, 3 minutes to 7 minutes, 3 minutes to 8 minutes, 3 minutes to 9 minutes, 3 minutes to 10 minutes, 3 minutes to 15 minutes, 3 minutes to 20 minutes, 3 minutes to 25 minutes, 3 minutes to 30 minutes, 4 minutes to 5 minutes, 4 minutes to 6 minutes, 4 minutes to 7 minutes, 4 minutes to 8 minutes, 4 minutes to 9 minutes, 4 minutes to 10 minutes, 4 minutes to 15 minutes, 4 minutes to 20 minutes, 4 minutes to 25 minutes, 4 minutes to 30 minutes, 5 minutes to 6 minutes, 5 minutes to 7 minutes, 5 minutes to 8 minutes, 5 minutes to 9 minutes, 5 minutes to 10 minutes, 5 minutes to 15 minutes, 5 minutes to 20 minutes, 5 minutes to 25 minutes, 5 minutes to 30 minutes, 10 minutes to 15 minutes, 10 minutes to 20 minutes, 10 minutes to 25 minutes, 10 minutes to 30 minutes, 15 minutes to 20 minutes, 15 minutes to 25 minutes, 15 minutes to 30 minutes, 20 minutes to 25 minutes, 20 minutes to 30 minutes or 25 minutes to 30 minutes after exposure to the appropriate external stimulus.

In other aspects of this embodiment, at least 50%, at least 60%, at least 70%, at least 75%, at least 80%, at least 90% or at least 95% of one or more hydrogel particles disclosed herein achieve an absorptive capacity of between, e.g. 25% to 50%, 25% to 75%, 25% to 100% 50% to 75%, 50% to 100% or 75% to 100% by weight or volume and occurs between, e.g., 1 minute to 2 minutes, 1 minute to 3 minutes, 1 minute to 4 minutes, 1 minute to 5 minutes, 1 minute to 6 minutes, 1 minute to 7 minutes, 1 minute to 8 minutes, 1 minute to 9 minutes, 1 minute to 10 minutes, 1 minute to 15 minutes, 1 minute to 20 minutes, 1 minute to 25 minutes, 1 minute to 30 minutes, 2 minutes to 3 minutes, 2 minutes to 4 minutes, 2 minutes to 5 minutes, 2 minutes to 6 minutes, 2 minutes to 7 minutes, 2 minutes to 8 minutes, 2 minutes to 9 minutes, 2 minutes to 10 minutes, 2 minutes to 15 minutes, 2 minutes to 20 minutes, 2 minutes to 25 minutes, 2 minutes to 30 minutes, 3 minutes to 4 minutes, 3 minutes to 5 minutes, 3 minutes to 6 minutes, 3 minutes to 7 minutes, 3 minutes to 8 minutes, 3 minutes to 9 minutes, 3 minutes to 10 minutes, 3 minutes to 15 minutes, 3 minutes to 20 minutes, 3 minutes to 25 minutes, 3 minutes to 30 minutes, 4 minutes to 5 minutes, 4 minutes to 6 minutes, 4 minutes to 7 minutes, 4 minutes to 8 minutes, 4 minutes to 9 minutes, 4 minutes to 10 minutes, 4 minutes to 15 minutes, 4 minutes to 20 minutes, 4 minutes to 25 minutes, 4 minutes to 30 minutes, 5 minutes to 6 minutes, 5 minutes to 7 minutes, 5 minutes to 8 minutes, 5 minutes to 9 minutes, 5 minutes to 10 minutes, 5 minutes to 15 minutes, 5 minutes to 20 minutes, 5 minutes to 25 minutes, 5 minutes to 30 minutes, 10 minutes to 15 minutes, 10 minutes to 20 minutes, 10 minutes to 25 minutes, 10 minutes to 30 minutes, 15 minutes to 20 minutes, 15 minutes to 25 minutes, 15 minutes to 30 minutes, 20 minutes to 25 minutes, 20 minutes to 30 minutes or 25 minutes to 30 minutes after exposure to the appropriate external stimulus.

The present specification discloses, in part, an arthropod pest control composition. In one embodiment, an arthropod pest control composition is a composition comprising one or more hydrogel particles disclosed herein. In aspects of this embodiment, an arthropod pest control composition disclosed herein can comprise hydrogel particles that are identical or substantially similar in components, identical or substantially similar in shape, identical or substantially similar in size. In other aspects of this embodiment, an arthropod pest control composition disclosed herein can comprise two or more different subsets of hydrogel particles where the two or more different subsets differ in components, shape, size or any combination thereof. For example, an arthropod pest control composition can comprise one subset of hydrogel particles composed of a first polyacidic or a first polybasic polymer and a second subset of hydrogel particles composed of a second polyacidic or a second polybasic polymer. Likewise, an arthropod pest control composition can comprise one subset of hydrogel particles that are spherical in shape and a second subset of hydrogel particles that are ellipsoidal in shape. Likewise, an arthropod pest control composition can comprise one subset of hydrogel particles that are of a first size and a second subset of hydrogel particles that are of a second size. An arthropod pest control composition disclosed herein can include further components, such as, e.g., a matrix material disclosed herein, or an attractant disclosed herein.

The present specification discloses, in part, a hydrogel particle. A hydrogel particle is a particle composed of a hydrogel disclosed herein. In one embodiment, a hydrogel particle disclosed herein comprises one or more stimulus-responsive polymers. In an aspect of this embodiment, a hydrogel particle disclosed herein comprises one or more pH-responsive polymers. In another aspect of this embodiment, a hydrogel particle disclosed herein comprises at least one polyacidic polymer, at least one polybasic polymer or both at least one polyacidic polymer and at least one polybasic polymer. In aspects of this embodiment, a polyacidic polymer includes, e.g., poly(acrylate), poly(carboxylic acid), poly(sulfonamide), acrylamide, poly(acrylamide), acrylic acid, poly(acrylic acid), poly(ethacrylic acid), poly(propylacrylic acid), poly(acrylonitrile), methacrylic acid, methacrylic acid poly(ethyleneglycol) methyl ether methacrylate, poly(methacrylic acid), 2-hydroxyethylmethacrylate, 2-hydroxypropyl acrylate, poly(L-lactic acid), 3,3-dimethyl-3-silapentamethylene, alginate, carrageenan, hyaluronic acid, xanthan gum or any combination thereof. In other aspects of this embodiment, a polybasic polymer includes, e.g., poly(vinylpyrrolidine), poly(vinylamine), poly(vinyl-immidazole), poly(ethyleneimine), poly(propyleneimine), poly(L-lysine), N,N'-diethylethylenediamine, N,N-dimethylaminoethyl methacrylate, poly(N,N-diakylaminoethylmethacrylate), poly(N,N-dimethylaminoethylmethacrylate), poly(N,N-diethylaminoethylmethacrylate), poly(ethylene glycol), poly(ethylene glycol)dimethacrylate, poly(ethylene glycol)methyl ether methacrylate, poly(aminosaccharide), chitosan or any combination thereof. In an aspect of this embodiment, a hydrogel particle can comprise a poly(acrylic acid) polymer and/or a poly(ethylene glycol) polymer.

In another embodiment, a hydrogel particle disclosed herein can be a superporous hydrogel particle comprising pores. In aspects of this embodiment, a hydrogel particle disclosed herein further includes one or more pre-crosslinked matrix-swelling additives disclosed herein and/or one or more hybrid agents disclosed herein. In an aspect of this embodiment, a hydrogel particle can be a poly(acrylate)-based superporous hydrogel particle. In an aspect of this embodiment, a hydrogel particle can be a poly(acrylic acid)-based superporous hydrogel particle. In an aspect of this embodiment, a hydrogel particle can comprise a poly(acrylic acid) polymer and a poly(ethylene glycol) copolymer.

In other aspects of this embodiment, a hydrogel particle disclosed herein comprises pores having an average diameter of, e.g., at least 10 nm, at least 20 nm, at least 30 nm, at least 40 nm, at least 50 nm, at least 60 nm, at least 70 nm, at least 80 nm, at least 90 nm, at least 100 nm, at least 200 nm, at least 300 nm, at least 400 nm, at least 500 nm, at least 600 nm, at least 700 nm, at least 800 nm, at least 900 nm, at least 1 µm at least 2 µm at least 3 µm at least 4 µm at least 5 µm at least 10 µm at least 20 µm at least 30 µm at least 40 µm at least 50 µm at least 60 µm at least 70 µm at least 80 µm at least 90 µm at least 100 µm at least 200 µm at least 300 µm at least 400 µm at least 500 µm at least 600 µm at least 700 µm at least 800 µm at least 900 µm or at least 1 mm. In other aspects of this embodiment, a hydrogel particle disclosed herein comprises pores having an average diameter of, e.g., at most 10 nm, at most 20 nm, at most 30 nm, at most 40 nm, at most 50 nm, at most 60 nm, at most 70 nm, at most 80 nm, at most 90 nm, at most 100 nm, at most 200 nm, at most 300 nm, at most 400 nm, at most 500 nm, at most 600 nm, at most 700 nm, at most 800 nm, at most 900 nm, at most 1 µm at most 2 µm at most 3 µm at most 4 µm at most 5 µm at most 10 µm at most 20 µm at most 30 µm at most 40 µm at most 50 µm at most 60 µm at most 70 µm at most 80 µm at most 90 µm at most 100 µm at most 200 µm at most 300 µm at most 400 µm at most 500 µm at most 600 µm at most 700 µm at most 800 µm at most 900 µm or at most 1 mm. In other aspects of this embodiment, a hydrogel particle disclosed herein comprises pores having an average diameter of between, e.g., 10 nm to 25 nm, 10 nm to 50 nm, 10 nm to 75 nm, 10 nm to 100 nm, 25 nm to 50 nm, 25 nm to 75 nm, 25 nm to 100 nm, 50 nm to 75 nm, 50 nm to 100 nm, 75 nm to 100 nm, 100 nm to 250 nm, 100 nm to 500 nm, 100 nm to 750 nm, 100 nm to 1 µm 250 nm to 500 nm, 250 nm to 750 nm, 250 nm to 1 µm, 500 nm to 750 nm, 500 nm to 1 µm, 1 µm to 2.5 µm, 1 µm to 5 µm, 1 µm to 10 µm, 1 µm to 25 µm, 1 µm to 50 µm, 1 µm to 75 µm, 1 µm to 100 µm, 2.5 µm to 5 µm, 2.5 µm to 10 µm, 2.5 µm to 25 µm, 2.5 µm to 50 µm, 2.5 µm to 75 µm, 2.5 µm to 100 µm, 5 µm to 10 µm, 5 µm to 25 µm, 5 µm to 50 µm, 5 µm to 75 µm, 5 µm to 100 µm, 10 µm to 25 µm, 10 µm to 50 µm, 10 µm to 75 µm 10 µm to 100 µm, 25 µm to 50 µm, 25 µm to 75 µm, 25 µm to 100 µm, 50 µm to 75 µm, 50 µm to 100 µm 75 µm to 100 µm, 100 µm to 250 µm, 100 µm to 500 µm, 100 µm to 750 µm, 100 µm to 1 mm, 250 µm to 500 µm, 250 µm to 750 µm, 250 µm to 1 mm.

A hydrogel particle can be any shape with the proviso that a shape of a hydrogel particle does not prevent an arthropod pest from feeding on a hydrogel particle and ingesting it. Useful hydrogel particle shapes include, without limitation, spherical, ellipsoidal, polygonal, polyhedronal, cylindrical, conical or random in shape. In aspects of this embodiment, a hydrogel particle shape can be, e.g., roughly spherical, perfectly spherical, roughly ellipsoidal, perfectly ellipsoidal, roughly polygonal, perfectly polygonal, roughly polyhedronal, perfectly polyhedronal, roughly cylindrical, perfectly cylindrical, roughly conical, perfectly conical or random in shape.

A hydrogel particle can be any size with the proviso that a size of a hydrogel particle does not prevent an arthropod pest from feeding on a hydrogel particle and ingesting it. In one embodiment, a size of a hydrogel particle is determined by an average length of a hydrogel particle. In aspects of this embodiment, an average length is determined by the length of the longest dimension of height, width, or depth. In aspects of this embodiment, an average length is determined by the diameter of the hydrogel particle.

In aspects of this embodiment, a hydrogel particle disclosed herein has an average length of, e.g., at least 100 nm, at least 200 nm, at least 300 nm, at least 400 nm, at least 500 nm, at least 600 nm, at least 700 nm, at least 800 nm, at least 900 nm, at least 1 µm at least 2 µm at least 3 µm at least 4 µm at least 5 µm at least 10 µm at least 20 µm at least 30 µm at least 40 µm at least 50 µm at least 60 µm at least 70 µm at least 80 µm at least 90 µm at least 100 µm at least 200 µm at least 300 µm at least 400 µm at least 500 µm at least 600 µm at least 700 µm at least 800 µm at least 900 µm at least 1 mm, at least 2 mm, at least 3 mm, at least 4 mm, at least 5 mm, or at least 10 mm. In other aspects of this embodiment, a hydrogel particle disclosed herein has an average length of, e.g., at most 100 nm, at most 200 nm, at most 300 nm, at most 400 nm, at most 500 nm, at most 600 nm, at most 700 nm, at most 800 nm, at most 900 nm, at most 1 µm at most 2 µm at most 3 µm at most 4 µm at most 5 µm at most 10 µm at most 20 µm at most 30 µm at most 40 µm at most 50 µm at most 60 µm at most 70 µm at most 80 µm at most 90 µm at most 100 µm at most 200 µm at most 300 µm at most 400 µm at most 500 µm at most 600 µm, at most 700 µm at most 800 µm at most 900 µm at most 1 mm, at most 2 mm, at most 3 mm, at most 4 mm, at most 5 mm, or at most 10 mm. In other aspects of this embodiment, a hydrogel particle disclosed herein has an average length of between, e.g., 100 nm to 250 nm, 100 nm to 500 nm, 100 nm to 750 nm, 100 nm to 1 µm 250 nm to 500 nm, 250 nm to 750 nm, 250 nm to 1 µm, 500 nm to 750 nm, 500 nm to 1 µm, 1 µm to 2.5 µm, 1 µm to 5 µm, 1 µm to 10 µm, 1 µm to 25 µm, 1 µm to 50 µm, 1 µm to 75 µm, 1 µm to 100 µm, 2.5 µm to 5

μm, 2.5 μm to 10 μm, 2.5 μm to 25 μm, 2.5 μm to 50 μm, 2.5 μm to 75 μm, 2.5 μm to 100 μm, 5 μm to 10 μm, 5 μm to 25 μm, 5 μm to 50 μm, 5 μm to 75 μm, 5 μm to 100 μm, 10 μm to 25 μm 10 μm to 50 μm, 10 μm to 75 μm, 10 μm to 100 μm, 25 μm to 50 μm, 25 μm to 75 μm, 25 μm to 100 μm 50 μm to 75 μm, 50 μm to 100 μm, 75 μm to 100 μm, 100 μm to 250 μm, 100 μm to 500 μm, 100 μm to 750 μm, 100 μm to 1 mm, 250 μm to 500 μm, 250 μm to 750 μm, 250 μm to 1 mm, 1 mm to 2 mm, 1 mm to 3 mm, 1 mm to 4 mm, 1 mm to 5 mm, 1 mm to 10 mm, 2 mm to 3 mm, 2 mm to 4 mm, 2 mm to 5 mm, 2 mm to 10 mm, 3 mm to 4 mm, 3 mm to 5 mm, 3 mm to 10 mm, 4 mm to 5 mm, 4 mm to 10 mm or 5 mm to 10 mm.

In aspects of this embodiment, a hydrogel particle disclosed herein has an average diameter of, e.g., at least 100 nm, at least 200 nm, at least 300 nm, at least 400 nm, at least 500 nm, at least 600 nm, at least 700 nm, at least 800 nm, at least 900 nm, at least 1 μm at least 2 μm at least 3 μm at least 4 μm at least 5 μm at least 10 μm at least 20 μm at least 30 μm at least 40 μm at least 50 μm at least 60 μm at least 70 μm at least 80 μm at least 90 μm at least 100 μm at least 200 μm at least 300 μm at least 400 μm at least 500 μm at least 600 μm at least 700 μm at least 800 μm at least 900 μm at least 1 mm, at least 2 mm, at least 3 mm, at least 4 mm, at least 5 mm, or at least 10 mm. In other aspects of this embodiment, a hydrogel particle disclosed herein has an diameter length of, e.g., at most 100 nm, at most 200 nm, at most 300 nm, at most 400 nm, at most 500 nm, at most 600 nm, at most 700 nm, at most 800 nm, at most 900 nm, at most 1 μm at most 2 μm at most 3 μm at most 4 μm at most 5 μm at most 10 μm, at most 20 μm at most 30 μm at most 40 μm at most 50 μm at most 60 μm at most 70 μm at most 80 μm at most 90 μm at most 100 μm at most 200 μm at most 300 μm at most 400 μm at most 500 μm at most 600 μm at most 700 μm at most 800 μm at most 900 μm at most 1 mm, at most 2 mm, at most 3 mm, at most 4 mm, at most 5 mm, or at most 10 mm. In yet other aspects of this embodiment, a hydrogel particle disclosed herein has an average diameter of between, e.g., 100 nm to 250 nm, 100 nm to 500 nm, 100 nm to 750 nm, 100 nm to 1 μm 250 nm to 500 nm, 250 nm to 750 nm, 250 nm to 1 μm 500 nm to 750 nm, 500 nm to 1 μm, 1 μm to 2.5 μm, 1 μm to 5 μm, 1 μm to 10 μm, 1 μm to 25 μm, 1 μm to 50 μm, 1 μm to 75 μm, 1 μm to 100 μm, 2.5 μm to 5 μm, 2.5 μm to 10 μm, 2.5 μm to 25 μm, 2.5 μm to 50 μm, 2.5 μm to 75 μm, 2.5 μm to 100 μm, 5 μm to 10 μm, 5 μm to 25 μm, 5 μm to 50 μm, 5 μm to 75 μm, 5 μm to 100 μm 10 μm to 25 μm, 10 μm to 50 μm, 10 μm to 75 μm, 10 μm to 100 μm, 25 μm to 50 μm, 25 μm to 75 μm, 25 μm to 100 μm, 50 μm to 75 μm, 50 μm to 100 μm 75 μm to 100 μm, 100 μm to 250 μm, 100 μm to 500 μm, 100 μm to 750 μm, 100 μm to 1 mm, 250 μm to 500 μm, 250 μm to 750 μm, 250 μm to 1 mm, 1 mm to 2 mm, 1 mm to 3 mm, 1 mm to 4 mm, 1 mm to 5 mm, 1 mm to 10 mm, 2 mm to 3 mm, 2 mm to 4 mm, 2 mm to 5 mm, 2 mm to 10 mm, 3 mm to 4 mm, 3 mm to 5 mm, 3 mm to 10 mm, 4 mm to 5 mm, 4 mm to 10 mm or 5 mm to 10 mm.

In one embodiment, a size of a hydrogel particle is determined by an average volume of a hydrogel particle. In aspects of this embodiment, a hydrogel particle disclosed herein has an average volume of, e.g., at least 10 μm$^3$, at least 20 μm$^3$, at least 30 μm$^3$, at least 40 μm$^3$, at least 50 μm$^3$, at least 60 μm$^3$, at least 70 μm$^3$, at least 80 μm$^3$, at least 90 μm$^3$, at least 100 μm$^3$, at least 200 μm$^3$, at least 300 μm$^3$, at least 400 μm$^3$, at least 500 μm$^3$, at least 600 μm$^3$, at least 700 μm$^3$, at least 800 μm$^3$, at least 900 μm$^3$, at least 1 mm$^3$, at least 2 mm$^3$, at least 3 mm$^3$, at least 4 mm$^3$, at least 5 mm$^3$, at least 10 mm$^3$, at least 20 mm$^3$, at least 30 mm$^3$, at least 40 mm$^3$, at least 50 mm$^3$, at least 60 mm$^3$, at least 70 mm$^3$, at least 80 mm$^3$, at least 90 mm$^3$ or at least 100 mm$^3$. In other aspects of this embodiment, a hydrogel particle disclosed herein has an average volume of, e.g., at most 10 μm$^3$, at most 20 μm$^3$, at most 30 μm$^3$, at most 40 μm$^3$, at most 50 μm$^3$, at most 60 μm$^3$, at most 70 μm$^3$, at most 80 μm$^3$, at most 90 μm$^3$, at most 100 μm$^3$, at most 200 μm$^3$, at most 300 μm$^3$, at most 400 μm$^3$, at most 500 μm$^3$, at most 600 μm$^3$, at most 700 μm$^3$, at most 800 μm$^3$, at most 900 μm$^3$, at most 1 mm$^3$, at most 2 mm$^3$, at most 3 mm$^3$, at most 4 mm$^3$, at most 5 mm$^3$, at most 10 mm$^3$, at most 20 mm$^3$, at most 30 mm$^3$, at most 40 mm$^3$, at most 50 mm$^3$, at most 60 mm$^3$, at most 70 mm$^3$, at most 80 mm$^3$, at most 90 mm$^3$ or at most 100 mm$^3$. In yet other aspects of this embodiment, a hydrogel particle disclosed herein has an average volume of between, e.g., 10 μm$^3$ to 25 μm$^3$, 10 μm$^3$ to 50 μm$^3$ 10 μm$^3$ to 75 μm$^3$, 10 μm$^3$ to 100 μm$^3$, 25 μm$^3$ to 50 μm$^3$, 25 μm$^3$ to 75 μm$^3$, 25 μm$^3$ to 100 μm$^3$, 50 μm$^3$ to 75 μm$^3$, 50 μm$^3$ to 100 μm$^3$, 75 μm$^3$ to 100 μm$^3$, 100 μm$^3$ to 250 μm$^3$, 100 μm$^3$ to 500 μm$^3$, 100 μm$^3$ to 750 μm$^3$, 100 μm$^3$ to 1 mm$^3$, 250 μm$^3$ to 500 μm$^3$, 250 μm$^3$ to 750 μm$^3$, 250 μm$^3$ to 1 mm$^3$, 500 μm$^3$ to 750 μm$^3$, 500 μm$^3$ to 1 mm$^3$, 750 μm$^3$ to 1 mm$^3$, 1 mm$^3$ to 2.5 mm$^3$, 1 mm$^3$ to 5 mm$^3$, 1 mm$^3$ to 7.5 mm$^3$, 1 mm$^3$ to 10 mm$^3$, 2.5 mm$^3$ to 5 mm$^3$, 2.5 mm$^3$ to 7.5 mm$^3$, 2.5 mm$^3$ to 10 mm$^3$, 5 mm$^3$ to 7.5 mm$^3$, 5 mm$^3$ to 10 mm$^3$, 7.5 mm$^3$ to 10 mm$^3$, 10 mm$^3$ to 25 mm$^3$, 10 mm$^3$ to 50 mm$^3$, 10 mm$^3$ to 75 mm$^3$, 10 mm$^3$ to 100 mm$^3$, 25 mm$^3$ to 50 mm$^3$, 25 mm$^3$ to 75 mm$^3$, 25 mm$^3$ to 100 mm$^3$, 50 mm$^3$ to 75 mm$^3$, 50 mm$^3$ to 100 mm$^3$ or 75 mm$^3$ to 100 mm$^3$.

A hydrogel particle disclosed herein can be coated or encapsulated with a polyhedrin protein. A polyhedrin is a protein-based structure that forms the exterior of occlusion bodies of Baculovirus. Also known as polyhedra, a polyhedrin protects virus particles from the outside environment for extended periods (10 to 50 years) until the virus particles are ingested by an insect. This protective coating dissolves under the alkaline conditions. As such, coating a hydrogel particle disclosed herein with a polyhedrin protein would provide protection to the particles when deployed in the environment, up until the coated hydrogel particles are ingested by an arthropod pest and thus exposed to alkaline conditions in the gut. In an embodiment, a hydrogel particle disclosed herein is coated with one or more polyhedrin proteins.

In another embodiment, an arthropod pest control composition is a composition comprising a hydrogel composition disclosed herein. A hydrogel composition is a composition composed of a hydrogel disclosed herein. In one embodiment, a hydrogel composition disclosed herein can comprises one or more stimulus-responsive polymers. In an aspect of this embodiment, a hydrogel composition disclosed herein comprises one or more pH-responsive polymers. In another aspect of this embodiment, a hydrogel composition disclosed herein comprises at least one polyacidic polymer, at least one polybasic polymer or both at least one polyacidic polymer and at least one polybasic polymer. In aspects of this embodiment, a polyacidic polymer includes, e.g., poly(acrylate), poly(carboxylic acid), poly(sulfonamide), acrylamide, poly(acrylamide), acrylic acid, poly(acrylic acid), poly(ethacrylic acid), poly(propylacrylic acid), poly(acrylonitrile), methacrylic acid, methacrylic acid poly(ethyleneglycol) methyl ether methacrylate, poly(methacrylic acid), 2-hydroxyethylmethacrylate, 2-hydroxypropyl acrylate, poly(L-lactic acid), 3,3-dimethyl-3-silapentamethylene, alginate, carrageenan, hyaluronic acid, xanthan gum or any combination thereof. In other aspects of this embodiment, a polybasic polymer includes, e.g., poly (vinylpyrrolidine), poly(vinylamine), poly(vinyl-immidazole), poly(ethyleneimine), poly(propyleneimine), poly(L-lysine), N,N'-diethylethylenediamine, N,N-dimethylaminoethyl methacrylate, poly(N,N-diakylaminoethylmethacrylate), poly(N,N-dimethylaminoethylmethacrylate), poly(N,N-diethylaminoethylmethacrylate), poly(ethylene glycol), poly(ethylene glycol)dimethacrylate, poly(ethylene glycol) methyl ether methacrylate, poly(aminosaccharide), chitosan or any combination thereof. A hydrogel composition disclosed herein can include further components, such as, e.g., a matrix material disclosed herein, or an attractant disclosed herein. In an aspect of this embodiment, a hydrogel composition can be a poly(acrylate)-based superporous hydrogel particles. In an aspect of this embodiment, a hydrogel composition can be a poly(acrylic acid)-based superporous hydrogel particles. In an aspect of this embodiment, a hydrogel composition can comprise a poly(acrylic acid) polymer and a poly(ethylene glycol) polymer.

In another embodiment, a hydrogel composition disclosed herein can be a superporous hydrogel comprising pores. In aspects of this embodiment, a hydrogel composition disclosed herein further include one or more pre-cross-linked matrix-swelling additives disclosed herein and/or one or more hybrid agents disclosed herein. In an aspect of this embodiment, hydrogel composition can be a poly(acrylate)-based superporous hydrogel particles. In an aspect of this embodiment, a hydrogel composition can be a poly(acrylic acid)-based superporous hydrogel particles. In an aspect of this embodiment, a hydrogel composition can comprise a poly(acrylic acid) polymer and a poly(ethylene glycol) copolymer.

In other aspects of this embodiment, a hydrogel composition disclosed herein comprises pores having an average diameter of, e.g., at least 10 nm, at least 20 nm, at least 30 nm, at least 40 nm, at least 50 nm, at least 60 nm, at least 70 nm, at least 80 nm, at least 90 nm, at least 100 nm, at least 200 nm, at least 300 nm, at least 400 nm, at least 500 nm, at least 600 nm, at least 700 nm, at least 800 nm, at least 900 nm, at least 1 µm at least 2 µm at least 3 µm at least 4 µm at least 5 µm at least 10 µm at least 20 µm, at least 30 µm at least 40 µm at least 50 µm at least 60 µm at least 70 µm at least 80 µm at least 90 µm at least 100 µm at least 200 µm at least 300 µm at least 400 µm at least 500 µm at least 600 µm, at least 700 µm at least 800 µm at least 900 µm or at least 1 mm. In other aspects of this embodiment, a hydrogel composition disclosed herein comprises pores having an average diameter of, e.g., at most 10 nm, at most 20 nm, at most 30 nm, at most 40 nm, at most 50 nm, at most 60 nm, at most 70 nm, at most 80 nm, at most 90 nm, at most 100 nm, at most 200 nm, at most 300 nm, at most 400 nm, at most 500 nm, at most 600 nm, at most 700 nm, at most 800 nm, at most 900 nm, at most 1 µm at most 2 µm at most 3 µm, at most 4 µm at most 5 µm at most 10 µm at most 20 µm at most 30 µm at most 40 µm at most 50 µm, at most 60 µm at most 70 µm at most 80 µm at most 90 µm at most 100 µm at most 200 µm at most 300 µm at most 400 µm at most 500 µm at most 600 µm at most 700 µm at most 800 µm at most 900 µm or at most 1 mm. In other aspects of this embodiment, a hydrogel composition disclosed herein comprises pores having an average diameter of between, e.g., 10 nm to 25 nm, 10 nm to 50 nm, 10 nm to 75 nm, 10 nm to 100 nm, 25 nm to 50 nm, 25 nm to 75 nm, 25 nm to 100 nm, 50 nm to 75 nm, 50 nm to 100 nm, 75 nm to 100 nm, 100 nm to 250 nm, 100 nm to 500 nm, 100 nm to 750 nm, 100 nm to 1 µm, 250 nm to 500 nm, 250 nm to 750 nm, 250 nm to 1 µm, 500 nm to 750 nm, 500 nm to 1 µm, 1 µm to 2.5 µm, 1 µm to 5 µm, 1 µm to 10 µm, 1 µm to 25 µm, 1 µm to 50 µm, 1 µm to 75 µm, 1 µm to 100 µm, 2.5 µm to 5 µm, 2.5 µm to 10 µm, 2.5 µm to 25 µm, 2.5 µm to 50 µm, 2.5 µm to 75 µm, 2.5 µm to 100 µm, 5 µm to 10 µm, 5 µm to 25 µm, 5 µm to 50 µm, 5 µm to 75 µm, 5 µm to 100 µm, 10 µm to 25 µm, 10 µm to 50 µm, 10 µm to 75 µm, 10 µm to 100 µm, 25 µm to 50 µm, 25 µm to 75 µm, 25 µm to 100 µm, 50 µm to 75 µm, 50 µm to 100 µm, 75 µm to 100 µm, 100 µm to 250 µm, 100 µm to 500 µm, 100 µm to 750 µm, 100 µm to 1 mm, 250 µm to 500 µm, 250 µm to 750 µm, 250 µm to 1 mm.

An arthropod pest control composition disclosed herein is one that can be prone to degrading, eroding, resorbing, decomposing, or breaking down to a substantial or significant degree once applied according to the methods and uses disclosed herein. In aspects of this embodiment, at least 75%, at least 80%, at least 85%, at least 90%, at least 95%, at least 99% of an arthropod pest control composition disclosed herein biodegrades in, e.g., about 1 day, about 2 days, about 3 days, about 4 days, about 5 days, about 6 days or about 7 days. In other aspects of this embodiment, at least 75%, at least 80%, at least 85%, at least 90%, at least 95%, at least 99% of an arthropod pest control composition disclosed herein biodegrades in, e.g., about 1 to about 2 days, about 1 to about 3 days, about 1 to about 4 days, about 1 to about 5 days, about 1 to about 6 days, about 1 to about 7 days, about 2 to about 3 days, about 2 to about 4 days, about 2 to about 5 days, about 2 to about 6 days, about 2 to about 7 days, about 3 to about 4 days, about 3 to about 5 days, about 3 to about 6 days, about 3 to about 7 days, about 4 to about 5 days, about 4 to about 6 days, about 4 to about 7 days, about 5 to about 6 days, about 5 to about 7 days or about 6 to about 7 days.

In aspects of this embodiment, at least 75%, at least 80%, at least 85%, at least 90%, at least 95%, at least 99% of an arthropod pest control composition disclosed herein biodegrades in, e.g., about 7 days, about 8 days, about 9 days, about 10 days, about 11 days, about 12 days, about 13 days or about 14 days. In other aspects of this embodiment, at least 75%, at least 80%, at least 85%, at least 90%, at least 95%, at least 99% of an arthropod pest control composition disclosed herein disclosed herein biodegrades in, e.g., about 7 to about 8 days, about 7 to about 9 days, about 7 to about 10 days, about 7 to about 11 days, about 7 to about 12 days, about 7 to about 13 days, about 7 to about 14 days, about 8 to about 9 days, about 8 to about 10 days, about 8 to about 11 days, about 8 to about 12 days, about 8 to about 13 days, about 8 to about 14 days, about 9 to about 10 days, about 9 to about 11 days, about 9 to about 12 days, about 9 to about 13 days, about 9 to about 14 days, about 9 to about 11 days, about 9 to about 12 days, about 9 to about 13 days, about 9 to about 14 days, about 10 to about 11 days, about 10 to about 12 days, about 10 to about 13 days, about 10 to about 14 days, about 11 to about 12 days, about 11 to about 13 days, about 11 to about 14 days, about 12 to about 13 days, about 12 to about 14 days or about 13 to about 14 days.

In aspects of this embodiment, at least 75%, at least 80%, at least 85%, at least 90%, at least 95%, at least 99% of an arthropod pest control composition disclosed herein biodegrades in, e.g., about 15 days, about 16 days, about 17 days, about 18 days, about 19 days, about 20 days or about 21 days. In other aspects of this embodiment, at least 75%, at least 80%, at least 85%, at least 90%, at least 95%, at least 99% of an arthropod pest control composition disclosed herein biodegrades in, e.g., about 15 to about 16 days, about 15 to about 17 days, about 15 to about 18 days, about 15 to about 19 days, about 15 to about 20 days, about 15 to about 21 days, about 16 to about 17 days, about 16 to about 18 days, about 16 to about 19 days, about 16 to about 20 days, about 16 to about 21 days, about 17 to about 18 days, about 17 to about 19 days, about 17 to about 20 days, about 17 to about 21 days, about 18 to about 19 days, about 18 to about 20 days, about 18 to about 21 days, about 19 to about 20 days, about 19 to about 21 days or about 20 to about 21 days.

In one embodiment, an arthropod pest control composition disclosed herein can have minimal adverse effects on humans, other mammals including domestic animals, plant life and the environment. In an aspect of this embodiment, an arthropod pest control composition disclosed herein is substantially non-toxic to humans, mammals, plants and the environment. In other aspects of this embodiment, an arthropod pest control composition disclosed herein is essentially non-toxic to humans, mammals, plants and the environment.

An arthropod pest control composition can further comprise an attractant. An attractant is a compound that attracts an arthropod pest to an arthropod pest control composition disclosed herein and/or stimulates feeding behavior of an arthropod pest to ingest an arthropod pest control composition disclosed herein. In an embodiment, an attractant includes a compound that binds an odorant receptor. In aspects of this embodiment, a compound that binds an odorant receptor includes an odorant binding protein. An odorant binding protein includes, without limitation, an odorant binding protein 1. In another embodiment, an attractant includes a fish meal, a shrimp meal, a squid meal, a soybean meal, an oat meal, a wheat meal, spirulina or any combination thereof. In an aspect of this embodiment, a fish meal includes tetramin.

An arthropod pest control composition disclosed herein can further comprise a matrix material. A matrix material included in an arthropod pest control composition disclosed herein provides one or more of the following characteristics: 1) structural integrity to an arthropod pest control composition disclosed herein to facilitate molding or shaping; 2) density parameters that facilitate an arthropod pest control composition disclosed herein to float in an aquatic environment, sink in an aquatic environment, or be dispersed under pressure using a spraying mechanism.

A matrix material includes any hydrophilic and/or hydrophobic material. Non-limiting examples of a matrix material include an agar, a cellulose ether, an aliphatic alcohol, a polyalkylene glycol, an acrylic resin, a long-chain $C_{8-50}$ substituted or unsubstituted hydrocarbon. In an aspect of this embodiment, an agar includes a mixture of two polysaccharides, e.g., agarose and agaropectin. In an aspect of this embodiment, a cellulose ether can be, e.g., an alkylcellulose, a hydroxyalkylcellulose or a carboxyalkylcellulose. In an aspect of this embodiment, an alkylcellulose cellulose can be, e.g., ethylcellulose, propylcellulose and propylmetlhylcellulose. In an aspect of this embodiment, a hydroxyalkyl cellulose can be, e.g., hydroxypropylcellulose, hydroxypropylmetlhylcellulose and hydroxyethyl cellulose. In an aspect of this embodiment, a carboxyalkylcellulose cellulose can be, e.g., carboxyethylcellulose, carboxypropylcellulose and carboxypropylmetlhylcellulose. In an aspect of this embodiment, a long-chain substituted, or unsubstituted hydrocarbon can be, e.g., a $C_{8-50}$ substituted or unsubstituted hydrocarbon, such as, e.g., a fatty acid, a fatty alcohol, a fatty acid ester, a hydrogenated mineral oil, a hydrogenated vegetable oil and a wax.

An arthropod pest control composition disclosed herein is produced into a shape. An arthropod pest control composition disclosed herein can be made into any size or shape as long as the size and shape are suitable for administering a composition disclosed herein or a hydrogel composition disclosed herein into the environment were arthropod pest control is desired. In an aspect of this embodiment, composition disclosed herein, or a hydrogel composition disclosed herein can be made into a powder, granules, a tablet or a disc.

In one embodiment, a composition disclosed herein comprises a first portion including a matrix material disclosed herein and a second portion comprising one or more hydrogel particles disclosed herein and optionally a matrix material disclosed herein.

In one embodiment, a composition disclosed herein comprises one or more hydrogel particles and the matrix material that are interspersed throughout the entire composition.

In one embodiment, a hydrogel composition disclosed herein comprises one or more hydrogel particles. In aspects of this embodiment, a hydrogel composition disclosed herein comprises one or more hydrogel particles and a matrix material disclosed herein that are interspersed throughout the entire hydrogel composition.

The present specification discloses, in part, kits comprising one or more components useful to practice a method or use disclosed herein. Kits provide a convenient enclosure of components useful to practice a method or use disclosed herein to allow for convenient storage, transport, and use as well as facilitate or enhance a commercial sale. For example, a kit may comprise an arthropod pest control composition disclosed herein and one or more other reagents useful to practice a method or use disclosed herein, such as, e.g., one or more dilutants and/or one or more carriers.

Kits typically provide a suitable container, e.g., a box or other enclosed carrier that contain the one or more components useful to practice a method or use disclosed herein. In addition, kits disclosed herein will typically include separate containers, e.g., a bottle, a vial, a flask or other enclosed carrier that contains the one or more components. For example, a container for an arthropod pest control composition disclosed herein, and a separate container for the one or more other reagents included in the kit. Kits can be portable, for example, able to be transported and used in remote areas such as commercial or industrial installations or agricultural fields. Other kits may be of use in or around a residential building or other non-commercial installations such as parks, recreational areas, and yards.

A kit disclosed herein may include labels or inserts. Labels or inserts include "printed matter" that can be provided as separate material, a packing material (e.g., a box), or attached or affixed to a container containing a kit component. Labels or inserts can additionally include a computer readable medium, such as a disk (e.g., hard disk, flash memory), optical disk such as CD- or DVD-ROM/RAM, DVD, MP3, magnetic tape, or an electrical storage media such as RAM and ROM or hybrids of these such as magnetic/optical storage media, FLASH media or memory type cards. Labels or inserts may include identifying information of one or more components therein, dose amounts, dose frequency or timing, information on the individual components. Labels or inserts can include information identifying manufacturer information, lot numbers, manufacturer location and date. Labels or inserts can include information on a condition or situation for which a kit component may be used. Labels or inserts can include instructions for using one or more of the kit components in a method or use as disclosed herein. Instructions can include dosage amounts, frequency or duration, and instructions for practicing any of the methods or uses, or treatment protocols described herein as well as warnings on potential hazards or situations where it would not be appropriate to use the components of the kit.

The present specification discloses, in part, a method of controlling an arthropod pest population comprising one or more arthropod pests. A method of controlling a population of arthropod pests disclosed herein includes a step of applying an effective amount of an arthropod pest control composition disclosed herein to one or more arthropod pests and/or applying an effective amount of an arthropod pest control composition disclosed herein to one or more locations where arthropod pest control is desired. In one embodiment, upon ingestion of the arthropod pest control composition, the one or more hydrogel particles expand in the alimentary canal of the one or more arthropods thereby killing the one or more arthropod pests. In another embodiment, upon ingestion of the arthropod pest control composition, the hydrogel composition expands in the alimentary canal of the one or more arthropods thereby killing the one or more arthropod pests.

The present specification discloses, in part, use of an arthropod pest control composition disclosed herein in controlling an arthropod pest population comprising one or more arthropod pests. Use of a disclosed composition or a hydrogel composition includes applying an effective amount of a disclosed arthropod pest control composition to one or more arthropod pests and/or applying an effective amount of a disclosed arthropod pest control composition to one or more locations where arthropod pest control is desired.

The present specification discloses, in part, an arthropod pest control composition disclosed herein for use in controlling an arthropod pest population comprising one or more arthropod pests. Use of a disclosed arthropod pest control composition includes applying an effective amount of a disclosed composition or a hydrogel composition to one or more arthropod pests and/or applying an effective amount of a disclosed arthropod pest control composition to one or more locations where arthropod pest control is desired.

Application of an arthropod pest control composition disclosed herein is in an effective amount. An effective amount of an arthropod pest control composition disclosed herein can be an amount sufficient to cause an adverse effect on an arthropod pest sought to be controlled. The actual effective amount of a disclosed arthropod pest control composition is determined by routine screening procedures employed to evaluate controlling activity and efficacy of a disclosed arthropod pest control composition. Such screening procedures are well known by those skilled in the art. It is expected that a disclosed arthropod pest control composition having a higher level of activity can be used in smaller amounts and concentrations, while those having a lower level of activity may require larger amounts or concentrations in order to achieve the same controlling effect.

In aspects of this embodiment, an effective amount of a disclosed arthropod pest control composition is an amount sufficient to cause an adverse effect on, e.g., about 10%, about 15%, about 20%, about 25%, about 30%, about 35%, about 40%, about 45%, about 50%, about 55%, about 60%, about 65%, about 70%, about 75%, about 80%, about 85%, about 90% or about 95% of arthropod pests in the population. In other aspects of this embodiment, an effective amount of a disclosed arthropod pest control composition is an amount sufficient to cause an adverse effect on, e.g., at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90% or at least 95% of arthropod pests in the population. In still other aspects of this embodiment, an effective amount of a disclosed arthropod pest control composition is an amount sufficient to cause an adverse effect on, e.g., at most 10%, at most 15%, at most 20%, at most 25%, at most 30%, at most 35%, at most 40%, at most 45%, at most 50%, at most 55%, at most 60%, at most 65%, at most 70%, at most 75%, at most 80%, at most 85%, at most 90% or at most 95% of arthropod pests in the population. In yet other aspects of this embodiment, an effective amount of a disclosed arthropod pest control composition is an amount that has an adverse effect on, e.g., about 10% to about 20%, about 10% to about 30%, about 10% to about 40%, about 10% to about 50%, about 10% to about 60%, about 10% to about 70%, about 10% to about 80%, about 10% to about 90%, about 10% to about 95%, about 20% to about 30%, about 20% to about 40%, about 20% to about 50%, about 20% to about 60%, about 20% to about 70%, about 20% to about 80%, about 20% to about 90%, about 20% to about 95%, about 30% to about 40%, about 30% to about 50%, about 30% to about 60%, about 30% to about 70%, about 30% to about 80%, about 30% to about 90%, about 30% to about 95%, about 40% to about 50%, about 40% to about 60%, about 40% to about 70%, about 40% to about 80%, about 40% to about 90%, about 40% to about 95%, about 50% to about 60%, about 50% to about 70%, about 50% to about 80%, about 50% to about 90%, about 50% to about 95%, about 60% to about 70%, about 60% to about 80%, about 60% to about 90%, about 60% to about 95%, about 70% to about 80%, about 70% to about 90%, about 70% to about 95%, about 80% to about 90%, about 80% to about 95% or about 90% to about 95% of arthropod pests in the population.

An effective amount of a disclosed arthropod pest control composition can be an amount sufficient to cause mortality to arthropod pests sought to be controlled. In aspects of this embodiment, an effective amount of a disclosed arthropod pest control composition is an amount sufficient to cause mortality on, e.g., about 10%, about 15%, about 20%, about 25%, about 30%, about 35%, about 40%, about 45%, about 50%, about 55%, about 60%, about 65%, about 70%, about 75%, about 80%, about 85%, about 90% or about 95% of arthropod pests in the population. In other aspects of this embodiment, an effective amount of a disclosed arthropod pest control composition is an amount sufficient to cause mortality on, e.g., at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90% or at least 95% of arthropod pests in the population. In yet other aspects of this embodiment, an effective amount of a disclosed arthropod pest control composition is an amount sufficient to cause mortality on, e.g., at most 10%, at most 15%, at most 20%, at most 25%, at most 30%, at most 35%, at most 40%, at most 45%, at most 50%, at most 55%, at most 60%, at most 65%, at most 70%, at most 75%, at most 80%, at most 85%, at most 90% or at most 95% of arthropod pests in the population. In still other aspects of this embodiment, an effective amount of a disclosed arthropod pest control composition is an amount sufficient to cause mortality on, e.g., about 10% to about 20%, about 10% to about 30%, about 10% to about 40%, about 10% to about 50%, about 10% to about 60%, about 10% to about 70%, about 10% to about 80%, about 10% to about 90%, about 10% to about 95%, about 20% to about 30%, about 20% to about 40%, about 20% to about 50%, about 20% to about 60%, about 20% to about 70%, about 20% to about 80%, about 20% to about 90%, about 20% to about 95%, about 30% to about 40%, about 30% to about 50%, about 30% to about 60%, about 30% to about 70%, about 30% to about 80%, about 30% to about 90%, about 30% to about 95%, about 40% to about 50%, about 40% to about 60%, about 40% to about 70%, about 40% to about 80%, about 40% to about 90%, about 40% to about 95%, about 50% to about 60%, about 50% to about 70%, about 50% to about 80%, about 50% to about 90%, about 50% to about 95%, about 60% to about 70%, about 60% to about 80%, about 60% to about 90%, about 60% to about 95%, about 70% to about 80%, about 70% to about 90%, about 70% to about 95%, about 80% to about 90%, about 80% to about 95% or about 90% to about 95% of arthropod pests in the population.

An effective amount of a disclosed arthropod pest control composition can be an amount sufficient to reduce the size of the population of arthropod pests sought to be controlled. In aspects of this embodiment, an effective amount of a disclosed arthropod pest control composition is an amount sufficient to reduce the size of the population of arthropod pests sought to be controlled by, e.g., about 10%, about 15%, about 20%, about 25%, about 30%, about 35%, about 40%, about 45%, about 50%, about 55%, about 60%, about 65%, about 70%, about 75%, about 80%, about 85%, about 90% or about 95%. In other aspects of this embodiment, an effective amount of a disclosed arthropod pest control composition is an amount sufficient to reduce the size of the population of arthropod pests sought to be controlled by, e.g., at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90% or at least 95%. In yet other aspects of this embodiment, an effective amount of a disclosed arthropod pest control composition is an amount sufficient to reduce the size of the population of arthropod pests sought to be controlled by, e.g., at most 10%, at most 15%, at most 20%, at most 25%, at most 30%, at most 35%, at most 40%, at most 45%, at most 50%, at most 55%, at most 60%, at most 65%, at most 70%, at most 75%, at most 80%, at most 85%, at most 90% or at most 95%. In still other aspects of this embodiment, an effective amount of a disclosed arthropod pest control composition is an amount sufficient to reduce the size of the population of arthropod pests sought to be controlled by, e.g., about 10% to about 20%, about 10% to about 30%, about 10% to about 40%, about 10% to about 50%, about 10% to about 60%, about 10% to about 70%, about 10% to about 80%, about 10% to about 90%, about 10% to about 95%, about 20% to about 30%, about 20% to about 40%, about 20% to about 50%, about 20% to about 60%, about 20% to about 70%, about 20% to about 80%, about 20% to about 90%, about 20% to about 95%, about 30% to about 40%, about 30% to about 50%, about 30% to about 60%, about 30% to about 70%, about 30% to about 80%, about 30% to about 90%, about 30% to about 95%, about 40% to about 50%, about 40% to about 60%, about 40% to about 70%, about 40% to about 80%, about 40% to about 90%, about 40% to about 95%, about 50% to about 60%, about 50% to about 70%, about 50% to about 80%, about 50% to about 90%, about 50% to about 95%, about 60% to about 70%, about 60% to about 80%, about 60% to about 90%, about 60% to about 95%, about 70% to about 80%, about 70% to about 90%, about 70% to about 95%, about 80% to about 90%, about 80% to about 95% or about 90% to about 95%.

An effective amount of a disclosed arthropod pest control composition can be an amount sufficient to deter arthropod pests sought to be controlled from entering or infesting one or more locations. In aspects of this embodiment, an effective amount of a disclosed arthropod pest control composition is an amount sufficient to deter, e.g., about 10%, about 15%, about 20%, about 25%, about 30%, about 35%, about 40%, about 45%, about 50%, about 55%, about 60%, about 65%, about 70%, about 75%, about 80%, about 85%, about 90% or about 95% of arthropod pests in the population from entering or infesting one or more locations. In other aspects of this embodiment, an effective amount of a disclosed arthropod pest control composition is an amount sufficient to deter, e.g., at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90% or at least 95% of arthropod pests in the population from entering or infesting one or more locations. In yet other aspects of this embodiment, an effective amount of a disclosed arthropod pest control composition is an amount sufficient to deter, e.g., at most 10%, at most 15%, at most 20%, at most 25%, at most 30%, at most 35%, at most 40%, at most 45%, at most 50%, at most 55%, at most 60%, at most 65%, at most 70%, at most 75%, at most 80%, at most 85%, at most 90% or at most 95% of arthropod pests in the population from entering or infesting one or more locations. In still other aspects of this embodiment, an effective amount of a disclosed arthropod pest control composition is an amount sufficient to deter, e.g., about 10% to about 20%, about 10% to about 30%, about 10% to about 40%, about 10% to about 50%, about 10% to about 60%, about 10% to about 70%, about 10% to about 80%, about 10% to about 90%, about 10% to about 95%, about 20% to about 30%, about 20% to about 40%, about 20% to about 50%, about 20% to about 60%, about 20% to about 70%, about 20% to about 80%, about 20% to about 90%, about 20% to about 95%, about 30% to about 40%, about 30% to about 50%, about 30% to about 60%, about 30% to about 70%, about 30% to about 80%, about 30% to about 90%, about 30% to about 95%, about 40% to about 50%, about 40% to about 60%, about 40% to about 70%, about 40% to about 80%, about 40% to about 90%, about 40% to about 95%, about 50% to about 60%, about 50% to about 70%, about 50% to about 80%, about 50% to about 90%, about 50% to about 95%, about 60% to about 70%, about 60% to about 80%, about 60% to about 90%, about 60% to about 95%, about 70% to about 80%, about 70% to about 90%, about 70% to about 95%, about 80% to about 90%, about 80% to about 95% or about 90% to about 95% of arthropod pests in the population from entering or infesting one or more locations.

The efficacy of the pest control composition disclosed herein may be monitored by determining the adverse effects, mortality, reduced pest population, reduced entering or infestation of one or more locations, or any other assessment of damage to a pest population, including, without limitation, inhibition, arrestment, or retardation of pest growth, inhibition, arrestment, or retardation of pest reproduction or inhibition, arrestment, or retardation of pest development, all of which are encompassed by the term "controlling". Efficacy may also be assessed by the phytotoxicity to plants infested with the pest population, tissue damage to the host infected with the pest population and any adverse effects that might be experienced by a human who is applying a disclosed pest control composition to an infested plant or animal, or otherwise exposed to a pest control composition disclosed herein.

The present specification discloses, in part, a location. A location includes, by way of example, a plant or group of plants or part of a plant, a particular area of land like a lawn, a garden or an agricultural field, or a man-made structure, such as, e.g., a commercial building, a residential house, a community facility, a barn, a stable, a shed, a greenhouse or any other physical structure. As used herein, the term "plant" refers to any living organism belonging to the Kingdom Plantae. Non-limiting examples include trees, flowering plant, herbs, bushes, grasses, vines, ferns, mosses, and green algae. As used herein, the term "flower" is synonymous with "bloom" or "blossom" and refers the reproductive structure found in angiosperms. As used herein, the term "crop plant" refers to a plant that produces a crop. Non-limiting examples include are plants that produce fruits, seeds, nuts, grains, oil, wood, and fibers. As used herein, the term "crop" refers to a plant product which is of economic value. Non-limiting examples of a crop include fruits, seeds, nuts, grains, tubers, flowers, grasses, oil, wood, and fibers.

As such, a pest control composition disclosed herein is advantageously employed in a wide variety of locations, including without limitation, household applications, lawn and garden applications, agricultural applications, organic farming applications, greenhouse and nursery applications, stored product applications, professional pest control applications, pet bedding applications, foliage applications, underwater or submerged applications, solid treatment applications, soil incorporation applications, seedling box treatment applications, stalk injection and planting treatment applications or commercial box store applications.

Arthropod pests whose population can be controlled by a pest control composition, method and/or use disclosed herein include, without limitation, insects and arachnids. In addition, all stages of development can be controlled by a pest control composition, method and/or use disclosed herein including, without limitation, egg, larval, nymphal, juvenile, pupal and adult.

In an embodiment, a pest control composition, method and/or use disclosed herein can control a population of pests belongs to the Phylum Arthropoda. In aspects of this embodiment, a pest control composition, method and/or use disclosed herein can control a population of pests belongs to the Subphyla Chelicerata, Myriapoda, and/or Hexapoda. In other aspects of this embodiment, a pest control composition, method and/or use disclosed herein can control a population of pests belongs to the Classes of Arachnida, Symphyla, and/or Insecta.

In another embodiment, a pest control composition, method and/or use disclosed herein can control a population of pests belonging to the Order Anoplura. A non-exhaustive list of particular genera includes, but is not limited to, *Haematopinus, Hoplopleura, Linognathus, Pediculus* and *Polyplax*. A non-exhaustive list of particular species includes, but is not limited to, *Haematopinus asini, Haematopinus suis, Linognathus setosus, Linognathus ovillus, Pediculus humanus capitis, Pediculus humanus*, and *Pthirus pubis*.

In another embodiment, a pest control composition, method and/or use disclosed herein can control a population of pests belonging to the Order Coleoptera (beetles). A non-exhaustive list of particular genera includes, but is not limited to, *Acanthoscelides, Agrilus, Agriotes, Anoplophora, Anthonomus, Aphidius, Apion, Apogonia, Ataenius, Atomaria, Aulacophora, Bothynoderes, Bruchus, Cacoesia, Callosobruchus, Carpophilus, Cerosterna, Cerotoma, Cassida, Cerosterna, Cerotoma, Ceutorhynchus, Chaetocnema, Colaspis, Conoderus, Conotrachelus, Cotinus, Crioceris, Cryptolestes, Ctenicera, Curculio, Cyclocephala, Cylindrocpturus, Deporaus, Dermestes, Diabrotica, Epilachna, Faustinus, Hylobius, Hypera, Hyperdoes, Hypothenemus, Ips, Lasioderma, Leptinotarsa, Liogenys, Lissorhoptrus, Lyctus, Maecolaspis, Megascelis, Melanotus, Meligethes, Melolontha, Oberea, Oryctes, Oryzaephilus, Otiorhynchus, Oulema, Pantomorus, Phyllophaga, Phyllotreta, Phynchites, Popillia, Prostephanus, Rhizopertha, Rhizotrogus, Rhynchites, Rhynchophorus, Scolytus, Shenophorus, Sphenophorus, Sitona, Sitophilus, Stegobium, Tribolium, Trogoderma* and *Zabrus*. A non-exhaustive list of particular species includes, but is not limited to, *Acanthoscelides obtectus, Agrilus planipennis, Anoplophora glabripennis, Anthonomus grandis, Ataenius spretulus, Atomaria linearis, Bothynoderes punctiventris, Bruchus pisorum, Callosobruchus maculatus, Carpophilus hemipterus, Cassida vittata, Cerotoma trifurcata, Ceutorhynchus assimilis, Ceutorhynchus napi, Conoderus scalaris, Conoderus stigmosus, Conotrachelus nenuphar, Cotinis nitida, Crioceris asparagi, Cryptolestes ferrugineus, Cryptolestes pusillus, Cryptolestes turcicus, Cylindrocopturus adspersus, Deporaus marginatus, Dermestes lardarius, Dermestes maculatus, Epilachna varivestis, Faustinus cubae, Hylobius pales, Hypera postica, Hypothenemus hampei, Lasioderma serricorne, Leptinotarsa decemlineata, Liogenys fuscus, Liogenys suturalis, Lissorhoptrus oryzophilus, Maecolaspis joliveti, Melanotus communis, Meligethes aeneus, Melolontha, Oberea brevis, Oberea linearis, Oryctes rhinoceros, Oryzaephilus mercator, Oryzaephilus surinamensis, Oulema melanopus, Oulema oryzae, Phyllophaga cuyabana, Popillia japonica, Prostephanus truncatus, Rhyzopertha dominica, Sitona lineatus, Sitophilus granarius, Sitophilus oryzae, Sitophilus zeamais, Stegobium paniceum, Tribolium castaneum, Tribolium confusum, Trogoderma variabile,* and *tenebrioides*.

In another embodiment, a pest control composition, method and/or use disclosed herein can control a population of pests belonging to the Order Dermaptera (earwigs).

In another embodiment, a pest control composition, method and/or use disclosed herein can control a population of pests belonging to the Order Dictyoptera (Blattaria, cockroaches). A non-exhaustive list of particular genera includes, but is not limited to, *Blattella, Parcoblatta, Periplaneta, Pycnoscelus* and *Supella*. A non-exhaustive list of particular species includes, but is not limited to, *Blattella germanica, Blatta orientalis, Parcoblatta pennsylvanica, Periplaneta americana, Periplaneta australasiae, Periplaneta brunnea, Periplaneta fuliginosa, Pycnoscelus surinamensis* and *Supella longipalpa*.

In another embodiment, a pest control composition, method and/or use disclosed herein can control a population of pests belonging to the Order Diptera (flies). A non-exhaustive list of particular genera includes, but is not limited to, *Aedes, Agromyza, Anastrepha, Anopheles, Bactrocera, Ceratitis, Chrysops, Cochliomyia, Contarinia, Culex, Dasineura, Delia, Drosophila, Fannia, Gasterophilus, Gracillia, Haematobia, Hylemyia, Hypoderma, Liriomyza, Melophagus, Musca, Oestrus, Oscinella, Pegomyia, Phorbia, Psila, Rhagoletis, Sitodiplosis, Stomoxys, Tabanus*, and *Tipula*. A non-exhaustive list of particular species includes, but is not limited to, *Agromyza frontella, Anastrepha suspensa, Anastrepha ludens, Anastrepha obliqa, Bactrocera cucurbitae, Bactrocera dorsalis, Bactrocera invadens, Bactrocera zonata, Ceratitis capitata, Dasineura brassicae, Delia platura, Fannia canicularis, Fannia scalaris, Gasterophilus intestinalis, Gracillia perseae, Haematobia irritans, Hypoderma lineatum, Liriomyza brassicae, Melophagus ovinus, Musca autumnalis, Musca domestica, Oestrus ovis, Oscinella frit, Pegomya betae, Psila rosae,*

*Rhagoletis cerasi, Rhagoletis pomonella, Rhagoletis mendax, Sitodiplosis mosellana,* and *Stomoxys calcitrans.*

In another embodiment, a pest control composition, method and/or use disclosed herein can control a population of pests belonging to the Order Hemiptera (true bugs). A non-exhaustive list of particular genera includes, but is not limited to, *Acrosternum, Adelges, Aulacaspis, Aphrophora, Aphis, Bemisia, Blissus, Calocoris, Ceroplastes, Chionaspis, Chrysomphalus, Cimex, Coccus, Dagbertus, Dichelops, Dysdercus, Edessa, Empoasca, Eurygaster, Euschistus, Helopeltis, Lagynotomus, Lepidosaphes, Leptocorisa, Lygus, Maconellicoccus, Macrosiphum, Nephotettix, Neurocolpus, Nezara, Philaenus, Phytocoris, Piezodorus, Planococcus, Poecilocapsus, Psallus, Pseudacysta, Pseudococcus, Rhopalosiphum, Saissetia, Scaptocoris, Therioaphis, Toumeyella, Toxoptera, Trialeurodes, Triatoma* and *Unaspis.* A non-exhaustive list of particular species includes, but is not limited to, *Acrosternum hilare, Acyrthosiphon pisum, Aleyrodes proletella, Aleurodicus disperses, Aleurothrixus floccosus, Amrasca biguttula, Aonidiella aurantii, Aphis gossypii, Aphis glycines, Aphis pomi, Aulacorthum solani, Bemisia argentifolii, Bemisia tabaci, Blissus leucopterus, Brachycorynella asparagi, Brevennia rehi, Brevicoryne brassicae, Calocoris norvegicus, Ceroplastes rubens, Cimex hemipterus, Cimex lectularius, Dagbertus fasciatus, Dichelops furcatus, Diuraphis noxia, Diaphorina citri, Dysaphis plantaginea, Dysdercus suturellus, Edessa meditabunda, Eriosoma lanigerum, Eurygaster maura, Euschistus heros, Euschistus servos, Helopeltis antonii, Helopeltis theivora, Icerya purchasi, Idioscopus nitidulus, Laodelphax striatellus, Leptocorisa oratorius, Leptocorisa varicornis, Lygus hesperus, Maconellicoccus hirsutus, Macrosiphum euphorbiae, Macrosiphum granarium, Macrosiphum rosae, Macrosteles quadrilineatus, Mahanarva frimbiolata, Metopolophium dirhodum, Mictis longicornis, Myzus persicae, Nephotettix cinctipes, Neurocolpus longirostris, Nezara viridula, Nilaparvata lugens, Parlatoria pergandii, Parlatoria ziziphi, Peregrinus maid is, Phylloxera vitifoliae, Physokermes piceae, Phytocoris califomicus, Phytocoris relatives, Piezodorus guildinii, Poecilocapsus lineatus, Psallus vaccinicola, Pseudacysta perseae, Pseudococcus brevipes, Quadraspidiotus perniciosus, Rhopalosiphum maidis, Rhopalosiphum padi, Saissetia oleae, Scaptocoris castanea, Schizaphis graminum, Sitobion avenae, Sogatella furcifera, Trialeurodes vaporariorum, Trialeurodes abutiloneus, Unaspis yanonensis,* and *Zulia entrerriana.*

In another embodiment, a pest control composition, method and/or use disclosed herein can control a population of pests belonging to the Order Homoptera. A non-exhaustive list of particular genera includes, but is not limited to, *Acrythosiphon, Adelges, Aleurodes, Aleurodicus, Aleurothrixus, Aluacaspis, Amrasca, Aphrophora, Aonidiella, Aphis, Aulacorthum, Bemisia, Brachycolus, Brachycorynella, Brevennia, Brevicoryne, Ceroplastes, Chionaspis, Chrysomphalus, Coccus, Dysaphis, Empoasca, Eriosoma, Icerya, Idioscopus, Laodelphax, Lepidosaphes, Macrosiphum, Macrosteles, Mahanarva, Metopolophium, Mictis, Myzus, Nephotettix, Nilaparvata, Parlatoria, Peregrinus, Philaenus, Phylloxera, Physokermes, Planococcus, Pseudococcus, Quadraspidiotus, Rhapalosiphum, Saissetia, Schizaphis, Sitobion, Sogatella, Therioaphis, Toumeyella, Toxoptera, Trialeurodes, Unaspis* and *Zulia.* A non-exhaustive list of particular species includes, but is not limited to, *Acrythosiphon pisum, Aleurodes proletella, Aleurodicus disperses, Aleurothrixus floccosus, Amrasca bigutella, Aonidiella aurantii, Aphis gossypii, Aphis pomi, Aulacorthum solani, Bemisia argentifolii, Bemisia tabaci, Brachycolus noxius, Brachycorynella asparagi, Brevennia rehi, Brevicoryne brassicae, Ceroplastes rubens, Dysaphis plantaginea, Eriosoma lanigerum, Icerya purchasi, Idioscopus nitidulus, Laodelphax striatellus, Macrosiphum euphorbiae, Macrosiphum granarium, Macrosiphum rosae, Macrosteles quadrilineatus, Mahanarva frimbiolata, Metopolophium dirhodum, Mictis longicornis, Myzus persicae, Nephotettix cinctipes, Nilaparvata lugens, Parlatoria pergandii, Parlatoria ziziphi, Peregrinus maidis, Phylloxera vitifoliae, Physokermes piceae, Pseudococcus brevipes, Quadraspidiotus perniciosus, Rhapalosiphum maida, Rhapalosiphum padi, Saissetia oleae, Schizaphis graminum, Sitobion avenae, Sogatella furcifera, Trialeurodes vaporariorum, Trialeurodes abutiloneus, Unaspis yanonensis* and *Zulia entreriana.*

In another embodiment, a pest control composition, method and/or use disclosed herein can control a population of pests belonging to the Order Hymenoptera. A non-exhaustive list of particular genera includes, but is not limited to, *Acromyrmex, Athalia, Atta, Camponotus, Diprion, Formica, Iridomyrmex, Monomorium, Neodiprion, Pogonomyrmex, Polistes, Solenopsis, Tapoinoma, Tetranomorium, Vespula,* and *Xylocopa* spp. A non-exhaustive list of particular species includes, but is not limited to, *Athalia rosae, Atta texana, Iridomyrmex humilis, Monomorium minimum, Monomorium pharaonis, Solenopsis invicta, Solenopsis geminata, Solenopsis molesta, Solenopsis richtery, Solenopsis xyloni,* and *Tapinoma sessile.*

In another embodiment, a pest control composition, method and/or use disclosed herein can control a population of pests belonging to the Order Isoptera. A non-exhaustive list of particular genera includes, but is not limited to, *Coptotermes, Cornitermes, Cryptotermes, Heterotermes, Kalotermes, Incisitermes, Macrotermes, Marginitermes, Microcerotermes, Procornitermes, Reticulitermes, Schedorhinotermes* and *Zootermopsis.* A non-exhaustive list of particular species includes, but is not limited to, *Coptotermes curvignathus, Coptotermes frenchi, Coptotermes formosanus, Heterotermes aureus, Microtermes obesi, Reticulitermes banyulensis, Reticulitermes grassei, Reticulitermes flavipes, Reticulitermes hageni, Reticulitermes hesperus, Reticulitermes santonensis, Reticulitermes speratus, Reticulitermes tibialis,* and *Reticulitermes virginicus.*

In another embodiment, a pest control composition, method and/or use disclosed herein can control a population of pests belonging to the Order Lepidoptera (butterflies). A non-exhaustive list of particular genera includes, but is not limited to, *Achoea, Adoxophyes, Agrotis, Alabama, Amorbia, Amyelosis, Anacamptodes, Anarsia, Anomis, Amorbia, Anticarsia, Archips, Argyrotaenia, Autographa, Bonagota, Borbo, Bucculatrix, Cacoecia, Caloptilia, Capua, Carposina, Chilo, Chlumetia, Choristoneura, Chrysodeixis, Cnaphalocerus, Colias, Conpomorpha, Cossus, Crambus, Cydiafunebrana, Cydia, Darna, Diaphania, Diatraea, Earias, Ecdytopopha, Elasmopalpus, Ephestia, Epimecis, Epinotia, Epiphysias, Erionota, Eupoecilia, Euxoa, Feltia, Gortyna, Grapholita, Hedylepta, Helicoverpa, Heliothis, Hellula, Indarbela, Keiferia, Leucinodes, Leucoptera, Lithocolletis, Lobesia, Loxagrotis, Lymantria, Lyonetia, Mahasena, Malacosoma, Mamestra, Maruca, Metisa, Mythimna, Neoleucinodes, Nymphula, Operophthera, Ostrinia, Oxydia, Pandemis, Papilio, Pectinophora, Peridroma, Perileucoptera, Phthorimaea, Phyllocnisitis, Phyllonorycter, Pseudaletia, Pieris, Plathypena, Plodia, Plutella, Polychrosis, Prays, Pseudaletia, Pseudoplusia, Rachiplusia, Scirpophaga, Sesamia, Setora, Sitotroga, Sparganothis, Spodoptera, Synanthedon, Thecla, Thermisia, Tin-* eol, Trichoplusi, Tuta, Yponomeuta and Zeuzera. A non-exhaustive list of particular species includes, but is not limited to, Achaea janata, Adoxophyes orana, Agrotis ipsilon, Alabama argillacea, Amorbia cuneana, Amyelois transitella, Anacamptodes defectaria, Anarsia lineatella, Anomis sabulifera, Anticarsia gemmatalis, Archips argyrospila, Archips rosana, Argyrotaenia citrana, Autographa gamma, Bonagota cranaodes, Borbo cinnara, Bucculatrix thurberiella, Capua reticulana, Carposina niponensis, Chlumetia transversa, Choristoneura rosaceana, Cnaphalocrocis medinalis, Conopomorpha cramerella, Cossus, Cydia caryana, Cydia funebrana, Cydia molesta, Cydia nigricana, Cydia pomonella, Darna diducta, Diatraea saccharalis, Diatraea grandiosella, Earias insulana, Earias vittella, Ecdytolopha aurantianum, Elasmopalpus lignosellus, Ephestia cautella, Ephestia elutella, Ephestia kuehniella, Epinotia aporema, Epiphyas postvittana, Erionota thrax, Eupoecilia ambiguella, Euxoa auxiliaris, Grapholita molesta, Hedylepta indicata, Helicoverpa armigera, Helicoverpa zea, Heliothis virescens, Hellula undalis, Keiferia lycopersicella, Leucinodes orbonalis, Leucoptera coffeella, Leucoptera malifoliella, Lobesia botrana, Loxagrotis albicosta, Lymantria dispar, Lyonetia clerkella, Mahasena corbetti, Mamestra brassicae, Maruca testulalis, Metisa plana, Mythimna unipuncta, Neoleucinodes elegantalis, Nymphula depunctalis, Operophtera brumata, Ostrinia nubilalis, Oxydia vesulia, Pandemis cerasana, Pandemis heparana, Papilio demodocus, Pectinophora gossypiella, Peridroma saucia, Perileucoptera coffeella, Phthorimaea operculella, Phyllocnistis citrella, Pieris rapae, Plathypena scabra, Plodia interpunctella, Plutella xylostella, Polychrosis viteana, Prays endocarpa, Prays oleae, Pseudaletia unipuncta, Pseudoplusia includens, Rachiplusia nu, Scirpophaga incertulas, Sesamia inferens, Sesamia nonagrioides, Setora nitens, Sitotroga cerealella, Sparganothis pilleriana, Spodoptera exigua, Spodoptera frugiperda, Spodoptera eridania, Thecla basilides, Tineola bisselliella, Trichoplusia ni, Tuta absoluta, Zeuzera coffeae, and Zeuzera pyrina.

In another embodiment, a pest control composition, method and/or use disclosed herein can control a population of pests belonging to the Order Mallophaga (chewing lice). A non-exhaustive list of particular genera includes, but is not limited to, Anaticola, Bovicola, Chelopistes, Goniodes, Menacanthus, Menopon and Trichodectes. A non-exhaustive list of particular species includes, but is not limited to, Bovicola bovis, Bovicola caprae, Bovicola ovis, Chelopistes meleagridis, Goniodes dissimilis, Goniodes gigas, Menacanthus stramineus, Menopon gallinae, and Trichodectes canis.

In another embodiment, a pest control composition, method and/or use disclosed herein can control a population of pests belonging to the Order Orthoptera. A non-exhaustive list of particular genera includes, but is not limited to, Anabrus, Gryllotalpidae, Locusta, Melanoplus, Microcentrum, Pterophylla, Scudderia and Valanga. A non-exhaustive list of particular species includes, but is not limited to, Anabrus simplex, Gryllotalpa africana, Gryllotalpa australis, Gryllotalpa brachyptera, Gryllotalpa hexadactyla, Locusta migratoria, Microcentrum retinerve, Schistocerca gregaria, and Scudderia furcata.

In another embodiment, a pest control composition, method and/or use disclosed herein can control a population of pests belonging to the Order Phthiraptera (sucking lice). A non-exhaustive list of particular genera includes, but is not limited to, Haematopinus, Linognathus, Pediculus and Pthirus. A non-exhaustive list of particular species includes, but is not limited to, Linognathus ovillus, Pediculus humanus capitis, Pediculus humanus, and Pthirus pubis.

In another embodiment, a pest control composition, method and/or use disclosed herein can control a population of pests belonging to the Order Siphonaptera (flies). A non-exhaustive list of particular genera includes, but is not limited to, Ceratophyllus, Ctenocephalides and Pulex. A non-exhaustive list of particular species includes, but is not limited to, Ceratophyllus gallinae, Ceratophyllus niger, Ctenocephalides canis, Ctenocephalides felis and Pulex irritans.

In another embodiment, a pest control composition, method and/or use disclosed herein can control a population of pests belonging to the Order Thysanoptera (thrips). A non-exhaustive list of particular genera includes, but is not limited to, Caliothrips, Frankliniella, Heliothrips, Rhipiphorothrips, Scirtothrips Taeniothrips and Thrips. A non-exhaustive list of particular species includes, but is not limited to, Frankliniella fusca, Frankliniella occidentalis, Frankliniella schultzei, Frankliniella williamsi, Heliothrips haemorrhoidalis, Rhipiphorothrips cruentatus, Scirtothrips citri, Scirtothrips dorsalis, and Taeniothrips rhopalantennalis, Thrips hawaiiensis, Thrips nigropilosus, Thrips orientalis, Thrips tabaci.

In another embodiment, a pest control composition, method and/or use disclosed herein can control a population of pests belonging to the Order Thysanura (bristletails). A non-exhaustive list of particular genera includes, but is not limited to, Lepisma and Thermobia.

In another embodiment, a pest control composition, method and/or use disclosed herein can control a population of pests belonging to the Order Acarina (mites and ticks). A non-exhaustive list of particular genera includes, but is not limited to, Acarapsis, Acarus, Aceria, Aculops, Aculus, Amblyomma, Boophilus, Brevipalpus, Demodex, Dermacentor, Dermatophagoides, Eotetranychus, Epitrimerus, Eriophyes, Ixodes, Metatetranycus, Notoedres, Oligonychus, Panonychus, Phyllocoptruta, Polyphagotarsonemun, Rhipicephalus, Rhizoglyphus, Sarcoptes, Tegolophus, Tetranychus and Varroa. A non-exhaustive list of particular species includes, but is not limited to, Acarapis woodi, Acarus siro, Aceria mangiferae, Aculops lycopersici, Aculus pelekassi, Aculus schlechtendali, Amblyomma americanum, Brevipalpus obovatus, Brevipalpus phoenicis, Dermacentor variabilis, Dermatophagoides pteronyssinus, Eotetranychus carpini, Notoedres cati, Oligonychus coffeae, Oligonychus ilicis, Panonychus citri, Panonychus ulmi, Phyllocoptruta oleivora, Polyphagotarsonemus latus, Rhipicephalus sanguineus, Sarcoptes scabiei, Tegolophus perseaflorae, Tetranychus urticae, and Varroa destructor.

In another embodiment, a pest control composition, method and/or use disclosed herein can control a population of pests belonging to the Order Araneae (spiders). A non-exhaustive list of particular genera includes, but is not limited to, Abracadabrella, Acacesia, Achaearanea, Actinopus, Admestina, Aganippe, Agelena, Agelenopsis, Aliatypus, Allocosa, Alopecosa, Altella, Ami, Aname, Anasaitis, Anelosimus, Anidiops, Annandaliella, Anoploscelus, Antrodiaetus, Anyphaena, Aphonopelma, Aptostichus, Araneus, Araniella, Arbanitis, Archaeodictyna, Arctosa, Argiope, Argyrodes, Ariamnes, Atrax, Attidops, Atypus, Avicularia, Bagheera, Bannana, Batesiella, Bathyphantes, Bellota, Blakistonia, Brachypelma, Bredana, Brommella, Caledothele, Callilepis, Camillina, Cantuaria, Carniella, Castianeira, Cataxia, Cavisternum, Ceratogyrus, Cerocida, Cesonia, Cethegus, Chalcoscirtus, Cheiracanthium, Cheliferoides, Chrosiothes, Chrysso, Cicurina, Citharacanthus, Clubiona, Coelotes,

*Colima, Coras, Craspedisia, Crossopriza, Crustulina, Cryptachaea, Cryptoparachtes, Cryptothele, Cteniza, Ctenolophus, Cubanops, Cybaeus, Cyclocosmia, Cyclosa, Cyclosternum, Cyriocosmus, Cyriopagopus, Cyrtarachne, Cyrtocarenum, Dasumia, Dictyna, Diguetia, Diplura, Dolomedes, Drassodes, Dysdera, Ebo, Encyocrates, Enoplognatha, Envia, Ephebopus, Episinus, Erigone, Eriophora, Eris, Ero, Euathlus, Eucteniza, Eucyrtops, Eumenophorus, Euoplos, Euryopis, Florinda, Galeosoma, Gasteracantha, Gea, Genysa, Ghelna, Gnaphosa, Goeldia, Gorgyrella, Grammostola, Habronattus, Habronestes, Hadites, Hadronyche, Haplopelma, Hasarius, Heligmomerus, Hentzia, Heptathela, Hersilia, Heteropoda, Heteroscodra, Hibana, Histopona, Hogna, Hoplopholcus, Hypsosinga, Hyptiotes, Hysterocrates, Icius, Idiops, Idiosoma, Inermocoelotes, Iridopelma, Kaira, Kukulcania, Larinia, Larinioides, Lasaeola, Latrodectus, Lepthyphantes, Lessertia, Leucauge, Liphistius, Lipocrea, Litoporus, Loxomphalia, Loxoptygus, Loxosceles, Lutica, Lyssomanes, Macrothele, Maevia, Mallos, Marpissa, Mascaraneus, Masteria, Mastophora, Melychiopharis, Menemerus, Messua, Metacyrba, Metaphidippus, Metellina, Metepeira, Mexigonus, Micrathena, Microhexura, Micrommata, Micropholcus, Mimetus, Misgolas, Missulena, Misumena, Misumenoides, Misumenops, Moggridgea, Moneta, Monocentropus, Myostola, Myrmekiaphila, Nanthela, Naphrys, Neoapachella, Neocteniza, Neoleptoneta, Neon, Neonella, Neoscona, Nephila, Neriene, Nihoa, Nops, Nuctenea, Nurscia, Oecobius, Olios, Oonopinus, Oonops, Opopaea, Orchestina, Ordgarius, Ornithoctonus, Ozyptila, Pachistopelma, Pachygnatha, Palfuria, Pamphobeteus, Paradamoetas, Paramarpissa, Parameta, Paraphidippus, Parasteatoda, Paratropis, Pardosa, Peckhamia, Pelegrina, Pelinobius, Pellenes, Penestomus, Peucetia, Phaeacius, Philodromus, Philoponella, Phlegra, Pholcus, Phoneyusa, Phormictopus, Physocyclus, Pirata, Piratula, Pireneitega, Pisaura, Platnickina, Platycryptus, Plesiolena, Plexippus, Poecilotheria, Porrhothele, Portia, Poultonella, Predatoroonops, Prethopalpus, Prothemenops, Psalmopoeus, Psilochorus, Pterinochilus, Pyrenecosa, Rhetenor, Rugathodes, Ryuthela, Sadies, Saitis, Salticus, Sarinda, Sason, Sassacus, Scalidognathus, Schizocosa, Scoloderus, Scytodes, Segregara, Selenocosmia, Selenops, Semljicola, Seothyra, Sitticus, Smeringopus, Songthela, Sosippus, Spermophora, Spermophorides, Sphodros, Spintharus, Stanwellia, Steatoda, Stemmops, Stygopholcus, Styposis, Sybota, Synageles, Synemosyna, Synothele, Talavera, Tapinauchenius, Tartarus, Tegenaria, Tenedos, Tenuiphantes, Tetragnatha, Teyl, Thanatus, Thaumastochilus, Theraphosa, Theridion, Theridula, Thiodina, Thwaitesia, Tibellus, Tibioploides, Tidarren, Tinus, Titanidiops, Titanoeca, Tmarus, Trebacosa, Trochosa, Trogloraptor, Tychicus, Uliodon, Uloborus, Ummidia, Unicorn, Urocoras, Wabasso, Walckenaeria, Wirada, Xysticus, Zelotes, Zilla, Zodarion, Zoropsis* and *Zygoballus*.

In another embodiment, a pest control composition, method and/or use disclosed herein can control a population of pests belonging to the Order Amblypygi, Haptopoda, Opilones, Palpigradi, Phalangiotarbida, Pseudoscorpions, Ricinulei, Schizomida, Scorpions, Solifugae, Trigonotarbida, and Thelyponida.

In another embodiment, a pest control composition, method and/or use disclosed herein can control a population of pests belonging to the Order Symphyla (pseudocentipedes). A non-exhaustive list of particular genera includes, but is not limited to, *Hanseniella* and *Scutigerella*. A non-exhaustive list of particular species includes, but is not limited to, *Scutigerella immaculata*.

Additional information regarding invertebrate pests is described in "*Handbook of Pest Control—The Behavior, Life History, and Control of Household Pests*" by Arnold Mallis, 9th Edition, copyright 2004 by GIE Media Inc., which is hereby incorporated by reference in its entirety.

The pest control compositions, methods and uses described herein will most likely not harm mammals or the environment and are non-phytotoxic and can be safely applied to economically valuable plants or crops. Furthermore, the pest control compositions, methods and uses described herein can be used indoors and outdoors and will not soften, dissolve, or otherwise adversely affect treated surfaces. Lastly, arthropod pests will not build resistance to the pest control compositions, method and uses described herein.

Aspects of the present specification can also be described as follows:

1. An arthropod pest control composition comprising one or more hydrogel particles including one or more pH-sensitive polymers, wherein the one or more hydrogel particles undergo a phase transition into the expanded state when exposed to an environment having an alkaline pH.
2. The arthropod pest control composition of embodiment 1, wherein the alkaline pH is a pH of 8.5 or more.
3. The arthropod pest control composition of embodiment 2, wherein the environment has a pH range of 9 to 12.
4. The arthropod pest control composition of any one of embodiments 1-3, wherein the one or more hydrogel particles are spherical, ellipsoidal, polygonal, polyhedronal, cylindrical, conical or random in shape.
5. The arthropod pest control composition of any one of embodiments 1-4, wherein the one or more hydrogel particles have an average length of at least 100 nm, at least 200 nm, at least 300 nm, at least 400 nm, at least 500 nm, at least 600 nm, at least 700 nm, at least 800 nm, at least 900 nm, at least 1 µm, at least 2 µm at least 3 µm at least 4 µm at least 5 µm at least 10 µm at least 20 µm at least 30 µm at least 40 µm at least 50 µm at least 60 µm at least 70 µm at least 80 µm at least 90 µm at least 100 µm at least 200 µm at least 300 µm at least 400 µm at least 500 µm at least 600 µm at least 700 µm at least 800 µm at least 900 µm at least 1 mm, at least 2 mm, at least 3 mm, at least 4 mm, at least 5 mm, or at least 10 mm or at most 100 nm, at most 200 nm, at most 300 nm, at most 400 nm, at most 500 nm, at most 600 nm, at most 700 nm, at most 800 nm, at most 900 nm, at most 1 µm at most 2 µm at most 3 µm at most 4 µm at most 5 µm at most 10 µm at most 20 µm at most 30 µm, at most 40 µm at most 50 µm at most 60 µm at most 70 µm at most 80 µm at most 90 µm at most 100 µm at most 200 µm at most 300 µm at most 400 µm at most 500 µm at most 600 µm at most 700 µm at most 800 µm at most 900 µm at most 1 mm, at most 2 mm, at most 3 mm, at most 4 mm, at most 5 mm, or at most 10 mm or 100 nm to 250 nm, 100 nm to 500 nm, 100 nm to 750 nm, 100 nm to 1 µm 250 nm to 500 nm, 250 nm to 750 nm, 250 nm to 1 µm, 500 nm to 750 nm, 500 nm to 1 µm, 1 µm to 2.5 µm, 1 µm to 5 µm, 1 µm to 10 µm, 1 µm to 25 µm, 1 µm to 50 µm, 1 µm to 75 µm, 1 µm to 100 µm, 2.5 µm to 5 µm, 2.5 µm to 10 µm, 2.5 µm to 25 µm, 2.5 µm to 50 µm, 2.5 µm to 75 µm, 2.5 µm to 100 µm, 5 µm to 10 µm, 5 µm to 25 µm, 5 µm to 50 µm, 5 µm to 75 µm, 5 µm to 100 µm, 10 µm to 25 µm, 10 µm to 50 µm, 10 µm to 75 µm, 10 µm to 100 µm, 25 µm to 50 µm, 25 µm to 75 µm, 25 µm to 100 µm, 50 µm to 75 µm, 50 µm to 100 µm, 75 µm to 100 µm, 100 µm to 250 µm, 100 µm to 500 µm, 100 µm to 750 µm, 100 µm to 1 mm, 250 µm to 500 µm, 250 µm to 750 µm, 250 µm to 1 mm, 1 mm to 2 mm, 1 mm to 3 mm, 1 mm to 4 mm, 1 mm to 5 mm, 1 mm to 10 mm, 2 mm to 3 mm, 2 mm to 4 mm, 2 mm to 5 mm, 2 mm to 10 mm, 3 mm to 4 mm, 3 mm to 5 mm, 3 mm to 10 mm, 4 mm to 5 mm, 4 mm to 10 mm or 5 mm to 10 mm.

6. The arthropod pest control composition of any one of embodiments 1-4, wherein the one or more hydrogel particles have an average diameter of at least 100 nm, at least 200 nm, at least 300 nm, at least 400 nm, at least 500 nm, at least 600 nm, at least 700 nm, at least 800 nm, at least 900 nm, at least 1 µm at least 2 µm at least 3 µm at least 4 µm at least 5 µm at least 10 µm at least 20 µm at least 30 µm at least 40 µm at least 50 µm at least 60 µm at least 70 µm at least 80 µm at least 90 µm, at least 100 µm at least 200 µm at least 300 µm at least 400 µm at least 500 µm at least 600 µm, at least 700 µm at least 800 µm at least 900 µm at least 1 mm, at least 2 mm, at least 3 mm, at least 4 mm, at least 5 mm, or at least 10 mm or at most 100 nm, at most 200 nm, at most 300 nm, at most 400 nm, at most 500 nm, at most 600 nm, at most 700 nm, at most 800 nm, at most 900 nm, at most 1 µm at most 2 µm at most 3 µm at most 4 µm at most 5 µm at most 10 µm at most 20 µm at most 30 µm at most 40 µm at most 50 µm at most 60 µm at most 70 µm at most 80 µm at most 90 µm, at most 100 µm at most 200 µm at most 300 µm at most 400 µm at most 500 µm at most 600 µm, at most 700 µm at most 800 µm at most 900 µm at most 1 mm, at most 2 mm, at most 3 mm, at most 4 mm, at most 5 mm, or at most 10 mm or 100 nm to 250 nm, 100 nm to 500 nm, 100 nm to 750 nm, 100 nm to 1 µm 250 nm to 500 nm, 250 nm to 750 nm, 250 nm to 1 µm, 500 nm to 750 nm, 500 nm to 1 µm, 1 µm to 2.5 µm, 1 µm to 5 µm, 1 µm to 10 µm, 1 µm to 25 µm, 1 µm to 50 µm, 1 µm to 75 µm, 1 µm to 100 µm, 2.5 µm to 5 µm, 2.5 µm to 10 µm, 2.5 µm to 25 µm, 2.5 µm to 50 µm, 2.5 µm to 75 µm, 2.5 µm to 100 µm, 5 µm to 10 µm, 5 µm to 25 µm, 5 µm to 50 µm, 5 µm to 75 µm, 5 µm to 100 µm, 10 µm to 25 µm, 10 µm to 50 µm, 10 µm to 75 µm, 10 µm to 100 µm, 25 µm to 50 µm, 25 µm to 75 µm, 25 µm to 100 µm, 50 µm to 75 µm, 50 µm to 100 µm, 75 µm to 100 µm, 100 µm to 250 µm, 100 µm to 500 µm, 100 µm to 750 µm, 100 µm to 1 mm, 250 µm to 500 µm, 250 µm to 750 µm, 250 µm to 1 mm, 1 mm to 2 mm, 1 mm to 3 mm, 1 mm to 4 mm, 1 mm to 5 mm, 1 mm to 10 mm, 2 mm to 3 mm, 2 mm to 4 mm, 2 mm to 5 mm, 2 mm to 10 mm, 3 mm to 4 mm, 3 mm to 5 mm, 3 mm to 10 mm, 4 mm to 5 mm, 4 mm to 10 mm or 5 mm to 10 mm.

7. The arthropod pest control composition of any one of embodiments 1-6, wherein the one or more hydrogel particles have an average volume of at least 10 µm$^3$, at least 20 µm$^3$, at least 30 µm$^3$, at least 40 µm$^3$, at least 50 µm$^3$, at least 60 µm$^3$, at least 70 µm$^3$, at least 80 µm$^3$, at least 90 µm$^3$, at least 100 µm$^3$, at least 200 µm$^3$, at least 300 µm$^3$, at least 400 µm$^3$, at least 500 µm$^3$, at least 600 µm$^3$, at least 700 µm$^3$, at least 800 µm$^3$, at least 900 µm$^3$, at least 1 mm$^3$, at least 2 mm$^3$, at least 3 mm$^3$, at least 4 mm$^3$, at least 5 mm$^3$, at least 10 mm$^3$, at least 20 mm$^3$, at least 30 mm$^3$, at least 40 mm$^3$, at least 50 mm$^3$, at least 60 mm$^3$, at least 70 mm$^3$, at least 80 mm$^3$, at least 90 mm$^3$ or at least 100 mm$^3$ or at most 10 µm$^3$, at most 20 µm$^3$, at most 30 µm$^3$, at most 40 µm$^3$, at most 50 µm$^3$, at most 60 µm$^3$, at most 70 µm$^3$, at most 80 µm$^3$, at most 90 µm$^3$, at most 100 µm$^3$, at most 200 µm$^3$, at most 300 µm$^3$, at most 400 µm$^3$, at most 500 µm$^3$, at most 600 µm$^3$, at most 700 µm$^3$, at most 800 µm$^3$, at most 900 µm$^3$, at most 1 mm$^3$, at most 2 mm$^3$, at most 3 mm$^3$, at most 4 mm$^3$, at most 5 mm$^3$, at most 10 mm$^3$, at most 20 mm$^3$, at most 30 mm$^3$, at most 40 mm$^3$, at most 50 mm$^3$, at most 60 mm$^3$, at most 70 mm$^3$, at most 80 mm$^3$, at most 90 mm$^3$ or at most 100 mm$^3$ or 10 µm$^3$ to 25 µm$^3$, 10 µm$^3$ to 50 µm$^3$, 10 µm$^3$ to 75 µm$^3$, 10 µm$^3$ to 100 µm$^3$, 25 µm$^3$ to 50 µm$^3$, 25 µm$^3$ to 75 µm$^3$, 25 µm$^3$ to 100 µm$^3$, 50 µm$^3$ to 75 µm$^3$, 50 µm$^3$ to 100 µm$^3$, 75 µm$^3$ to 100 µm$^3$, 100 µm$^3$ to 250 µm$^3$, 100 µm$^3$ to 500 µm$^3$, 100 µm$^3$ to 750 µm$^3$, 100 µm$^3$ to 1 mm$^3$, 250 µm$^3$ to 500 µm$^3$, 250 µm$^3$ to 750 µm$^3$, 250 µm$^3$ to 1 mm$^3$, 500 µm$^3$ to 750 µm$^3$, 500 µm$^3$ to 1 mm$^3$, 750 µm$^3$ to 1 mm$^3$, 1 mm$^3$ to 2.5 mm$^3$, 1 mm$^3$ to 5 mm$^3$, 1 mm$^3$ to 7.5 mm$^3$, 1 mm$^3$ to 10 mm$^3$, 2.5 mm$^3$ to 5 mm$^3$, 2.5 mm$^3$ to 7.5 mm$^3$, 2.5 mm$^3$ to 10 mm$^3$, 5 mm$^3$ to 7.5 mm$^3$, 5 mm$^3$ to 10 mm$^3$, 7.5 mm$^3$ to 10 mm$^3$, 10 mm$^3$ to 25 mm$^3$, 10 mm$^3$ to 50 mm$^3$, 10 mm$^3$ to 75 mm$^3$, 10 mm$^3$ to 100 mm$^3$, 25 mm$^3$ to 50 mm$^3$, 25 mm$^3$ to 75 mm$^3$, 25 mm$^3$ to 100 mm$^3$, 50 mm$^3$ to 75 mm$^3$, 50 mm$^3$ to 100 mm$^3$ or 75 mm$^3$ to 100 mm$^3$.

8. The arthropod pest control composition of any one of embodiments 1-7, wherein the one or more hydrogel particles are superporous hydrogel particles comprising pores.

9. The arthropod pest control composition of embodiment 8, wherein the pores have an average diameter of at least 10 nm, at least 20 nm, at least 30 nm, at least 40 nm, at least 50 nm, at least 60 nm, at least 70 nm, at least 80 nm, at least 90 nm, at least 100 nm, at least 200 nm, at least 300 nm, at least 400 nm, at least 500 nm, at least 600 nm, at least 700 nm, at least 800 nm, at least 900 nm, at least 1 µm at least 2 µm at least 3 µm at least 4 µm at least 5 µm at least 10 µm at least 20 µm at least 30 µm at least 40 µm at least 50 µm at least 60 µm at least 70 µm at least 80 µm at least 90 µm at least 100 µm at least 200 µm at least 300 µm at least 400 µm at least 500 µm at least 600 µm at least 700 µm at least 800 µm at least 900 µm or at least 1 mm or at most 10 nm, at most 20 nm, at most 30 nm, at most 40 nm, at most 50 nm, at most 60 nm, at most 70 nm, at most 80 nm, at most 90 nm, at most 100 nm, at most 200 nm, at most 300 nm, at most 400 nm, at most 500 nm, at most 600 nm, at most 700 nm, at most 800 nm, at most 900 nm, at most 1 µm at most 2 µm at most 3 µm at most 4 µm at most 5 µm at most 10 µm at most 20 µm at most 30 µm at most 40 µm at most 50 µm at most 60 µm at most 70 µm at most 80 µm at most 90 µm at most 100 µm at most 200 µm at most 300 µm at most 400 µm at most 500 µm at most 600 µm at most 700 µm at most 800 µm at most 900 µm or at most 1 mm or 10 nm to 25 nm, 10 nm to 50 nm, 10 nm to 75 nm, 10 nm to 100 nm, 25 nm to 50 nm, 25 nm to 75 nm, 25 nm to 100 nm, 50 nm to 75 nm, 50 nm to 100 nm, 75 nm to 100 nm, 100 nm to 250 nm, 100 nm to 500 nm, 100 nm to 750 nm, 100 nm to 1 µm 250 nm to 500 nm, 250 nm to 750 nm, 250 nm to 1 µm, 500 nm to 750 nm, 500 nm to 1 µm, 1 µm to 2.5 µm, 1 µm to 5 µm, 1 µm to 10 µm, 1 µm to 25 µm, 1 µm to 50 µm, 1 µm to 75 µm, 1 µm to 100 µm, 2.5 µm to 5 µm, 2.5 µm to 10 µm, 2.5 µm to 25 µm, 2.5 µm to 50 µm, 2.5 µm to 75 µm, 2.5 µm to 100 µm, 5 µm to 10 µm, 5 µm to 25 µm, 5 µm to 50 µm, 5 µm to 75 µm, 5 µm to 100 µm, 10 µm to 25 µm, 10 µm to 50 µm, 10 µm to 75 µm, 10 µm to 100 µm, 25 µm to 50 µm, 25 µm to 75 µm, 25 µm to 100 µm, 50 µm to 75 µm, 50 µm to 100 µm 75 µm to 100 µm, 100 µm to 250 µm, 100 µm to 500 µm, 100 µm to 750 µm, 100 µm to 1 mm, 250 µm to 500 µm, 250 µm to 750 µm, 250 µm to 1 mm.

10. The arthropod pest control composition of any one of embodiments 1-9, wherein the one or more hydrogel particles further comprise a pre-cross-linked matrix-swelling additive.

11. The arthropod pest control composition of embodiment 10, wherein the pre-cross-linked matrix-swelling additive includes a crosslinked carboxy methylcellulose, a cross-linked primojel and crospovidone, or a carbopol and polyvinyl alcohol.

12. The arthropod pest control composition of any one of embodiments 1-11, wherein the one or more hydrogel particles further comprise a hybrid agent.

13. The arthropod pest control composition of embodiment 12, wherein the hybrid agent includes a polysaccharide like alginate, carboxy methylcellulose, pectin, chitosan or a synthetic water-soluble hydrophilic polymer like poly(vinyl alcohol).

14. The arthropod pest control composition of any one of embodiments 1-13, wherein the one or more hydrogel particles has a degree of swelling that is at least 10 times, at least 20 times, at least 30 times, at least 40 times, at least 50 times, at least 60 times, at least 70 times, at least 80 times, at least 90 times, at least 100 times, at least 125 times, at least 150 times, at least 175 times, at least 200 times, at least 225 times, at least 250 times, at least 275 times or at least 300 times by weight or at most 10 times, at most 20 times, at most 30 times, at most 40 times, at most 50 times, at most 60 times, at most 70 times, at most 80 times, at most 90 times, at most 100 times, at most 125 times, at most 150 times, at most 175 times, at most 200 times, at most 225 times, at most 250 times, at most 275 times or at most 300 times by weight or 10 times to 25 times, 10 times to 50 times, 10 times to 75 times, 10 times to 100 times, 10 times to 125 times, 10 times to 150 times, 10 times to 175 times, 10 times to 200 times, 10 times to 225 times, 10 times to 250 times, 10 times to 275 times, 10 times to 300 times, 25 times to 50 times, 25 times to 75 times, 25 times to 100 times, 25 times to 125 times, 25 times to 150 times, 25 times to 175 times, 25 times to 200 times, 25 times to 225 times, 25 times to 250 times, 25 times to 275 times, 25 times to 300 times, 50 times to 75 times, 50 times to 100 times, 50 times to 125 times, 50 times to 150 times, 50 times to 175 times, 50 times to 200 times, 50 times to 225 times, 50 times to 250 times, 50 times to 275 times, 50 times to 300 times, 75 times to 100 times, 75 times to 125 times, 75 times to 150 times, 75 times to 175 times, 75 times to 200 times, 75 times to 225 times, 75 times to 250 times, 75 times to 275 times, 75 times to 300 times, 100 times to 125 times, 100 times to 150 times, 100 times to 175 times, 100 times to 200 times, 100 times to 225 times, 100 times to 250 times, 100 times to 275 times, 100 times to 300 times, 125 times to 150 times, 125 times to 175 times, 125 times to 200 times, 125 times to 225 times, 125 times to 250 times, 125 times to 275 times, 125 times to 300 times, 150 times to 175 times, 150 times to 200 times, 150 times to 225 times, 150 times to 250 times, 150 times to 275 times, 150 times to 300 times, 175 times to 200 times, 175 times to 225 times, 175 times to 250 times, 175 times to 275 times, 175 times to 300 times, 200 times to 225 times, 200 times to 250 times, 200 times to 275 times, 200 times to 300 times, 225 times to 250 times, 225 times to 275 times, 225 times to 300 times, 250 times to 275 times, 250 times to 300 times or 275 times to 300 times by weight.

15. The arthropod pest control composition of any one of embodiments 1-13, wherein the one or more hydrogel particles has a degree of swelling that is at least 10 times, at least 20 times, at least 30 times, at least 40 times, at least 50 times, at least 60 times, at least 70 times, at least 80 times, at least 90 times, at least 100 times, at least 125 times, at least 150 times, at least 175 times, at least 200 times, at least 225 times, at least 250 times, at least 275 times or at least 300 times by volume or at most 10 times, at most 20 times, at most 30 times, at most 40 times, at most 50 times, at most 60 times, at most 70 times, at most 80 times, at most 90 times, at most 100 times, at most 125 times, at most 150 times, at most 175 times, at most 200 times, at most 225 times, at most 250 times, at most 275 times or at most 300 times by volume or 10 times to 25 times, 10 times to 50 times, 10 times to 75 times, 10 times to 100 times, 10 times to 125 times, 10 times to 150 times, 10 times to 175 times, 10 times to 200 times, 10 times to 225 times, 10 times to 250 times, 10 times to 275 times, 10 times to 300 times, 25 times to 50 times, 25 times to 75 times, 25 times to 100 times, 25 times to 125 times, 25 times to 150 times, 25 times to 175 times, 25 times to 200 times, 25 times to 225 times, 25 times to 250 times, 25 times to 275 times, 25 times to 300 times, 50 times to 75 times, 50 times to 100 times, 50 times to 125 times, 50 times to 150 times, 50 times to 175 times, 50 times to 200 times, 50 times to 225 times, 50 times to 250 times, 50 times to 275 times, 50 times to 300 times, 75 times to 100 times, 75 times to 125 times, 75 times to 150 times, 75 times to 175 times, 75 times to 200 times, 75 times to 225 times, 75 times to 250 times, 75 times to 275 times, 75 times to 300 times, 100 times to 125 times, 100 times to 150 times, 100 times to 175 times, 100 times to 200 times, 100 times to 225 times, 100 times to 250 times, 100 times to 275 times, 100 times to 300 times, 125 times to 150 times, 125 times to 175 times, 125 times to 200 times, 125 times to 225 times, 125 times to 250 times, 125 times to 275 times, 125 times to 300 times, 150 times to 175 times, 150 times to 200 times, 150 times to 225 times, 150 times to 250 times, 150 times to 275 times, 150 times to 300 times, 175 times to 200 times, 175 times to 225 times, 175 times to 250 times, 175 times to 275 times, 175 times to 300 times, 200 times to 225 times, 200 times to 250 times, 200 times to 275 times, 200 times to 300 times, 225 times to 250 times, 225 times to 275 times, 225 times to 300 times, 250 times to 275 times, 250 times to 300 times or 275 times to 300 times by volume.

16. The arthropod pest control composition of any one of embodiments 1-15, wherein at least 50%, at least 60%, at least 70%, at least 75%, at least 80%, at least 90% or at least 95% of the one or more hydrogel particles has an absorptive capacity that is at least 30%, at least 40%, at least 50%, at least 60%, at least 70%, at least 75%, at least 80%, at least 90% or at least 95% by weight or at most 30%, at most 40%, at most 50%, at most 60%, at most 70%, at most 75%, at most 80%, at most 90% or at most 95% by weight or 25% to 50%, 25% to 75%, 25% to 100% 50% to 75%, 50% to 100% or 75% to 100% by weight.

17. The arthropod pest control composition of any one of embodiments 1-15, wherein at least 50%, at least 60%, at least 70%, at least 75%, at least 80%, at least 90% or at least 95% of the one or more hydrogel particles has an absorptive capacity that is at least 30%, at least 40%, at least 50%, at least 60%, at least 70%, at least 75%, at least 80%, at least 90% or at least 95% by volume or at most 30%, at most 40%, at most 50%, at most 60%, at most 70%, at most 75%, at most 80%, at most 90% or at most 95% by volume or 25% to 50%, 25% to 75%, 25% to 100% 50% to 75%, 50% to 100% or 75% to 100% by volume.

18. The arthropod pest control composition of any one of embodiments 1-17, wherein the phase transition into the expanded state can occurs in at most 1 minute, at most 2 minutes, at most 3 minutes, at most 4 minutes, at most 5 minutes, at most 6 minutes, at most 7 minutes, at most 8 minutes, at most 9 minutes, at most 10 minutes, at most 15 minutes, at most 20 minutes, at most 25 minutes or at most 30 minutes after exposure to the environment having an alkaline pH or 1 minute to 2 minutes, 1 minute to 3 minutes, 1 minute to 4 minutes, 1 minute to 5 minutes, 1 minute to 6 minutes, 1 minute to 7 minutes, 1 minute to 8 minutes, 1 minute to 9 minutes, 1 minute to 10 minutes, 1 minute to 15 minutes, 1 minute to 20 minutes, 1 minute to 25 minutes, 1 minute to 30 minutes, 2 minutes to 3 minutes, 2 minutes to 4 minutes, 2 minutes to 5 minutes, 2 minutes to 6 minutes, 2 minutes to 7 minutes, 2 minutes to 8 minutes, 2 minutes to 9 minutes, 2 minutes to 10 minutes, 2 minutes to 15 minutes, 2 minutes to 20 minutes, 2 minutes to 25 minutes, 2 minutes to 30 minutes, 3 minutes to 4 minutes, 3 minutes to 5 minutes, 3 minutes to 6 minutes, 3 minutes to 7 minutes, 3 minutes to 8 minutes, 3 minutes to 9 minutes, 3 minutes to 10 minutes, 3 minutes to 15 minutes, 3 minutes to 20 minutes, 3 minutes to 25 minutes, 3 minutes to 30 minutes, 4 minutes to 5 minutes, 4 minutes to 6 minutes, 4 minutes to 7 minutes, 4 minutes to 8 minutes, 4 minutes to 9 minutes, 4 minutes to 10 minutes, 4 minutes to 15 minutes, 4 minutes to 20 minutes, 4 minutes to 25 minutes, 4 minutes to 30 minutes, 5 minutes to 6 minutes, 5 minutes to 7 minutes, 5 minutes to 8 minutes, 5 minutes to 9 minutes, 5 minutes to 10 minutes, 5 minutes to 15 minutes, 5 minutes to 20 minutes, 5 minutes to 25 minutes, 5 minutes to 30 minutes, 10 minutes to 15 minutes, 10 minutes to 20 minutes, 10 minutes to 25 minutes, 10 minutes to 30 minutes, 15 minutes to 20 minutes, 15 minutes to 25 minutes, 15 minutes to 30 minutes, 20 minutes to 25 minutes, 20 minutes to 30 minutes or 25 minutes to 30 minutes after exposure to the environment having an alkaline pH.

19. The arthropod pest control composition of any one of embodiments 1-18, wherein the phase transition of the one or more hydrogel particles into an expanded state of the one or more hydrogel particles occurs at an alkaline pH.

20. The arthropod pest control composition of any one of embodiments 1-19, wherein the phase transition of the one or more hydrogel particles into an expanded state occurs at a pH of 8.0 or higher, 8.5 or higher, 9.0 or higher, 9.5 or higher or 10 or higher or a pH of 8 to 10, 8 to 11, 8 to 12, 8 to 13, 8.5 to 10, 8.5 to 11, 8.5 to 12, 8.5 to 13, 9 to 10, 9 to 11, 9 to 12, 9 to 13, 9.5 to 10, 9.5 to 11, 9.5 to 12 or 9.5 to 13.

21. The arthropod pest control composition of any one of embodiments 1-20, wherein at least 50%, at least 60%, at least 70%, at least 75%, at least 80%, at least 90% or at least 95% of one or more hydrogel particles have a degree of swelling of at least 10 times, at least 20 times, at least 30 times, at least 40 times, at least 50 times, at least 60 times, at least 70 times, at least 80 times, at least 90 times, at least 100 times, at least 125 times, at least 150 times, at least 175 times, at least 200 times, at least 225 times, at least 250 times, at least 275 times or at least 300 times by weight or volume which occurs in at most 1 minute, at most 2 minutes, at most 3 minutes, at most 4 minutes, at most 5 minutes, at most 6 minutes, at most 7 minutes, at most 8 minutes, at most 9 minutes, at most 10 minutes, at most 15 minutes, at most 20 minutes, at most 25 minutes or at most 30 minutes after exposure to the environment having an alkaline pH or at least 50%, at least 60%, at least 70%, at least 75%, at least 80%, at least 90% or at least 95% of one or more hydrogel particles have a degree of swelling of at most 10 times, at most 20 times, at most 30 times, at most 40 times, at most 50 times, at most 60 times, at most 70 times, at most 80 times, at most 90 times, at most 100 times, at most 125 times, at most 150 times, at most 175 times, at most 200 times, at most 225 times, at most 250 times, at most 275 times or at most 300 times by weight or volume which occurs in at most 1 minute, at most 2 minutes, at most 3 minutes, at most 4 minutes, at most 5 minutes, at most 6 minutes, at most 7 minutes, at most 8 minutes, at most 9 minutes, at most 10 minutes, at most 15 minutes, at most 20 minutes, at most 25 minutes or at most 30 minutes after exposure to the environment having an alkaline pH or at least 50%, at least 60%, at least 70%, at least 75%, at least 80%, at least 90% or at least 95% of one or more hydrogel particles have a degree of swelling of between 10 times to 25 times, 10 times to 50 times, 10 times to 75 times, 10 times to 100 times, 10 times to 125 times, 10 times to 150 times, 10 times to 175 times, 10 times to 200 times, 10 times to 225 times, 10 times to 250 times, 10 times to 275 times, 10 times to 300 times, 25 times to 50 times, 25 times to 75 times, 25 times to 100 times, 25 times to 125 times, 25 times to 150 times, 25 times to 175 times, 25 times to 200 times, 25 times to 225 times, 25 times to 250 times, 25 times to 275 times, 25 times to 300 times, 50 times to 75 times, 50 times to 100 times, 50 times to 125 times, 50 times to 150 times, 50 times to 175 times, 50 times to 200 times, 50 times to 225 times, 50 times to 250 times, 50 times to 275 times, 50 times to 300 times, 75 times to 100 times, 75 times to 125 times, 75 times to 150 times, 75 times to 175 times, 75 times to 200 times, 75 times to 225 times, 75 times to 250 times, 75 times to 275 times, 75 times to 300 times, 100 times to 125 times, 100 times to 150 times, 100 times to 175 times, 100 times to 200 times, 100 times to 225 times, 100 times to 250 times, 100 times to 275 times, 100 times to 300 times, 125 times to 150 times, 125 times to 175 times, 125 times to 200 times, 125 times to 225 times, 125 times to 250 times, 125 times to 275 times, 125 times to 300 times, 150 times to 175 times, 150 times to 200 times, 150 times to 225 times, 150 times to 250 times, 150 times to 275 times, 150 times to 300 times, 175 times to 200 times, 175 times to 225 times, 175 times to 250 times, 175 times to 275 times, 175 times to 300 times, 200 times to 225 times, 200 times to 250 times, 200 times to 275 times, 200 times to 300 times, 225 times to 250 times, 225 times to 275 times, 225 times to 300 times, 250 times to 275 times, 250 times to 300 times or 275 times to 300 times by weight or volume which occurs in at most 1 minute, at most 2 minutes, at most 3 minutes, at most 4 minutes, at most 5 minutes, at most 6 minutes, at most 7 minutes, at most 8 minutes, at most 9 minutes, at most 10 minutes, at most 15 minutes, at most 20 minutes, at most 25 minutes or at most 30 minutes after exposure to the environment having an alkaline pH.

22. The arthropod pest control composition of any one of embodiments 1-20, wherein at least 50%, at least 60%, at least 70%, at least 75%, at least 80%, at least 90% or at least 95% of one or more hydrogel particles have a degree of swelling of at least 10 times, at least 20 times, at least 30 times, at least 40 times, at least 50 times, at least 60 times, at least 70 times, at least 80 times, at least 90 times, at least 100 times, at least 125 times, at least 150 times, at least 175 times, at least 200 times, at least 225 times, at least 250 times, at least 275 times or at least 300 times by weight or volume which occurs in 1 minute to 2 minutes, 1 minute to 3 minutes, 1 minute to 4 minutes, 1 minute to 5 minutes, 1 minute to 6 minutes, 1 minute to 7 minutes, 1 minute to 8 minutes, 1 minute to 9 minutes, 1 minute to 10 minutes, 1 minute to 15 minutes, 1 minute to 20 minutes, 1 minute to 25 minutes, 1 minute to 30 minutes, 2 minutes to 3 minutes, 2 minutes to 4 minutes, 2 minutes to 5 minutes, 2 minutes to 6 minutes, 2 minutes to 7 minutes, 2 minutes to 8 minutes, 2 minutes to 9 minutes, 2 minutes to 10 minutes, 2 minutes to 15 minutes, 2 minutes to 20 minutes, 2 minutes to 25 minutes, 2 minutes to 30 minutes, 3 minutes to 4 minutes, 3 minutes to 5 minutes, 3 minutes to 6 minutes, 3 minutes to 7 minutes, 3 minutes to 8 minutes, 3 minutes to 9 minutes, 3 minutes to 10 minutes, 3 minutes to 15 minutes, 3 minutes to 20 minutes, 3 minutes to 25 minutes, 3 minutes to 30 minutes, 4 minutes to 5 minutes, 4 minutes to 6 minutes, 4 minutes to 7 minutes, 4 minutes to 8 minutes, 4 minutes to 9 minutes, 4 minutes to 10 minutes, 4 minutes to 15 minutes, 4 minutes to 20 minutes, 4 minutes to 25 minutes, 4 minutes to 30 minutes, 5 minutes to 6 minutes, 5 minutes to 7 minutes, 5 minutes to 8 minutes, 5 minutes to 9 minutes, 5 minutes to 10 minutes, 5 minutes to 15 minutes, 5 minutes to 20 minutes, 5 minutes to 25 minutes, 5 minutes to 30 minutes, 10 minutes to 15 minutes, 10 minutes to 20 minutes, 10 minutes to 25 minutes, 10 minutes to 30 minutes, 15 minutes to 20 minutes, 15 minutes to 25 minutes, 15 minutes to 30 minutes, 20 minutes to 25 minutes, 20 minutes to 30 minutes or 25 minutes to 30 minutes after exposure to the environment having an alkaline pH or at least 50%, at least 60%, at least 70%, at least 75%, at least 80%, at least 90% or at least 95% of one or more hydrogel particles have a degree of swelling of at most 10 times, at most 20 times, at most 30 times, at most 40 times, at most 50 times, at most 60 times, at most 70 times, at most 80 times, at most 90 times, at most 100 times, at most 125 times, at most 150 times, at most 175 times, at most 200 times, at most 225 times, at most 250 times, at most 275 times or at most 300 times by weight or volume which occurs in 1 minute to 2 minutes, 1 minute to 3 minutes, 1 minute to 4 minutes, 1 minute to 5 minutes, 1 minute to 6 minutes, 1 minute to 7 minutes, 1 minute to 8 minutes, 1 minute to 9 minutes, 1 minute to 10 minutes, 1 minute to 15 minutes, 1 minute to 20 minutes, 1 minute to 25 minutes, 1 minute to 30 minutes, 2 minutes to 3 minutes, 2 minutes to 4 minutes, 2 minutes to 5 minutes, 2 minutes to 6 minutes, 2 minutes to 7 minutes, 2 minutes to 8 minutes, 2 minutes to 9 minutes, 2 minutes to 10 minutes, 2 minutes to 15 minutes, 2 minutes to 20 minutes, 2 minutes to 25 minutes, 2 minutes to 30 minutes, 3 minutes to 4 minutes, 3 minutes to 5 minutes, 3 minutes to 6 minutes, 3 minutes to 7 minutes, 3 minutes to 8 minutes, 3 minutes to 9 minutes, 3 minutes to 10 minutes, 3 minutes to 15 minutes, 3 minutes to 20 minutes, 3 minutes to 25 minutes, 3 minutes to 30 minutes, 4 minutes to 5 minutes, 4 minutes to 6 minutes, 4 minutes to 7 minutes, 4 minutes to 8 minutes, 4 minutes to 9 minutes, 4 minutes to 10 minutes, 4 minutes to 15 minutes, 4 minutes to 20 minutes, 4 minutes to 25 minutes, 4 minutes to 30 minutes, 5 minutes to 6 minutes, 5 minutes to 7 minutes, 5 minutes to 8 minutes, 5 minutes to 9 minutes, 5 minutes to 10 minutes, 5 minutes to 15 minutes, 5 minutes to 20 minutes, 5 minutes to 25 minutes, 5 minutes to 30 minutes, 10 minutes to 15 minutes, 10 minutes to 20 minutes, 10 minutes to 25 minutes, 10 minutes to 30 minutes, 15 minutes to 20 minutes, 15 minutes to 25 minutes, 15 minutes to 30 minutes, 20 minutes to 25 minutes, 20 minutes to 30 minutes or 25 minutes to 30 minutes after exposure to the environment having an alkaline pH or at least 50%, at least 60%, at least 70%, at least 75%, at least 80%, at least 90% or at least 95% of one or more hydrogel particles have a degree of swelling of between 10 times to 25 times, 10 times to 50 times, 10 times to 75 times, 10 times to 100 times, 10 times to 125 times, 10 times to 150 times, 10 times to 175 times, 10 times to 200 times, 10 times to 225 times, 10 times to 250 times, 10 times to 275 times, 10 times to 300 times, 25 times to 50 times, 25 times to 75 times, 25 times to 100 times, 25 times to 125 times, 25 times to 150 times, 25 times to 175 times, 25 times to 200 times, 25 times to 225 times, 25 times to 250 times, 25 times to 275 times, 25 times to 300 times, 50 times to 75 times, 50 times to 100 times, 50 times to 125 times, 50 times to 150 times, 50 times to 175 times, 50 times to 200 times, 50 times to 225 times, 50 times to 250 times, 50 times to 275 times, 50 times to 300 times, 75 times to 100 times, 75 times to 125 times, 75 times to 150 times, 75 times to 175 times, 75 times to 200 times, 75 times to 225 times, 75 times to 250 times, 75 times to 275 times, 75 times to 300 times, 100 times to 125 times, 100 times to 150 times, 100 times to 175 times, 100 times to 200 times, 100 times to 225 times, 100 times to 250 times, 100 times to 275 times, 100 times to 300 times, 125 times to 150 times, 125 times to 175 times, 125 times to 200 times, 125 times to 225 times, 125 times to 250 times, 125 times to 275 times, 125 times to 300 times, 150 times to 175 times, 150 times to 200 times, 150 times to 225 times, 150 times to 250 times, 150 times to 275 times, 150 times to 300 times, 175 times to 200 times, 175 times to 225 times, 175 times to 250 times, 175 times to 275 times, 175 times to 300 times, 200 times to 225 times, 200 times to 250 times, 200 times to 275 times, 200 times to 300 times, 225 times to 250 times, 225 times to 275 times, 225 times to 300 times, 250 times to 275 times, 250 times to 300 times or 275 times to 300 times by weight or volume which occurs in 1 minute to 2 minutes, 1 minute to 3 minutes, 1 minute to 4 minutes, 1 minute to 5 minutes, 1 minute to 6 minutes, 1 minute to 7 minutes, 1 minute to 8 minutes, 1 minute to 9 minutes, 1 minute to 10 minutes, 1 minute to 15 minutes, 1 minute to 20 minutes, 1 minute to 25 minutes, 1 minute to 30 minutes, 2 minutes to 3 minutes, 2 minutes to 4 minutes, 2 minutes to 5 minutes, 2 minutes to 6 minutes, 2 minutes to 7 minutes, 2 minutes to 8 minutes, 2 minutes to 9 minutes, 2 minutes to 10 minutes, 2 minutes to 15 minutes, 2 minutes to 20 minutes, 2 minutes to 25 minutes, 2 minutes to 30 minutes, 3 minutes to 4 minutes, 3 minutes to 5 minutes, 3 minutes to 6 minutes, 3 minutes to 7 minutes, 3 minutes to 8 minutes, 3 minutes to 9 minutes, 3 minutes to 10 minutes, 3 minutes to 15 minutes, 3 minutes to 20 minutes, 3 minutes to 25 minutes, 3 minutes to 30 minutes, 4 minutes to 5 minutes, 4 minutes to 6 minutes, 4 minutes to 7 minutes, 4 minutes to 8 minutes, 4 minutes to 9 minutes, 4 minutes to 10 minutes, 4 minutes to 15 minutes, 4 minutes to 20 minutes, 4 minutes to 25 minutes, 4 minutes to 30 minutes, 5 minutes to 6 minutes, 5 minutes to 7 minutes, 5 minutes to 8 minutes, 5 minutes to 9 minutes, 5 minutes to 10 minutes, 5 minutes to 15 minutes, 5 minutes to 20 minutes, 5 minutes to 25 minutes, 5 minutes to 30 minutes, 10 minutes to 15 minutes, 10 minutes to 20 minutes, 10 minutes to 25 minutes, 10 minutes to 30 minutes, 15 minutes to 20 minutes, 15 minutes to 25 minutes, 15 minutes to 30 minutes, 20 minutes to 25 minutes, 20 minutes to 30 minutes or 25 minutes to 30 minutes after exposure to the environment having an alkaline pH.

23. The arthropod pest control composition of any one of embodiments 1-22, wherein at least 50%, at least 60%, at least 70%, at least 75%, at least 80%, at least 90% or at least 95% of one or more hydrogel particles have an absorptive capacity of at least 30%, at least 40%, at least 50%, at least 60%, at least 70%, at least 75%, at least 80%, at least 90% or at least 95% by weight or volume which occurs in at most 1 minute, at most 2 minutes, at most 3 minutes, at most 4 minutes, at most 5 minutes, at most 6 minutes, at most 7 minutes, at most 8 minutes, at most 9 minutes, at most 10 minutes, at most 15 minutes, at most 20 minutes, at most 25 minutes or at most 30 minutes after exposure to the environment having an alkaline pH or at least 50%, at least 60%, at least 70%, at least 75%, at least 80%, at least 90% or at least 95% of one or more hydrogel particles have an absorptive capacity of at most 30%, at most 40%, at most 50%, at most 60%, at most 70%, at most 75%, at most 80%, at most 90% or at most 95% by weight or volume which occurs in at most 1 minute, at most 2 minutes, at most 3 minutes, at most 4 minutes, at most 5 minutes, at most 6 minutes, at most 7 minutes, at most 8 minutes, at most 9 minutes, at most 10 minutes, at most 15 minutes, at most 20 minutes, at most 25 minutes or at most 30 minutes after exposure to the environment having an alkaline pH or at least 50%, at least 60%, at least 70%, at least 75%, at least 80%, at least 90% or at least 95% of one or more hydrogel particles have an absorptive capacity of between 25% to 50%, 25% to 75%, 25% to 100% 50% to 75%, 50% to 100% or 75% to 100% by weight or volume which occurs in at most 1 minute, at most 2 minutes, at most 3 minutes, at most 4 minutes, at most 5 minutes, at most 6 minutes, at most 7 minutes, at most 8 minutes, at most 9 minutes, at most 10 minutes, at most 15 minutes, at most 20 minutes, at most 25 minutes or at most 30 minutes after exposure to the environment having an alkaline pH.

24. The arthropod pest control composition of any one of embodiments 1-20, wherein at least 50%, at least 60%, at least 70%, at least 75%, at least 80%, at least 90% or at least 95% of one or more hydrogel particles have an absorptive capacity of at least 30%, at least 40%, at least 50%, at least 60%, at least 70%, at least 75%, at least 80%, at least 90% or at least 95% by weight or volume which occurs in 1 minute to 2 minutes, 1 minute to 3 minutes, 1 minute to 4 minutes, 1 minute to 5 minutes, 1 minute to 6 minutes, 1 minute to 7 minutes, 1 minute to 8 minutes, 1 minute to 9 minutes, 1 minute to 10 minutes, 1 minute to 15 minutes, 1 minute to 20 minutes, 1 minute to 25 minutes, 1 minute to 30 minutes, 2 minutes to 3 minutes, 2 minutes to 4 minutes, 2 minutes to 5 minutes, 2 minutes to 6 minutes, 2 minutes to 7 minutes, 2 minutes to 8 minutes, 2 minutes to 9 minutes, 2 minutes to 10 minutes, 2 minutes to 15 minutes, 2 minutes to 20 minutes, 2 minutes to 25 minutes, 2 minutes to 30 minutes, 3 minutes to 4 minutes, 3 minutes to 5 minutes, 3 minutes to 6 minutes, 3 minutes to 7 minutes, 3 minutes to 8 minutes, 3 minutes to 9 minutes, 3 minutes to 10 minutes, 3 minutes to 15 minutes, 3 minutes to 20 minutes, 3 minutes to 25 minutes, 3 minutes to 30 minutes, 4 minutes to 5 minutes, 4 minutes to 6 minutes, 4 minutes to 7 minutes, 4 minutes to 8 minutes, 4 minutes to 9 minutes, 4 minutes to 10 minutes, 4 minutes to 15 minutes, 4 minutes to 20 minutes, 4 minutes to 25 minutes, 4 minutes to 30 minutes, 5 minutes to 6 minutes, 5 minutes to 7 minutes, 5 minutes to 8 minutes, 5 minutes to 9 minutes, 5 minutes to 10 minutes, 5 minutes to 15 minutes, 5 minutes to 20 minutes, 5 minutes to 25 minutes, 5 minutes to 30 minutes, 10 minutes to 15 minutes, 10 minutes to 20 minutes, 10 minutes to 25 minutes, 10 minutes to 30 minutes, 15 minutes to 20 minutes, 15 minutes to 25 minutes, 15 minutes to 30 minutes, 20 minutes to 25 minutes, 20 minutes to 30 minutes or 25 minutes to 30 minutes after exposure to the environment having an alkaline pH or at least 50%, at least 60%, at least 70%, at least 75%, at least 80%, at least 90% or at least 95% of one or more hydrogel particles have an absorptive capacity of at most 30%, at most 40%, at most 50%, at most 60%, at most 70%, at most 75%, at most 80%, at most 90% or at most 95% by weight or volume which occurs in 1 minute to 2 minutes, 1 minute to 3 minutes, 1 minute to 4 minutes, 1 minute to 5 minutes, 1 minute to 6 minutes, 1 minute to 7 minutes, 1 minute to 8 minutes, 1 minute to 9 minutes, 1 minute to 10 minutes, 1 minute to 15 minutes, 1 minute to 20 minutes, 1 minute to 25 minutes, 1 minute to 30 minutes, 2 minutes to 3 minutes, 2 minutes to 4 minutes, 2 minutes to 5 minutes, 2 minutes to 6 minutes, 2 minutes to 7 minutes, 2 minutes to 8 minutes, 2 minutes to 9 minutes, 2 minutes to 10 minutes, 2 minutes to 15 minutes, 2 minutes to 20 minutes, 2 minutes to 25 minutes, 2 minutes to 30 minutes, 3 minutes to 4 minutes, 3 minutes to 5 minutes, 3 minutes to 6 minutes, 3 minutes to 7 minutes, 3 minutes to 8 minutes, 3 minutes to 9 minutes, 3 minutes to 10 minutes, 3 minutes to 15 minutes, 3 minutes to 20 minutes, 3 minutes to 25 minutes, 3 minutes to 30 minutes, 4 minutes to 5 minutes, 4 minutes to 6 minutes, 4 minutes to 7 minutes, 4 minutes to 8 minutes, 4 minutes to 9 minutes, 4 minutes to 10 minutes, 4 minutes to 15 minutes, 4 minutes to 20 minutes, 4 minutes to 25 minutes, 4 minutes to 30 minutes, 5 minutes to 6 minutes, 5 minutes to 7 minutes, 5 minutes to 8 minutes, 5 minutes to 9 minutes, 5 minutes to 10 minutes, 5 minutes to 15 minutes, 5 minutes to 20 minutes, 5 minutes to 25 minutes, 5 minutes to 30 minutes, 10 minutes to 15 minutes, 10 minutes to 20 minutes, 10 minutes to 25 minutes, 10 minutes to 30 minutes, 15 minutes to 20 minutes, 15 minutes to 25 minutes, 15 minutes to 30 minutes, 20 minutes to 25 minutes, 20 minutes to 30 minutes or 25 minutes to 30 minutes after exposure to the environment having an alkaline pH or at least 50%, at least 60%, at least 70%, at least 75%, at least 80%, at least 90% or at least 95% of one or more hydrogel particles have an absorptive capacity of between 25% to 50%, 25% to 75%, 25% to 100% 50% to 75%, 50% to 100% or 75% to 100% by weight or volume which occurs in 1 minute to 2 minutes, 1 minute to 3 minutes, 1 minute to 4 minutes, 1 minute to 5 minutes, 1 minute to 6 minutes, 1 minute to 7 minutes, 1 minute to 8 minutes, 1 minute to 9 minutes, 1 minute to 10 minutes, 1 minute to 15 minutes, 1 minute to 20 minutes, 1 minute to 25 minutes, 1 minute to 30 minutes, 2 minutes to 3 minutes, 2 minutes to 4 minutes, 2 minutes to 5 minutes, 2 minutes to 6 minutes, 2 minutes to 7 minutes, 2 minutes to 8 minutes, 2 minutes to 9 minutes, 2 minutes to 10 minutes, 2 minutes to 15 minutes, 2 minutes to 20 minutes, 2 minutes to 25 minutes, 2 minutes to 30 minutes, 3 minutes to 4 minutes, 3 minutes to 5 minutes, 3 minutes to 6 minutes, 3 minutes to 7 minutes, 3 minutes to 8 minutes, 3 minutes to 9 minutes, 3 minutes to 10 minutes, 3 minutes to 15 minutes, 3 minutes to 20 minutes, 3 minutes to 25 minutes, 3 minutes to 30 minutes, 4 minutes to 5 minutes, 4 minutes to 6 minutes, 4 minutes to 7 minutes, 4 minutes to 8 minutes, 4 minutes to 9 minutes, 4 minutes to 10 minutes, 4 minutes to 15 minutes, 4 minutes to 20 minutes, 4 minutes to 25 minutes, 4 minutes to 30 minutes, 5 minutes to 6 minutes, 5 minutes to 7 minutes, 5 minutes to 8 minutes, 5 minutes to 9 minutes, 5 minutes to 10 minutes, 5 minutes to 15 minutes, 5 minutes to 20 minutes, 5 minutes to 25 minutes, 5 minutes to 30 minutes, 10 minutes to 15 minutes, 10 minutes to 20 minutes, 10 minutes to 25 minutes, 10 minutes to 30 minutes, 15 minutes to 20 minutes, 15 minutes to 25 minutes, 15 minutes to 30 minutes, 20 minutes to 25 minutes, 20 minutes to 30 minutes or 25 minutes to 30 minutes after exposure to the environment having an alkaline pH.

25. The arthropod pest control composition of any one of embodiments 1-24, wherein the one or more pH-sensitive polymers includes at least one polyacidic polymer, at least one polybasic polymer or both at least one polyacidic polymer and at least one polybasic polymer.

26. The arthropod pest control composition of embodiment 25, wherein the at least one polyacidic polymer includes poly(acrylate), poly(carboxylic acid), poly(sulfonamide), acrylamide, poly(acrylamide), acrylic acid, poly(acrylic acid), poly(ethacrylic acid), poly(propylacrylic acid), poly(acrylonitrile), methacrylic acid, methacrylic acid poly(ethyleneglycol) methyl ether methacrylate, poly (methacrylic acid), 2-hydroxyethylmethacrylate, 2-hydroxypropyl acrylate, poly(L-lactic acid), 3,3-dimethyl-3-silapentamethylene, alginate, carrageenan, hyaluronic acid, xanthan gum or any combination thereof.

27. The arthropod pest control composition of embodiment 25 or 26, wherein the at least one polybasic polymer includes poly(vinylpyrrolidine), poly(vinylamine), poly (vinyl-immidazole), poly(ethyleneimine), poly(propyleneimine), poly(L-lysine), N,N'-diethylethylenediamine, N,N-dimethylaminoethyl methacrylate, poly(N,N-diakylaminoethylmethacrylate), poly(N,N-dimethylaminoethylmethacrylate), poly(N,N-diethylaminoethylmethacrylate), poly(ethylene glycol), poly(ethylene glycol) dimethacrylate, poly(ethylene glycol)methyl ether methacrylate, poly(aminosaccharide), chitosan or any combination thereof.

28. The arthropod pest control composition of any one of embodiments 1-27, wherein the one or more pH-sensitive polymers include q poly(acrylate) polymer, a poly(acrylic acid) polymer and/or a poly(ethylene glycol) polymer.

29. The arthropod pest control composition of any one of embodiments 1-28, wherein the one or more hydrogel particles are poly(acrylate)-based superporous hydrogel particles or poly(acrylic acid)-based superporous hydrogel particles.

30. The arthropod pest control composition of embodiment 29, wherein the poly(acrylic acid)-based superporous hydrogel particles comprise a poly(acrylic acid) polymer and a poly(ethylene glycol) copolymer.

31. The arthropod pest control composition of any one of embodiments 1-30, wherein the hydrogel composition is substantially non-toxic to humans, mammals, plants and the environment.

32. The arthropod pest control composition of any one of embodiments 1-31, wherein the hydrogel composition is biodegradable.

33. The arthropod pest control composition of any one of embodiments 1-32, wherein the one or more hydrogel particles are coated with a polyhedrin protein.

34. The arthropod pest control composition of any one of embodiments 1-33, further comprising a matrix material.

35. The arthropod pest control composition of embodiment 34, wherein the matrix material is a hydrophilic and/or a hydrophobic non-toxic material.

36. The arthropod pest control composition of embodiment 34, wherein the matrix material is an agar, a cellulose ether, an aliphatic alcohol, a polyalkylene glycol, an acrylic resin or a long-chain $C_{8-50}$ substituted or unsubstituted hydrocarbon.

37. The arthropod pest control composition of embodiment 36, wherein the cellulose ether includes an alkylcellulose, a hydroxyalkylcellulose or a carboxyalkylcellulose.

38. The arthropod pest control composition of embodiment 37, wherein the alkylcellulose cellulose is ethylcellulose, propylcellulose or propylmetlhylcellulose.

39. The arthropod pest control composition of embodiment 37, wherein the hydroxyalkyl cellulose is hydroxypropylcellulose, hydroxypropylmetlhylcellulose or hydroxyethyl cellulose.

40. The arthropod pest control composition of embodiment 37, wherein the carboxyalkylcellulose cellulose is carboxyethylcellulose, carboxypropylcellulose or carboxpropylmetlhylcellulose.

41. The arthropod pest control composition of embodiment 36, wherein the long-chain substituted or unsubstituted hydrocarbon includes a $C_{8-50}$ substituted or unsubstituted hydrocarbon, such as, e.g., a fatty acid, a fatty alcohol, glyceryl a fatty acid ester, a hydrogenated mineral oil, a hydrogenated vegetable oil and a wax.

42. The arthropod pest control composition of any one of embodiment 34-41, comprising a first portion and a second portion, the first portion comprising the matrix material and the second portion comprising the matrix material and the one or more hydrogel particles.

43. The arthropod pest control composition of any one of embodiment 34-41, wherein the one or more hydrogel particles and the matrix material are interspersed throughout the entire composition.

44. The arthropod pest control composition of any one of embodiments 1-43, further comprising an attractant.

45. The arthropod pest control composition of embodiment 44, wherein the attractant is a compound that binds an odorant receptor.

46. The arthropod pest control composition of embodiment 45, wherein the compound is an odorant binding protein.

47. The arthropod pest control composition of embodiment 46, wherein the odorant binding protein is an odorant binding protein 1.

48. The arthropod pest control composition of embodiment 44, wherein the attractant is a fish meal, a shrimp meal, a squid meal, a soybean meal, an oat meal, a wheat meal, spirulina or any combination thereof.

49. The arthropod pest control composition of embodiment 44, wherein the attractant is tetramin.

50. An arthropod pest control composition comprising a hydrogel composition comprising one or more pH-sensitive polymers, wherein the hydrogel composition absorbs a liquid when exposed to an environment having an alkaline pH.

51. The arthropod pest control composition of embodiment 30, wherein the alkaline pH is a pH of 8.5 or more.

52. The arthropod pest control composition of embodiment 31, wherein the environment has a pH range of 9 to 12.

53. The arthropod pest control composition of any one of embodiments 50-52, wherein the hydrogel composition is a superporous hydrogel composition comprising pores.

54. The arthropod pest control composition of embodiment 53, wherein the pores have an average diameter of at least 10 nm, at least 20 nm, at least 30 nm, at least 40 nm, at least 50 nm, at least 60 nm, at least 70 nm, at least 80 nm, at least 90 nm, at least 100 nm, at least 200 nm, at least 300 nm, at least 400 nm, at least 500 nm, at least 600 nm, at least 700 nm, at least 800 nm, at least 900 nm, at least 1 µm at least 2 µm at least 3 µm at least 4 µm at least 5 µm at least 10 µm at least 20 µm at least 30 µm at least 40 µm at least 50 µm at least 60 µm at least 70 µm at least 80 µm at least 90 µm, at least 100 µm at least 200 µm at least 300 µm at least 400 µm at least 500 µm at least 600 µm, at least 700 µm at least 800 µm at least 900 µm or at least 1 mm or at most 10 nm, at most 20 nm, at most 30 nm, at most 40 nm, at most 50 nm, at most 60 nm, at most 70 nm, at most 80 nm, at most 90 nm, at most 100 nm, at most 200 nm, at most 300 nm, at most 400 nm, at most 500 nm, at most 600 nm, at most 700 nm, at most 800 nm, at most 900 nm, at most 1 µm at most 2 µm at most 3 µm at most 4 µm at most 5 µm at most 10 µm at most 20 µm at most 30 µm at most 40 µm at most 50 µm at most 60 µm at most 70 µm at most 80 µm at most 90 µm at most 100 µm at most 200 µm at most 300 µm at most 400 µm at most 500 µm at most 600 µm at most 700 µm at most 800 µm at most 900 µm or at most 1 mm or 10 nm to 25 nm, 10 nm to 50 nm, 10 nm to 75 nm, 10 nm to 100 nm, 25 nm to 50 nm, 25 nm to 75 nm, 25 nm to 100 nm, 50 nm to 75 nm, 50 nm to 100 nm, 75 nm to 100 nm, 100 nm to 250 nm, 100 nm to 500 nm, 100 nm to 750 nm, 100 nm to 1 µm 250 nm to 500 nm, 250 nm to 750 nm, 250 nm to 1 µm, 500 nm to 750 nm, 500 nm to 1 µm, 1 µm to 2.5 µm, 1 µm to 5 µm, 1 µm to 10 µm, 1 µm to 25 µm, 1 µm to 50 µm, 1 µm to 75 µm, 1 µm to 100 µm, 2.5 µm to 5 µm, 2.5 µm to 10 µm, 2.5 µm to 25 µm, 2.5 µm to 50 µm, 2.5 µm to 75 µm, 2.5 µm to 100 µm, 5 µm to 10 µm, 5 µm to 25 µm 5 µm to 50 µm 5 µm to 75 µm, 5 µm to 100 µm, 10 µm to 25 µm, 10 µm to 50 µm, 10 µm to 75 µm, 10 µm to 100 µm, 25 µm to 50 µm, 25 µm to 75 µm, 25 µm to 100 µm, 50 µm to 75 µm, 50 µm to 100 µm 75 µm to 100 µm, 100 µm to 250 µm, 100 µm to 500 µm, 100 µm to 750 µm, 100 µm to 1 mm, 250 µm to 500 µm, 250 µm to 750 µm, 250 µm to 1 mm.

55. The arthropod pest control composition of any one of embodiments 50-54, wherein the hydrogel composition further comprise a pre-cross-linked matrix-swelling additive.

56. The arthropod pest control composition of embodiment 55, wherein the pre-cross-linked matrix-swelling additive includes a crosslinked carboxy methylcellulose, a cross-linked primojel and crospovidone, or a carbopol and polyvinyl alcohol.

57. The arthropod pest control composition of any one of embodiments 1-11, wherein the hydrogel composition further comprise a hybrid agent.

58. The arthropod pest control composition of embodiment 57, wherein the hybrid agent includes a polysaccharide like alginate, carboxy methylcellulose, pectin, chitosan or a synthetic water-soluble hydrophilic polymer like poly(vinyl alcohol).

59. The arthropod pest control composition of any one of embodiments 50-58, wherein the hydrogel composition has a degree of swelling that is at least 10 times, at least 20 times, at least 30 times, at least 40 times, at least 50 times, at least 60 times, at least 70 times, at least 80 times, at least 90 times, at least 100 times, at least 125 times, at least 150 times, at least 175 times, at least 200 times, at least 225 times, at least 250 times, at least 275 times or at least 300 times by weight or at most 10 times, at most 20 times, at most 30 times, at most 40 times, at most 50 times, at most 60 times, at most 70 times, at most 80 times, at most 90 times, at most 100 times, at most 125 times, at most 150 times, at most 175 times, at most 200 times, at most 225 times, at most 250 times, at most 275 times or at most 300 times by weight or 10 times to 25 times, 10 times to 50 times, 10 times to 75 times, 10 times to 100 times, 10 times to 125 times, 10 times to 150 times, 10 times to 175 times, 10 times to 200 times, 10 times to 225 times, 10 times to 250 times, 10 times to 275 times, 10 times to 300 times, 25 times to 50 times, 25 times to 75 times, 25 times to 100 times, 25 times to 125 times, 25 times to 150 times, 25 times to 175 times, 25 times to 200 times, 25 times to 225 times, 25 times to 250 times, 25 times to 275 times, 25 times to 300 times, 50 times to 75 times, 50 times to 100 times, 50 times to 125 times, 50 times to 150 times, 50 times to 175 times, 50 times to 200 times, 50 times to 225 times, 50 times to 250 times, 50 times to 275 times, 50 times to 300 times, 75 times to 100 times, 75 times to 125 times, 75 times to 150 times, 75 times to 175 times, 75 times to 200 times, 75 times to 225 times, 75 times to 250 times, 75 times to 275 times, 75 times to 300 times, 100 times to 125 times, 100 times to 150 times, 100 times to 175 times, 100 times to 200 times, 100 times to 225 times, 100 times to 250 times, 100 times to 275 times, 100 times to 300 times, 125 times to 150 times, 125 times to 175 times, 125 times to 200 times, 125 times to 225 times, 125 times to 250 times, 125 times to 275 times, 125 times to 300 times, 150 times to 175 times, 150 times to 200 times, 150 times to 225 times, 150 times to 250 times, 150 times to 275 times, 150 times to 300 times, 175 times to 200 times, 175 times to 225 times, 175 times to 250 times, 175 times to 275 times, 175 times to 300 times, 200 times to 225 times, 200 times to 250 times, 200 times to 275 times, 200 times to 300 times, 225 times to 250 times, 225 times to 275 times, 225 times to 300 times, 250 times to 275 times, 250 times to 300 times or 275 times to 300 times by weight.

60. The arthropod pest control composition of any one of embodiments 50-58, wherein the hydrogel composition has a degree of swelling that is at least 10 times, at least 20 times, at least 30 times, at least 40 times, at least 50 times, at least 60 times, at least 70 times, at least 80 times, at least 90 times, at least 100 times, at least 125 times, at least 150 times, at least 175 times, at least 200 times, at least 225 times, at least 250 times, at least 275 times or at least 300 times by volume or at most 10 times, at most 20 times, at most 30 times, at most 40 times, at most 50 times, at most 60 times, at most 70 times, at most 80 times, at most 90 times, at most 100 times, at most 125 times, at most 150 times, at most 175 times, at most 200 times, at most 225 times, at most 250 times, at most 275 times or at most 300 times by volume or 10 times to 25 times, 10 times to 50 times, 10 times to 75 times, 10 times to 100 times, 10 times to 125 times, 10 times to 150 times, 10 times to 175 times, 10 times to 200 times, 10 times to 225 times, 10 times to 250 times, 10 times to 275 times, 10 times to 300 times, 25 times to 50 times, 25 times to 75 times, 25 times to 100 times, 25 times to 125 times, 25 times to 150 times, 25 times to 175 times, 25 times to 200 times, 25 times to 225 times, 25 times to 250 times, 25 times to 275 times, 25 times to 300 times, 50 times to 75 times, 50 times to 100 times, 50 times to 125 times, 50 times to 150 times, 50 times to 175 times, 50 times to 200 times, 50 times to 225 times, 50 times to 250 times, 50 times to 275 times, 50 times to 300 times, 75 times to 100 times, 75 times to 125 times, 75 times to 150 times, 75 times to 175 times, 75 times to 200 times, 75 times to 225 times, 75 times to 250 times, 75 times to 275 times, 75 times to 300 times, 100 times to 125 times, 100 times to 150 times, 100 times to 175 times, 100 times to 200 times, 100 times to 225 times, 100 times to 250 times, 100 times to 275 times, 100 times to 300 times, 125 times to 150 times, 125 times to 175 times, 125 times to 200 times, 125 times to 225 times, 125 times to 250 times, 125 times to 275 times, 125 times to 300 times, 150 times to 175 times, 150 times to 200 times, 150 times to 225 times, 150 times to 250 times, 150 times to 275 times, 150 times to 300 times, 175 times to 200 times, 175 times to 225 times, 175 times to 250 times, 175 times to 275 times, 175 times to 300 times, 200 times to 225 times, 200 times to 250 times, 200 times to 275 times, 200 times to 300 times, 225 times to 250 times, 225 times to 275 times, 225 times to 300 times, 250 times to 275 times, 250 times to 300 times or 275 times to 300 times by volume.

61. The arthropod pest control composition of any one of embodiments 50-60, wherein the hydrogel composition has an absorptive capacity that is at least 30%, at least 40%, at least 50%, at least 60%, at least 70%, at least 75%, at least 80%, at least 90% or at least 95% by weight or at most 30%, at most 40%, at most 50%, at most 60%, at most 70%, at most 75%, at most 80%, at most 90% or at most 95% by weight or 25% to 50%, 25% to 75%, 25% to 100% 50% to 75%, 50% to 100% or 75% to 100% by weight.

62. The arthropod pest control composition of any one of embodiments 50-60, wherein the hydrogel composition has an absorptive capacity that is at least 30%, at least 40%, at least 50%, at least 60%, at least 70%, at least 75%, at least 80%, at least 90% or at least 95% by volume or at most 30%, at most 40%, at most 50%, at most 60%, at most 70%, at most 75%, at most 80%, at most 90% or at most 95% by volume or 25% to 50%, 25% to 75%, 25% to 100% 50% to 75%, 50% to 100% or 75% to 100% by volume.

63. The arthropod pest control composition of any one of embodiments 50-62, wherein the phase transition of the hydrogel composition into the expanded state occurs in at most 1 minute, at most 2 minutes, at most 3 minutes, at most 4 minutes, at most 5 minutes, at most 6 minutes, at most 7 minutes, at most 8 minutes, at most 9 minutes, at most 10 minutes, at most 15 minutes, at most 20 minutes, at most 25 minutes or at most 30 minutes after exposure to the environment having an alkaline pH or 1 minute to 2 minutes, 1 minute to 3 minutes, 1 minute to 4 minutes, 1 minute to 5 minutes, 1 minute to 6 minutes, 1 minute to 7 minutes, 1 minute to 8 minutes, 1 minute to 9 minutes, 1 minute to 10 minutes, 1 minute to 15 minutes, 1 minute to 20 minutes, 1 minute to 25 minutes, 1 minute to 30 minutes, 2 minutes to 3 minutes, 2 minutes to 4 minutes, 2 minutes to 5 minutes, 2 minutes to 6 minutes, 2 minutes to 7 minutes, 2 minutes to 8 minutes, 2 minutes to 9 minutes, 2 minutes to 10 minutes, 2 minutes to 15 minutes, 2 minutes to 20 minutes, 2 minutes to 25 minutes, 2 minutes to 30 minutes, 3 minutes to 4 minutes, 3 minutes to 5 minutes, 3 minutes to 6 minutes, 3 minutes to 7 minutes, 3 minutes to 8 minutes, 3 minutes to 9 minutes, 3 minutes to 10 minutes, 3 minutes to 15 minutes, 3 minutes to 20 minutes, 3 minutes to 25 minutes, 3 minutes to 30 minutes, 4 minutes to 5 minutes, 4 minutes to 6 minutes, 4 minutes to 7 minutes, 4 minutes to 8 minutes, 4 minutes to 9 minutes, 4 minutes to 10 minutes, 4 minutes to 15 minutes, 4 minutes to 20 minutes, 4 minutes to 25 minutes, 4 minutes to 30 minutes, 5 minutes to 6 minutes, 5 minutes to 7 minutes, 5 minutes to 8 minutes, 5 minutes to 9 minutes, 5 minutes to 10 minutes, 5 minutes to 15 minutes, 5 minutes to 20 minutes, 5 minutes to 25 minutes, 5 minutes to 30 minutes, 10 minutes to 15 minutes, 10 minutes to 20 minutes, 10 minutes to 25 minutes, 10 minutes to 30 minutes, 15 minutes to 20 minutes, 15 minutes to 25 minutes, 15 minutes to 30 minutes, 20 minutes to 25 minutes, 20 minutes to 30 minutes or 25 minutes to 30 minutes after exposure to the environment having an alkaline pH.

64. The arthropod pest control composition of any one of embodiments 50-63, wherein the phase transition of the hydrogel composition into an expanded state occurs at an alkaline pH.

65. The arthropod pest control composition of any one of embodiments 50-64, wherein the phase transition of the hydrogel composition into an expanded state occurs at a pH of 8.0 or higher, 8.5 or higher, 9.0 or higher, 9.5 or higher or 10 or higher or a pH of 8 to 10, 8 to 11, 8 to 12, 8 to 13, 8.5 to 10, 8.5 to 11, 8.5 to 12, 8.5 to 13, 9 to 10, 9 to 11, 9 to 12, 9 to 13, 9.5 to 10, 9.5 to 11, 9.5 to 12 or 9.5 to 13.

66. The arthropod pest control composition of any one of embodiments 50-65, wherein the hydrogel composition has a degree of swelling of at least 10 times, at least 20 times, at least 30 times, at least 40 times, at least 50 times, at least 60 times, at least 70 times, at least 80 times, at least 90 times, at least 100 times, at least 125 times, at least 150 times, at least 175 times, at least 200 times, at least 225 times, at least 250 times, at least 275 times or at least 300 times by weight or volume which occurs in at most 1 minute, at most 2 minutes, at most 3 minutes, at most 4 minutes, at most 5 minutes, at most 6 minutes, at most 7 minutes, at most 8 minutes, at most 9 minutes, at most 10 minutes, at most 15 minutes, at most 20 minutes, at most 25 minutes or at most 30 minutes after exposure to the environment having an alkaline pH or at least 50%, at least 60%, at least 70%, at least 75%, at least 80%, at least 90% or at least 95% of one or more hydrogel particles have a degree of swelling of at most 10 times, at most 20 times, at most 30 times, at most 40 times, at most 50 times, at most 60 times, at most 70 times, at most 80 times, at most 90 times, at most 100 times, at most 125 times, at most 150 times, at most 175 times, at most 200 times, at most 225 times, at most 250 times, at most 275 times or at most 300 times by weight or volume which occurs in at most 1 minute, at most 2 minutes, at most 3 minutes, at most 4 minutes, at most 5 minutes, at most 6 minutes, at most 7 minutes, at most 8 minutes, at most 9 minutes, at most 10 minutes, at most 15 minutes, at most 20 minutes, at most 25 minutes or at most 30 minutes after exposure to the environment having an alkaline pH or at least 50%, at least 60%, at least 70%, at least 75%, at least 80%, at least 90% or at least 95% of one or more hydrogel particles have a degree of swelling of between 10 times to 25 times, 10 times to 50 times, 10 times to 75 times, 10 times to 100 times, 10 times to 125 times, 10 times to 150 times, 10 times to 175 times, 10 times to 200 times, 10 times to 225 times, 10 times to 250 times, 10 times to 275 times, 10 times to 300 times, 25 times to 50 times, 25 times to 75 times, 25 times to 100 times, 25 times to 125 times, 25 times to 150 times, 25 times to 175 times, 25 times to 200 times, 25 times to 225 times, 25 times to 250 times, 25 times to 275 times, 25 times to 300 times, 50 times to 75 times, 50 times to 100 times, 50 times to 125 times, 50 times to 150 times, 50 times to 175 times, 50 times to 200 times, 50 times to 225 times, 50 times to 250 times, 50 times to 275 times, 50 times to 300 times, 75 times to 100 times, 75 times to 125 times, 75 times to 150 times, 75 times to 175 times, 75 times to 200 times, 75 times to 225 times, 75 times to 250 times, 75 times to 275 times, 75 times to 300 times, 100 times to 125 times, 100 times to 150 times, 100 times to 175 times, 100 times to 200 times, 100 times to 225 times, 100 times to 250 times, 100 times to 275 times, 100 times to 300 times, 125 times to 150 times, 125 times to 175 times, 125 times to 200 times, 125 times to 225 times, 125 times to 250 times, 125 times to 275 times, 125 times to 300 times, 150 times to 175 times, 150 times to 200 times, 150 times to 225 times, 150 times to 250 times, 150 times to 275 times, 150 times to 300 times, 175 times to 200 times, 175 times to 225 times, 175 times to 250 times, 175 times to 275 times, 175 times to 300 times, 200 times to 225 times, 200 times to 250 times, 200 times to 275 times, 200 times to 300 times, 225 times to 250 times, 225 times to 275 times, 225 times to 300 times, 250 times to 275 times, 250 times to 300 times or 275 times to 300 times by weight or volume which occurs in at most 1 minute, at most 2 minutes, at most 3 minutes, at most 4 minutes, at most 5 minutes, at most 6 minutes, at most 7 minutes, at most 8 minutes, at most 9 minutes, at most 10 minutes, at most 15 minutes, at most 20 minutes, at most 25 minutes or at most 30 minutes after exposure to the environment having an alkaline pH.

67. The arthropod pest control composition of any one of embodiments 50-65, wherein the hydrogel composition has a degree of swelling of at least 10 times, at least 20 times, at least 30 times, at least 40 times, at least 50 times, at least 60 times, at least 70 times, at least 80 times, at least 90 times, at least 100 times, at least 125 times, at least 150 times, at least 175 times, at least 200 times, at least 225 times, at least 250 times, at least 275 times or at least 300 times by weight or volume which occurs in 1 minute to 2 minutes, 1 minute to 3 minutes, 1 minute to 4 minutes, 1 minute to 5 minutes, 1 minute to 6 minutes, 1 minute to 7 minutes, 1 minute to 8 minutes, 1 minute to 9 minutes, 1 minute to 10 minutes, 1 minute to 15 minutes, 1 minute to 20 minutes, 1 minute to 25 minutes, 1 minute to 30 minutes, 2 minutes to 3 minutes, 2 minutes to 4 minutes, 2 minutes to 5 minutes, 2 minutes to 6 minutes, 2 minutes to 7 minutes, 2 minutes to 8 minutes, 2 minutes to 9 minutes, 2 minutes to 10 minutes, 2 minutes to 15 minutes, 2 minutes to 20 minutes, 2 minutes to 25 minutes, 2 minutes to 30 minutes, 3 minutes to 4 minutes, 3 minutes to 5 minutes, 3 minutes to 6 minutes, 3 minutes to 7 minutes, 3 minutes to 8 minutes, 3 minutes to 9 minutes, 3 minutes to 10 minutes, 3 minutes to 15 minutes, 3 minutes to 20 minutes, 3 minutes to 25 minutes, 3 minutes to 30 minutes, 4 minutes to 5 minutes, 4 minutes to 6 minutes, 4 minutes to 7 minutes, 4 minutes to 8 minutes, 4 minutes to 9 minutes, 4 minutes to 10 minutes, 4 minutes to 15 minutes, 4 minutes to 20 minutes, 4 minutes to 25 minutes, 4 minutes to 30 minutes, 5 minutes to 6 minutes, 5 minutes to 7 minutes, 5 minutes to 8 minutes, 5 minutes to 9 minutes, 5 minutes to 10 minutes, 5 minutes to 15 minutes, 5 minutes to 20 minutes, 5 minutes to 25 minutes, 5 minutes to 30 minutes, 10 minutes to 15 minutes, 10 minutes to 20 minutes, 10 minutes to 25 minutes, 10 minutes to 30 minutes, 15 minutes to 20 minutes, 15 minutes to 25 minutes, 15 minutes to 30 minutes, 20 minutes to 25 minutes, 20 minutes to 30 minutes or 25 minutes to 30 minutes after exposure to the environment having an alkaline pH or at least 50%, at least 60%, at least 70%, at least 75%, at least 80%, at least 90% or at least 95% of one or more hydrogel particles have a degree of swelling of at most 10 times, at most 20 times, at most 30 times, at most 40 times, at most 50 times, at most 60 times, at most 70 times, at most 80 times, at most 90 times, at most 100 times, at most 125 times, at most 150 times, at most 175 times, at most 200 times, at most 225 times, at most 250 times, at most 275 times or at most 300 times by weight or volume which occurs in 1 minute to 2 minutes, 1 minute to 3 minutes, 1 minute to 4 minutes, 1 minute to 5 minutes, 1 minute to 6 minutes, 1 minute to 7 minutes, 1 minute to 8 minutes, 1 minute to 9 minutes, 1 minute to 10 minutes, 1 minute to 15 minutes, 1 minute to 20 minutes, 1 minute to 25 minutes, 1 minute to 30 minutes, 2 minutes to 3 minutes, 2 minutes to 4 minutes, 2 minutes to 5 minutes, 2 minutes to 6 minutes, 2 minutes to 7 minutes, 2 minutes to 8 minutes, 2 minutes to 9 minutes, 2 minutes to 10 minutes, 2 minutes to 15 minutes, 2 minutes to 20 minutes, 2 minutes to 25 minutes, 2 minutes to 30 minutes, 3 minutes to 4 minutes, 3 minutes to 5 minutes, 3 minutes to 6 minutes, 3 minutes to 7 minutes, 3 minutes to 8 minutes, 3 minutes to 9 minutes, 3 minutes to 10 minutes, 3 minutes to 15 minutes, 3 minutes to 20 minutes, 3 minutes to 25 minutes, 3 minutes to 30 minutes, 4 minutes to 5 minutes, 4 minutes to 6 minutes, 4 minutes to 7 minutes, 4 minutes to 8 minutes, 4 minutes to 9 minutes, 4 minutes to 10 minutes, 4 minutes to 15 minutes, 4 minutes to 20 minutes, 4 minutes to 25 minutes, 4 minutes to 30 minutes, 5 minutes to 6 minutes, 5 minutes to 7 minutes, 5 minutes to 8 minutes, 5 minutes to 9 minutes, 5 minutes to 10 minutes, 5 minutes to 15 minutes, 5 minutes to 20 minutes, 5 minutes to 25 minutes, 5 minutes to 30 minutes, 10 minutes to 15 minutes, 10 minutes to 20 minutes, 10 minutes to 25 minutes, 10 minutes to 30 minutes, 15 minutes to 20 minutes, 15 minutes to 25 minutes, 15 minutes to 30 minutes, 20 minutes to 25 minutes, 20 minutes to 30 minutes or 25 minutes to 30 minutes after exposure to the environment having an alkaline pH or at least 50%, at least 60%, at least 70%, at least 75%, at least 80%, at least 90% or at least 95% of one or more hydrogel particles have a degree of swelling of between 10 times to 25 times, 10 times to 50 times, 10 times to 75 times, 10 times to 100 times, 10 times to 125 times, 10 times to 150 times, 10 times to 175 times, 10 times to 200 times, 10 times to 225 times, 10 times to 250 times, 10 times to 275 times, 10 times to 300 times, 25 times to 50 times, 25 times to 75 times, 25 times to 100 times, 25 times to 125 times, 25 times to 150 times, 25 times to 175 times, 25 times to 200 times, 25 times to 225 times, 25 times to 250 times, 25 times to 275 times, 25 times to 300 times, 50 times to 75 times, 50 times to 100 times, 50 times to 125 times, 50 times to 150 times, 50 times to 175 times, 50 times to 200 times, 50 times to 225 times, 50 times to 250 times, 50 times to 275 times, 50 times to 300 times, 75 times to 100 times, 75 times to 125 times, 75 times to 150 times, 75 times to 175 times, 75 times to 200 times, 75 times to 225 times, 75 times to 250 times, 75 times to 275 times, 75 times to 300 times, 100 times to 125 times, 100 times to 150 times, 100 times to 175 times, 100 times to 200 times, 100 times to 225 times, 100 times to 250 times, 100 times to 275 times, 100 times to 300 times, 125 times to 150 times, 125 times to 175 times, 125 times to 200 times, 125 times to 225 times, 125 times to 250 times, 125 times to 275 times, 125 times to 300 times, 150 times to 175 times, 150 times to 200 times, 150 times to 225 times, 150 times to 250 times, 150 times to 275 times, 150 times to 300 times, 175 times to 200 times, 175 times to 225 times, 175 times to 250 times, 175 times to 275 times, 175 times to 300 times, 200 times to 225 times, 200 times to 250 times, 200 times to 275 times, 200 times to 300 times, 225 times to 250 times, 225 times to 275 times, 225 times to 300 times, 250 times to 275 times, 250 times to 300 times or 275 times to 300 times by weight or volume which occurs in 1 minute to 2 minutes, 1 minute to 3 minutes, 1 minute to 4 minutes, 1 minute to 5 minutes, 1 minute to 6 minutes, 1 minute to 7 minutes, 1 minute to 8 minutes, 1 minute to 9 minutes, 1 minute to 10 minutes, 1 minute to 15 minutes, 1 minute to 20 minutes, 1 minute to 25 minutes, 1 minute to 30 minutes, 2 minutes to 3 minutes, 2 minutes to 4 minutes, 2 minutes to 5 minutes, 2 minutes to 6 minutes, 2 minutes to 7 minutes, 2 minutes to 8 minutes, 2 minutes to 9 minutes, 2 minutes to 10 minutes, 2 minutes to 15 minutes, 2 minutes to 20 minutes, 2 minutes to 25 minutes, 2 minutes to 30 minutes, 3 minutes to 4 minutes, 3 minutes to 5 minutes, 3 minutes to 6 minutes, 3 minutes to 7 minutes, 3 minutes to 8 minutes, 3 minutes to 9 minutes, 3 minutes to 10 minutes, 3 minutes to 15 minutes, 3 minutes to 20 minutes, 3 minutes to 25 minutes, 3 minutes to 30 minutes, 4 minutes to 5 minutes, 4 minutes to 6 minutes, 4 minutes to 7 minutes, 4 minutes to 8 minutes, 4 minutes to 9 minutes, 4 minutes to 10 minutes, 4 minutes to 15 minutes, 4 minutes to 20 minutes, 4 minutes to 25 minutes, 4 minutes to 30 minutes, 5 minutes to 6 minutes, 5 minutes to 7 minutes, 5 minutes to 8 minutes, 5 minutes to 9 minutes, 5 minutes to 10 minutes, 5 minutes to 15 minutes, 5 minutes to 20 minutes, 5 minutes to 25 minutes, 5 minutes to 30 minutes, 10 minutes to 15 minutes, 10 minutes to 20 minutes, 10 minutes to 25 minutes, 10 minutes to 30 minutes, 15 minutes to 20 minutes, 15 minutes to 25 minutes, 15 minutes to 30 minutes, 20 minutes to 25 minutes, 20 minutes to 30 minutes or 25 minutes to 30 minutes after exposure to the environment having an alkaline pH.

68. The arthropod pest control composition of any one of embodiments 50-67, wherein the hydrogel composition has an absorptive capacity of at least 30%, at least 40%, at least 50%, at least 60%, at least 70%, at least 75%, at least 80%, at least 90% or at least 95% by weight or volume which occurs in at most 1 minute, at most 2 minutes, at most 3 minutes, at most 4 minutes, at most 5 minutes, at most 6 minutes, at most 7 minutes, at most 8 minutes, at most 9 minutes, at most 10 minutes, at most 15 minutes, at most 20 minutes, at most 25 minutes or at most 30 minutes after exposure to the environment having an alkaline pH or at least 50%, at least 60%, at least 70%, at least 75%, at least 80%, at least 90% or at least 95% of one or more hydrogel particles have an absorptive capacity of at most 30%, at most 40%, at most 50%, at most 60%, at most 70%, at most 75%, at most 80%, at most 90% or at most 95% by weight or volume which occurs in at most 1 minute, at most 2 minutes, at most 3 minutes, at most 4 minutes, at most 5 minutes, at most 6 minutes, at most 7 minutes, at most 8 minutes, at most 9 minutes, at most 10 minutes, at most 15 minutes, at most 20 minutes, at most 25 minutes or at most 30 minutes after exposure to the environment having an alkaline pH or at least 50%, at least 60%, at least 70%, at least 75%, at least 80%, at least 90% or at least 95% of one or more hydrogel particles have an absorptive capacity of between 25% to 50%, 25% to 75%, 25% to 100% 50% to 75%, 50% to 100% or 75% to 100% by weight or volume which occurs in at most 1 minute, at most 2 minutes, at most 3 minutes, at most 4 minutes, at most 5 minutes, at most 6 minutes, at most 7 minutes, at most 8 minutes, at most 9 minutes, at most 10 minutes, at most 15 minutes, at most 20 minutes, at most 25 minutes or at most 30 minutes after exposure to the environment having an alkaline pH.

69. The arthropod pest control composition of any one of embodiments 50-67, wherein the hydrogel composition has an absorptive capacity of at least 30%, at least 40%, at least 50%, at least 60%, at least 70%, at least 75%, at least 80%, at least 90% or at least 95% by weight or volume which occurs in 1 minute to 2 minutes, 1 minute to 3 minutes, 1 minute to 4 minutes, 1 minute to 5 minutes, 1 minute to 6 minutes, 1 minute to 7 minutes, 1 minute to 8 minutes, 1 minute to 9 minutes, 1 minute to 10 minutes, 1 minute to 15 minutes, 1 minute to 20 minutes, 1 minute to 25 minutes, 1 minute to 30 minutes, 2 minutes to 3 minutes, 2 minutes to 4 minutes, 2 minutes to 5 minutes, 2 minutes to 6 minutes, 2 minutes to 7 minutes, 2 minutes to 8 minutes, 2 minutes to 9 minutes, 2 minutes to 10 minutes, 2 minutes to 15 minutes, 2 minutes to 20 minutes, 2 minutes to 25 minutes, 2 minutes to 30 minutes, 3 minutes to 4 minutes, 3 minutes to 5 minutes, 3 minutes to 6 minutes, 3 minutes to 7 minutes, 3 minutes to 8 minutes, 3 minutes to 9 minutes, 3 minutes to 10 minutes, 3 minutes to 15 minutes, 3 minutes to 20 minutes, 3 minutes to 25 minutes, 3 minutes to 30 minutes, 4 minutes to 5 minutes, 4 minutes to 6 minutes, 4 minutes to 7 minutes, 4 minutes to 8 minutes, 4 minutes to 9 minutes, 4 minutes to 10 minutes, 4 minutes to 15 minutes, 4 minutes to 20 minutes, 4 minutes to 25 minutes, 4 minutes to 30 minutes, 5 minutes to 6 minutes, 5 minutes to 7 minutes, 5 minutes to 8 minutes, 5 minutes to 9 minutes, 5 minutes to 10 minutes, 5 minutes to 15 minutes, 5 minutes to 20 minutes, 5 minutes to 25 minutes, 5 minutes to 30 minutes, 10 minutes to 15 minutes, 10 minutes to 20 minutes, 10 minutes to 25 minutes, 10 minutes to 30 minutes, 15 minutes to 20 minutes, 15 minutes to 25 minutes, 15 minutes to 30 minutes, 20 minutes to 25 minutes, 20 minutes to 30 minutes or 25 minutes to 30 minutes after exposure to the environment having an alkaline pH or at least 50%, at least 60%, at least 70%, at least 75%, at least 80%, at least 90% or at least 95% of one or more hydrogel particles have an absorptive capacity of at most 30%, at most 40%, at most 50%, at most 60%, at most 70%, at most 75%, at most 80%, at most 90% or at most 95% by weight or volume which occurs in 1 minute to 2 minutes, 1 minute to 3 minutes, 1 minute to 4 minutes, 1 minute to 5 minutes, 1 minute to 6 minutes, 1 minute to 7 minutes, 1 minute to 8 minutes, 1 minute to 9 minutes, 1 minute to 10 minutes, 1 minute to 15 minutes, 1 minute to 20 minutes, 1 minute to 25 minutes, 1 minute to 30 minutes, 2 minutes to 3 minutes, 2 minutes to 4 minutes, 2 minutes to 5 minutes, 2 minutes to 6 minutes, 2 minutes to 7 minutes, 2 minutes to 8 minutes, 2 minutes to 9 minutes, 2 minutes to 10 minutes, 2 minutes to 15 minutes, 2 minutes to 20 minutes, 2 minutes to 25 minutes, 2 minutes to 30 minutes, 3 minutes to 4 minutes, 3 minutes to 5 minutes, 3 minutes to 6 minutes, 3 minutes to 7 minutes, 3 minutes to 8 minutes, 3 minutes to 9 minutes, 3 minutes to 10 minutes, 3 minutes to 15 minutes, 3 minutes to 20 minutes, 3 minutes to 25 minutes, 3 minutes to 30 minutes, 4 minutes to 5 minutes, 4 minutes to 6 minutes, 4 minutes to 7 minutes, 4 minutes to 8 minutes, 4 minutes to 9 minutes, 4 minutes to 10 minutes, 4 minutes to 15 minutes, 4 minutes to 20 minutes, 4 minutes to 25 minutes, 4 minutes to 30 minutes, 5 minutes to 6 minutes, 5 minutes to 7 minutes, 5 minutes to 8 minutes, 5 minutes to 9 minutes, 5 minutes to 10 minutes, 5 minutes to 15 minutes, 5 minutes to 20 minutes, 5 minutes to 25 minutes, 5 minutes to 30 minutes, 10 minutes to 15 minutes, 10 minutes to 20 minutes, 10 minutes to 25 minutes, 10 minutes to 30 minutes, 15 minutes to 20 minutes, 15 minutes to 25 minutes, 15 minutes to 30 minutes, 20 minutes to 25 minutes, 20 minutes to 30 minutes or 25 minutes to 30 minutes after exposure to the environment having an alkaline pH or at least 50%, at least 60%, at least 70%, at least 75%, at least 80%, at least 90% or at least 95% of one or more hydrogel particles have an absorptive capacity of between 25% to 50%, 25% to 75%, 25% to 100% 50% to 75%, 50% to 100% or 75% to 100% by weight or volume which occurs in 1 minute to 2 minutes, 1 minute to 3 minutes, 1 minute to 4 minutes, 1 minute to 5 minutes, 1 minute to 6 minutes, 1 minute to 7 minutes, 1 minute to 8 minutes, 1 minute to 9 minutes, 1 minute to 10 minutes, 1 minute to 15 minutes, 1 minute to 20 minutes, 1 minute to 25 minutes, 1 minute to 30 minutes, 2 minutes to 3 minutes, 2 minutes to 4 minutes, 2 minutes to 5 minutes, 2 minutes to 6 minutes, 2 minutes to 7 minutes, 2 minutes to 8 minutes, 2 minutes to 9 minutes, 2 minutes to 10 minutes, 2 minutes to 15 minutes, 2 minutes to 20 minutes, 2 minutes to 25 minutes, 2 minutes to 30 minutes, 3 minutes to 4 minutes, 3 minutes to 5 minutes, 3 minutes to 6 minutes, 3 minutes to 7 minutes, 3 minutes to 8 minutes, 3 minutes to 9 minutes, 3 minutes to 10 minutes, 3 minutes to 15 minutes, 3 minutes to 20 minutes, 3 minutes to 25 minutes, 3 minutes to 30 minutes, 4 minutes to 5 minutes, 4 minutes to 6 minutes, 4 minutes to 7 minutes, 4 minutes to 8 minutes, 4 minutes to 9 minutes, 4 minutes to 10 minutes, 4 minutes to 15 minutes, 4 minutes to 20 minutes, 4 minutes to 25 minutes, 4 minutes to 30 minutes, 5 minutes to 6 minutes, 5 minutes to 7 minutes, 5 minutes to 8 minutes, 5 minutes to 9 minutes, 5 minutes to 10 minutes, 5 minutes to 15 minutes, 5 minutes to 20 minutes, 5 minutes to 25 minutes, 5 minutes to 30 minutes, 10 minutes to 15 minutes, 10 minutes to 20 minutes, 10 minutes to 25 minutes, 10 minutes to 30 minutes, 15 minutes to 20 minutes, 15 minutes to 25 minutes, 15 minutes to 30 minutes, 20 minutes to 25 minutes, 20 minutes to 30 minutes or 25 minutes to 30 minutes after exposure to the environment having an alkaline pH.

70. The arthropod pest control composition of any one of embodiments 50-69, wherein the one or more pH-sensitive polymers includes at least one polyacidic polymer, at least one polybasic polymer or both at least one polyacidic polymer and at least one polybasic polymer.

71. The arthropod pest control composition of embodiment 70, wherein the at least one polyacidic polymer includes poly(acrylate), poly(carboxylic acid), poly(sulfonamide), acrylamide, poly(acrylamide), acrylic acid, poly(acrylic acid), poly(ethacrylic acid), poly(propylacrylic acid), poly(acrylonitrile), methacrylic acid, methacrylic acid poly(ethyleneglycol) methyl ether methacrylate, poly (methacrylic acid), 2-hydroxyethylmethacrylate, 2-hydroxypropyl acrylate, poly(L-lactic acid), 3,3-dimethyl-3-silapentamethylene, alginate, carrageenan, hyaluronic acid, xanthan gum or any combination thereof.

72. The arthropod pest control composition of embodiment 70 or 71, wherein the at least one polybasic polymer includes poly(vinylpyrrolidine), poly(vinylamine), poly (vinyl-immidazole), poly(ethyleneimine), poly(propyleneimine), poly(L-lysine), N,N'-diethylethylenediamine, N,N-dimethylaminoethyl methacrylate, poly(N,N-diakylaminoethylmethacrylate), poly(N,N-dimethylaminoethylmethacrylate), poly(N,N-diethylaminoethylmethacrylate), poly(ethylene glycol), poly(ethylene glycol) dimethacrylate, poly(ethylene glycol)methyl ether methacrylate, poly(aminosaccharide), chitosan or any combination thereof.

73. The arthropod pest control composition of any one of embodiments 50-72, wherein the one or more pH-sensitive polymers include a poly(acrylate), poly(acrylic acid) polymer and/or a poly(ethylene glycol) polymer.

74. The arthropod pest control composition of any one of embodiments 50-73, wherein the one or more hydrogel particles are poly(acrylate)-based superporous hydrogel particles and/or poly(acrylic acid)-based superporous hydrogel particles.

75. The arthropod pest control composition of embodiment 74, wherein the poly(acrylic acid)-based superporous hydrogel particles comprise a poly(acrylic acid) polymer and a poly(ethylene glycol) copolymer.

76. The arthropod pest control composition of any one of embodiments 50-75, wherein the hydrogel composition is substantially non-toxic to humans, mammals, plants and the environment.

77. The arthropod pest control composition of any one of embodiments 50-76, wherein the hydrogel composition is biodegradable.

78. The arthropod pest control composition of any one of embodiments 50-77, wherein the one or more hydrogel particles are coated with a polyhedrin protein.

79. The arthropod pest control composition of any one of embodiments 50-78, further comprising a matrix material.

80. The arthropod pest control composition of embodiment 79, wherein the matrix material is a hydrophilic and/or a hydrophobic non-toxic material.

81. The arthropod pest control composition of embodiment 79 or 80, wherein the matrix material is an agar, a cellulose ether, an aliphatic alcohol, a polyalkylene glycol, an acrylic resin or a long-chain $C_{8-50}$ substituted or unsubstituted hydrocarbon 82. The arthropod pest control composition of embodiment 81, wherein the cellulose ether includes an alkylcellulose, a hydroxyalkylcellulose or a carboxyalkylcellulose.

83. The arthropod pest control composition of embodiment 82, wherein the alkylcellulose cellulose is ethylcellulose, propylcellulose or propylmetlhylcellulose.

84. The arthropod pest control composition of embodiment 82, wherein the hydroxyalkyl cellulose is hydroxypropylcellulose, hydroxypropylmetlhylcellulose or hydroxyethyl cellulose.

85. The arthropod pest control composition of embodiment 82, wherein the carboxyalkylcellulose cellulose is carboxyethylcellulose, carboxypropylcellulose or carboxpropylmetlhylcellulose.

86. The arthropod pest control composition of embodiment 81, wherein the long-chain substituted or unsubstituted hydrocarbon includes a $C_{8-50}$ substituted or unsubstituted hydrocarbon, such as, e.g., a fatty acid, a fatty alcohol, glyceryl a fatty acid ester, a hydrogenated mineral oil, a hydrogenated vegetable oil and a wax.

87. The arthropod pest control composition of any one of embodiment 79-86, comprising a first portion and a second portion, the first portion comprising the matrix material and the second portion comprising the hydrogel composition.

88. The arthropod pest control composition of any one of embodiment 79-86, wherein the hydrogel composition and the matrix material are interspersed throughout the arthropod pest control composition.

89. The arthropod pest control composition of any one of embodiments 50-88, further comprising an attractant.

90. The arthropod pest control composition of embodiment 89, wherein the attractant is a compound that binds an odorant receptor.

91. The arthropod pest control composition of embodiment 90, wherein the compound is an odorant binding protein.

92. The arthropod pest control composition of embodiment 91, wherein the odorant binding protein is an odorant binding protein 1.

93. The arthropod pest control composition of embodiment 89, wherein the attractant is a fish meal, a shrimp meal, a squid meal, a soybean meal, an oat meal, a wheat meal, spirulina or any combination thereof.

94. The arthropod pest control composition of embodiment 93, wherein the attractant is tetramin.

95. A method of controlling an arthropod pest population comprising one or more arthropod pests, the method comprising the steps of applying an arthropod pest composition as defined in any one of embodiments 1-49 to a location, wherein upon ingestion of the arthropod pest composition by the one or more arthropod pests, the one or more hydrogel particles expand in the alimentary canal of the one or more arthropods thereby killing the one or more arthropod pests.

96. An arthropod pest composition as defined in any one of embodiments 1-49 for use in the controlling an arthropod pest population comprising one or more arthropod pests.

97. Use of an arthropod pest composition as defined in any one of embodiments 1-49 for controlling an arthropod pest population comprising one or more arthropod pests.

98. A method of controlling an arthropod pest population comprising one or more arthropod pests, the method comprising the steps of applying an arthropod pest composition as defined in any one of embodiments 50-94 to a location, wherein upon ingestion of the arthropod pest composition by the one or more arthropod pests, the hydrogel composition expands in the alimentary canal of the one or more arthropods thereby killing the one or more arthropod pests.

99. An arthropod pest composition as defined in any one of embodiments 50-94 for use in the controlling an arthropod pest population comprising one or more arthropod pests.

100. Use of an arthropod pest composition as defined in any one of embodiments 50-94 for controlling an arthropod pest population comprising one or more arthropod pests.

101. The method of embodiment 95 or 98 or the use of any one of embodiments 96, 97, 99 or 100, wherein the alimentary canal includes the midgut.

102. The method of embodiment 95, 98 or 101 or the use of any one of embodiments 96, 97 or 99-101, wherein the midgut has a pH of 8.5 or more.

103. The method or use of embodiment 102, wherein the midgut has a pH range of 9 to 12.

104. The method of any one of embodiments 95, 98 or 101-103 or the use of any one of embodiments 96, 97 or 99-103, wherein the one or more arthropods includes members in the larval, nymphal, juvenile, and/or adult stage of development.

105. The method of embodiments 95, 98 or 101-104 or the use of any one of embodiments 96, 97 or 99-104, wherein the one or more arthropods comprise an insect, an arachnid, or a pseudocentipede.

106. The method or use of embodiment 105, wherein the insect is an Anopluran, a Coleopteran, a Dermapteran, a Dictyopteran, a Dipteran, a Hemipteran, a Homopteran, a Hymenopteran, an Isopteran, a Lepidopteran, a Mallophagan, an Orthopteran, a Phthirapteran, a Siphonapteran, a Thysanopteran or a Thysanuran.

107. The method or use of embodiment 105, wherein the arachnid is an Acarina, an Araneae, an Amblypygi, a Haptopoda, an Opilone, a Palpigradi, a Phalangiotarbida, a Pseudoscorpions, a Ricinulei, a Schizomida, a Scorpion, a Solifugae, a Trigonotarbida or a Thelyponida.

108. The method of any one of embodiments 95, 98 or 101-107 or the use of any one of embodiments 96, 97 or 99-107, wherein the location is an aquatic location or a terrestrial location.

109. The method or use of embodiment 108, wherein the terrestrial location comprises a stagnant pool of water, a pond.

110. The method or use of embodiment 108, wherein the terrestrial location comprises a plant or group of plants or part of a plant, a particular area of land, or a man-made structure.

111. The method or use according to embodiment 110, wherein the particular area of land is a lawn, a garden, a nursery or an agricultural field.

112. The method or use according to embodiment 110, wherein the man-made structure is a commercial building, a residential house, a community facility, a barn, a stable, a shed, a greenhouse or any other physical structure.

113. The method of any one of embodiments 95, 98 or 101-112 or the use of any one of embodiments 96, 97 or 99-112, wherein application of the arthropod pest composition causes an adverse effect on the arthropod pest population of the one or more arthropods sought to be controlled.

114. The method of any one of embodiments 95, 98 or 101-113 or the use of any one of embodiments 96, 97 or 99-113, wherein the effective amount of the arthropod pest composition results in an adverse effect to one or more arthropods sought to be controlled.

115. The method or use according to embodiment 114, wherein the effective amount of the arthropod pest composition adversely effects about 70%, about 75%, about 80%, about 85%, about 86%, about 87%, about 88%, about 89%, about 90%, about 91%, about 92%, about 93%, about 94%, about 95%, about 96%, about 97%, about 98% or about 99%; or at least 70%, at least 75%, at least 80%, at least 85%, at least 86%, at least 87%, at least 88%, at least 89%, at least 90%, at least 91%, at least 92%, at least 93%, at least 94%, at least 95%, at least 96%, at least 97%, at least 98% or at least 99%; or at most 70%, at most 75%, at most 80%, at most 85%, at most 86%, at most 87%, at most 88%, at most 89%, at most 90%, at most 91%, at most 92%, at most 93%, at most 94%, at most 95%, at most 96%, at most 97%, at most 98% or at most 99%; or about 70% to about 80%, about 70% to about 85%, about 70% to about 90%, about 70% to about 95%, about 70% to about 99%, about 75% to about 85%, about 75% to about 90%, about 75% to about 95%, about 75% to about 99%, about 80% to about 90%, about 80% to about 95%, about 80% to about 99%, about 85% to about 93%, about 85% to about 95%, about 85% to about 97%, about 85% to about 99%, about 90% to about 93%, about 90% to about 95%, about 90% to about 97%, about 90% to about 99%, about 93% to about 95%, about 93% to about 97%, about 93% to about 99%, about 95% to about 97% or about 95% to about 99% of the one or more arthropods sought to be controlled.

116. The method of any one of embodiments 95, 98 or 101-115 or the use of any one of embodiments 96, 97 or 99-115, wherein the effective amount of the arthropod pest composition results in mortality of the one or more arthropods sought to be controlled.

117. The method or use according to embodiment 116, wherein the effective amount of the arthropod pest composition results in mortality of about 70%, about 75%, about 80%, about 85%, about 86%, about 87%, about 88%, about 89%, about 90%, about 91%, about 92%, about 93%, about 94%, about 95%, about 96%, about 97%, about 98% or about 99%; or at least 70%, at least 75%, at least 80%, at least 85%, at least 86%, at least 87%, at least 88%, at least 89%, at least 90%, at least 91%, at least 92%, at least 93%, at least 94%, at least 95%, at least 96%, at least 97%, at least 98% or at least 99%; or at most 70%, at most 75%, at most 80%, at most 85%, at most 86%, at most 87%, at most 88%, at most 89%, at most 90%, at most 91%, at most 92%, at most 93%, at most 94%, at most 95%, at most 96%, at most 97%, at most 98% or at most 99%; or about 70% to about 80%, about 70% to about 85%, about 70% to about 90%, about 70% to about 95%, about 70% to about 99%, about 75% to about 85%, about 75% to about 90%, about 75% to about 95%, about 75% to about 99%, about 80% to about 90%, about 80% to about 95%, about 80% to about 99%, about 85% to about 93%, about 85% to about 95%, about 85% to about 97%, about 85% to about 99%, about 90% to about 93%, about 90% to about 95%, about 90% to about 97%, about 90% to about 99%, about 93% to about 95%, about 93% to about 97%, about 93% to about 99%, about 95% to about 97% or about 95% to about 99% of the one or more arthropods sought to be controlled.

118. The method of any one of embodiments 95, 98 or 101-117 or the use of any one of embodiments 96, 97 or 99-117, wherein the effective amount of the arthropod pest composition reduces the size of an arthropod pest population of the one or more arthropod pests sought to be controlled.

119. The method or use according to embodiment 118, wherein the effective amount of the arthropod pest composition reduce the size of an arthropod pest population of the one or more arthropod pests sought to be controlled by about 70%, about 75%, about 80%, about 85%, about 86%, about 87%, about 88%, about 89%, about 90%, about 91%, about 92%, about 93%, about 94%, about 95%, about 96%, about 97%, about 98% or about 99%; or at least 70%, at least 75%, at least 80%, at least 85%, at least 86%, at least 87%, at least 88%, at least 89%, at least 90%, at least 91%, at least 92%, at least 93%, at least 94%, at least 95%, at least 96%, at least 97%, at least 98% or at least 99%; or at most 70%, at most 75%, at most 80%, at most 85%, at most 86%, at most 87%, at most 88%, at most 89%, at most 90%, at most 91%, at most 92%, at most 93%, at most 94%, at most 95%, at most 96%, at most 97%, at most 98% or at most 99%; or about 70% to about 80%, about 70% to about 85%, about 70% to about 90%, about 70% to about 95%, about 70% to about 99%, about 75% to about 85%, about 75% to about 90%, about 75% to about 95%, about 75% to about 99%, about 80% to about 90%, about 80% to about 95%, about 80% to about 99%, about 85% to about 93%, about 85% to about 95% to about 95%, about 85% to about 97%, about 85% to about 99%, about 90% to about 93%, about 90% to about 95%, about 90% to about 97%, about 90% to about 99%, about 93% to about 95%, about 93% to about 97%, about 93% to about 99%, about 95% to about 97% or about 95% to about 99%.

120. The method of any one of embodiments 95, 98 or 101-119 or the use of any one of embodiments 96, 97 or 99-119, wherein the effective amount of the arthropod pest composition deters an arthropod pest population of the one or more arthropod pests sought to be controlled from entering or infesting one or more locations.

121. The method or use according to embodiment 120, wherein the effective amount of the arthropod pest composition deters about 70%, about 75%, about 80%, about 85%, about 86%, about 87%, about 88%, about 89%, about 90%, about 91%, about 92%, about 93%, about 94%, about 95%, about 96%, about 97%, about 98% or about 99%; or at least 70%, at least 75%, at least 80%, at least 85%, at least 86%, at least 87%, at least 88%, at least 89%, at least 90%, at least 91%, at least 92%, at least 93%, at least 94%, at least 95%, at least 96%, at least 97%, at least 98% or at least 99%; or at most 70%, at most 75%, at most 80%, at most 85%, at most 86%, at most 87%, at most 88%, at most 89%, at most 90%, at most 91%, at most 92%, at most 93%, at most 94%, at most 95%, at most 96%, at most 97%, at most 98% or at most 99%; or about 70% to about 80%, about 70% to about 85%, about 70% to about 90%, about 70% to about 95%, about 70% to about 99%, about 75% to about 85%, about 75% to about 90%, about 75% to about 95%, about 75% to about 99%, about 80% to about 90%, about 80% to about 95%, about 80% to about 99%, about 85% to about 93%, about 85% to about 95%, about 85% to about 97%, about 85% to about 99%, about 90% to about 93%, about 90% to about 95%, about 90% to about 97%, about 90% to about 99%, about 93% to about 95%, about 93% to about 97%, about 93% to about 99%, about 95% to about 97% or about 95% to about 99% of an arthropod pest population of the one or more arthropod pests from entering or infesting one or more locations.

122. The method or use according to embodiment 113, wherein application of the arthropod pest composition causes at least 10% mortality of the one or more arthropod pests in the population, causes at least 10% reduction in the size of the population of one or more arthropod pests sought to be controlled, and/or deters at least 10% of the one or more arthropod pests in the population from entering or infesting the one or more locations.

EXAMPLES

The following non-limiting examples are provided for illustrative purposes only in order to facilitate a more complete understanding of representative embodiments now contemplated. These examples should not be construed to limit any of the embodiments described in the present specification, including those pertaining to arthropod pest control compositions, or methods or uses of controlling an arthropod pest population disclosed herein.

Example 1

Mosquito Larval Lethality Assay

An arthropod pest control composition is prepared by pouring 1% NuSieve, GTG low melting temperature agarose (pH 6) containing TetraMinA® (Tetra Werke, Melle, Del.) into block molds having a mean diameter of 50 µm to 100 µm containing basic pH-sensitive superporous hydrogel nanoparticles comprising polyacrylate. Assays were performed in 38.1×25.4×5.08-cm Pyrex dishes containing 500 mL of 27° C. buffered solution (pH 4.0). A test zone comprising plugs of the basic pH-sensitive superporous hydrogel and control zone comprising plus with no hydrogel were set up. A mixture of one hundred third and fourth instar *Aedes aegypti* larvae were released in the center of the dish and allowed to swim freely. Larvae were allowed to feed on these nanoparticle/agar blocks and viability will be assessed at 12, 24 and 48-hour intervals. Dead larvae were dissected in order to determine the cause of lethality. The results of these assays demonstrate a lethality of at least 30% of the larvae.

In closing, it is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular compound, composition, article, apparatus, methodology, protocol, and/or reagent, etc., described herein, unless expressly stated as such. In addition, those of ordinary skill in the art will recognize that certain changes, modifications, permutations, alterations, additions, subtractions and sub-combinations thereof can be made in accordance with the teachings herein without departing from the spirit of the present specification. It is therefore intended that the following appended claims and claims hereafter introduced are interpreted to include all such changes, modifications, permutations, alterations, additions, subtractions and sub-combinations as are within their true spirit and scope.

Certain embodiments of the present invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. For instance, as mass spectrometry instruments can vary slightly in determining the mass of a given analyte, the term "about" in the context of the mass of an ion or the mass/charge ratio of an ion refers to +/−0.50 atomic mass unit. At the very least, and not as an attempt to limit the application of the doctrine of equivalents to the scope of the claims, each numerical indication should at least be construed considering the number of reported significant digits and by applying ordinary rounding techniques.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.—for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising"

(and equivalent open-ended transitional phrases thereof like including, containing and having) encompasses all the expressly recited elements, limitations, steps and/or features alone or in combination with unrecited subject matter; the named elements, limitations and/or features are essential, but other unnamed elements, limitations and/or features may be added and still form a construct within the scope of the claim. Specific embodiments disclosed herein may be further limited in the claims using the closed-ended transitional phrases "consisting of" or "consisting essentially of" in lieu of or as an amended for "comprising." When used in the claims, whether as filed or added per amendment, the closed-ended transitional phrase "consisting of" excludes any element, limitation, step, or feature not expressly recited in the claims. The closed-ended transitional phrase "consisting essentially of limits the scope of a claim to the expressly recited elements, limitations, steps and/or features and any other elements, limitations, steps and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps and/or features specifically recited in the claim whereas the meaning of the closed-ended transitional phrase "consisting essentially of is being defined as only including those elements, limitations, steps and/or features specifically recited in the claim and those elements, limitations, steps and/or features that do not materially affect the basic and novel characteristic(s) of the claimed subject matter. Therefore, the open-ended transitional phrase "comprising" (and equivalent open-ended transitional phrases thereof) includes within its meaning, as a limiting case, claimed subject matter specified by the closed-ended transitional phrases "consisting of or "consisting essentially of." As such embodiments described herein or so claimed with the phrase "comprising" are expressly or inherently unambiguously described, enabled and supported herein for the phrases "consisting essentially of" and "consisting of."

All patents, patent publications, and other publications referenced and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard should be construed as an admission that the inventors are not entitled to antedate such disclosure by prior invention or for any other reason. All statements as to the date or representation as to the contents of these documents is based on the information available to the applicants and does not constitute any admission as to the correctness of the dates or contents of these documents.

Lastly, the terminology used herein is for describing particular embodiments only and is not intended to limit the scope of the present invention, which is defined solely by the claims. Accordingly, the present invention is not limited to that precisely as shown and described.

The invention claimed is:

1. An arthropod pest control composition comprising:
one or more hydrogel particles including one or more pH-sensitive polymers, the one or more pH-sensitive polymers including at least one polyacidic polymer, wherein the one or more hydrogel particles undergo a phase transition into an expanded state when exposed to an environment having an alkaline pH; and
a matrix material,
wherein the arthropod pest control composition comprises a first portion and a second portion, the first portion comprising the matrix material and the second portion comprising the matrix material and the one or more hydrogel particles.

2. The arthropod pest control composition of claim 1, wherein the alkaline pH is a pH of 8.5 or more.

3. The arthropod pest control composition of claim 2, wherein the environment has a pH range of 9 to 12.

4. The arthropod pest control composition of claim 1, wherein the one or more hydrogel particles are superporous hydrogel particles comprising pores.

5. The arthropod pest control composition of claim 1, wherein the one or more hydrogel particles further comprise a pre-cross-linked matrix-swelling additive.

6. The arthropod pest control composition of claim 1, wherein the one or more hydrogel particles further comprise a hybrid agent.

7. The arthropod pest control composition of claim 1, wherein the phase transition of the one or more hydrogel particles into an expanded state of the one or more hydrogel particles occurs at an alkaline pH.

8. The arthropod pest control composition of claim 1, wherein the one or more pH-sensitive polymers further includes at least one polybasic polymer.

9. The arthropod pest control composition of claim 8, wherein the at least one polybasic polymer includes poly (vinylpyrrolidine), poly(vinylamine), poly(vinyl-immidazole), poly(ethyleneimine), poly(propyleneimine), poly(L-lysine), N,N'-diethylethylenediamine, N,N-dimethylaminoethyl methacrylate, poly(N, N-diakylaminoethylmethacrylate), poly(N, N-dimethylaminoethylmethacrylate), poly(N,N-diethylaminoethylmethacrylate), poly(ethylene glycol), poly(ethylene glycol)dimethacrylate, poly(ethylene glycol)methyl ether methacrylate, poly(aminosaccharide), chitosan or any combination thereof.

10. The arthropod pest control composition of claim 1, wherein the at least one polyacidic polymer includes poly (acrylate), poly(carboxylic acid), poly(sulfonamide), acrylamide, poly(acrylamide), acrylic acid, poly(acrylic acid), poly(ethacrylic acid), poly(propylacrylic acid), poly(acrylonitrile), methacrylic acid, methacrylic acid poly(ethyleneglycol) methyl ether methacrylate, poly(methacrylic acid), 2-hydroxyethylmethacrylate, 2-hydroxypropyl acrylate, poly(L-lactic acid), 3,3-dimethyl-3-silapentamethylene, alginate, carrageenan, hyaluronic acid, xanthan gum or any combination thereof.

11. The arthropod pest control composition of claim 1, wherein the one or more pH-sensitive polymers include a poly(acrylate) polymer, a poly(acrylic acid) polymer and/or a poly(ethylene glycol) polymer.

12. The arthropod pest control composition of claim 1, wherein the one or more hydrogel particles are poly(acrylate)-based superporous hydrogel particles or poly(acrylic acid)-based superporous hydrogel particles.

13. The arthropod pest control composition of claim 1, wherein the one or more hydrogel particles are coated with a polyhedrin protein.

14. The arthropod pest control composition of claim 1, wherein the one or more hydrogel particles and the matrix material are interspersed throughout the entire composition.

15. The arthropod pest control composition of claim 1, further comprising an attractant.

16. The arthropod pest control composition of claim 15, wherein the attractant promotes feeding behavior.

17. The arthropod pest control composition of claim 15, wherein the attractant is a fish meal, a shrimp meal, a squid meal, a soybean meal, an oat meal, a wheat meal, or *spirulina* or any combination thereof.

18. A method of controlling an arthropod pest population comprising one or more arthropod pests, the method comprising the steps of applying an arthropod pest composition as defined in claim 1 to a location, wherein upon ingestion of the arthropod pest composition by the one or more arthropod pests, the one or more hydrogel particles expand in the alimentary canal of the one or more arthropods thereby killing the one or more arthropod pests.

* * * * *